(12) United States Patent
Saavedra

(10) Patent No.: US 10,523,593 B2
(45) Date of Patent: *Dec. 31, 2019

(54) SYSTEM, APPARATUS AND METHOD FOR PROVIDING A VIRTUAL NETWORK EDGE AND OVERLAY

(71) Applicant: TELOIP INC., Mississauga (CA)

(72) Inventor: Patricio Humberto Saavedra, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/738,056

(22) PCT Filed: Jun. 30, 2016

(86) PCT No.: PCT/CA2016/000185
§ 371 (c)(1),
(2) Date: Dec. 19, 2017

(87) PCT Pub. No.: WO2017/004693
PCT Pub. Date: Jan. 12, 2017

(65) Prior Publication Data
US 2018/0191638 A1  Jul. 5, 2018

Related U.S. Application Data

(63) Continuation of application No. 14/791,311, filed on Jul. 3, 2015, now Pat. No. 9,692,713, which is a
(Continued)

(51) Int. Cl.
*H04L 12/28* (2006.01)
*H04L 12/911* (2013.01)
(Continued)

(52) U.S. Cl.
CPC ........ *H04L 47/825* (2013.01); *H04L 12/2867* (2013.01); *H04L 45/24* (2013.01);
(Continued)

(58) Field of Classification Search
CPC ...... H04L 45/245; H04L 47/825; H04L 69/14
(Continued)

(56) References Cited

U.S. PATENT DOCUMENTS 5,617,417 A   4/1997 Sathe et al.
5,764,740 A   6/1998 Holender
(Continued)

FOREIGN PATENT DOCUMENTS

CN   1897492 A   1/2007
CN   1897492 A   5/2012
(Continued)

OTHER PUBLICATIONS

Mushroom Networks, Inc.; Mushroom Networks; http://www.mushroomnetworks.com/product.aspx?product_id=1000&tab=features; p. 1-2; 2004-2008.
(Continued)

*Primary Examiner* — John Pezzlo
(74) *Attorney, Agent, or Firm* — Norton Rose Fulbright Canada LLP

(57) ABSTRACT

A network system is provided between at least a first client site and a second client site, the first and the second client site are at a distance from one another. A client site network component is implemented at least at the first client site, the client site network component bonding or aggregating one or more diverse network connections so as to configure a bonded/aggregated connection that has increased throughput. At least one network server component may be configured to connect to the client site network component using the bonded/aggregated connection. A cloud network controller may be configured to manage the data traffic and a virtual edge providing transparent lower-link encryption for the bonded/aggregated connection between the client site network component and the network server component.

28 Claims, 34 Drawing Sheets

Related U.S. Application Data continuation-in-part of application No. 14/489,036, filed on Sep. 17, 2014, now Pat. No. 9,264,350, which is a continuation-in-part of application No. 13/958,009, filed on Aug. 2, 2013, now Pat. No. 9,264,307, which is a continuation-in-part of application No. 13/420,938, filed on Mar. 15, 2012, now Pat. No. 8,913,610, which is a continuation of application No. 12/269,439, filed on Nov. 12, 2008, now Pat. No. 8,155,158.

(51) Int. Cl.

| | | |
|---|---|---|
| *H04L 12/723* | (2013.01) | |
| *H04L 29/06* | (2006.01) | |
| *H04L 12/709* | (2013.01) | |
| *H04L 12/931* | (2013.01) | |
| *H04L 12/707* | (2013.01) | |
| *H04J 1/16* | (2006.01) | |
| *H04L 12/70* | (2013.01) | |

(52) U.S. Cl.
CPC ............ *H04L 45/245* (2013.01); *H04L 45/50* (2013.01); *H04L 47/828* (2013.01); *H04L 49/00* (2013.01); *H04L 69/14* (2013.01); *H04L 2012/5624* (2013.01); *Y02D 50/30* (2018.01)

(58) Field of Classification Search
USPC .................................. 370/252, 389, 401, 386
See application file for complete search history.

(56) References Cited

U.S. PATENT DOCUMENTS

| | | | |
|---|---|---|---|
| 5,809,070 A | 9/1998 | Krishnan et al. | |
| 6,002,670 A | 12/1999 | Rahman et al. | |
| 6,262,976 B1 | 7/2001 | McNamara | |
| 6,621,859 B1 | 9/2003 | Bell et al. | |
| 6,778,495 B1 | 8/2004 | Blair | |
| 7,167,860 B1 | 1/2007 | Black et al. | |
| 7,177,284 B2 | 2/2007 | Peleg et al. | |
| 7,630,412 B2 | 12/2009 | Wright et al. | |
| 7,646,708 B2 | 1/2010 | McGee et al. | |
| 7,843,843 B1 | 11/2010 | Papp, III et al. | |
| 8,155,158 B2 | 4/2012 | Saavedra | |
| 8,750,265 B2 | 6/2014 | Scherzer et al. | |
| 2002/0083344 A1* | 6/2002 | Vairavan | H04L 29/12009 726/13 |
| 2002/0114276 A1 | 8/2002 | Basturk | |
| 2003/0117954 A1* | 6/2003 | De Neve | H04L 12/4641 370/230 |
| 2004/0213386 A1 | 10/2004 | Gupta | |
| 2005/0027870 A1 | 2/2005 | Trebes, Jr. | |
| 2005/0030974 A1 | 2/2005 | Wright et al. | |
| 2006/0098573 A1 | 5/2006 | Beer et al. | |
| 2006/0176900 A1 | 8/2006 | Liu et al. | |
| 2006/0215689 A1 | 9/2006 | Liu et al. | |
| 2008/0075111 A1 | 3/2008 | Hu et al. | |
| 2008/0080371 A1 | 4/2008 | Liu et al. | |
| 2009/0182874 A1 | 7/2009 | Morford et al. | |
| 2009/0222902 A1* | 9/2009 | Bender | H04L 63/0823 726/10 |
| 2010/0046536 A1 | 2/2010 | Wright et al. | |
| 2010/0046539 A1 | 2/2010 | Wright et al. | |
| 2011/0041002 A1 | 2/2011 | Saavedra | |
| 2011/0081955 A1 | 4/2011 | Lange et al. | |
| 2012/0166582 A1* | 6/2012 | Binder | H04L 63/18 709/217 |
| 2013/0064255 A1 | 3/2013 | Saavedra | |
| 2015/0003465 A1 | 1/2015 | Saavedra | |
| 2015/0350019 A1 | 12/2015 | Terayama et al. | |

FOREIGN PATENT DOCUMENTS

| | | |
|---|---|---|
| CN | 102246475 B | 11/2014 |
| EP | 0910195 A2 | 4/1999 |
| WO | 2004/043013 A1 | 5/2004 |
| WO | 2006095273 A1 | 9/2006 |
| WO | 2006100610 A1 | 9/2006 |
| WO | 2007113645 A2 | 10/2007 |
| WO | 2010/054475 A1 | 5/2010 |
| WO | 2014/135216 A1 | 9/2014 |
| WO | 2014145363 A2 | 9/2014 |

OTHER PUBLICATIONS

Internet Engineering Task Force; The PPP Multilink Protocol; http://www.ietf.org/rfc/rfc1990.txt?number=1990; Aug. 1, 1996.
WIPO, International Search Report and Written Opinion for PCT Application No. PCT/CA2016/051343 dated Jan. 1, 2017.
WIPO, International Search Report and Written Opinion for PCT Application No. PCT/CA2016/000060 dated May 6, 2016.
United States Patent and Trademark Office, Office Action Summary dated Jun. 27, 2014, issued on U.S. Appl. No. 13/420,938.
Canadian Intellectual Property Office, Office Action dated Apr. 14, 2014, issued on Canadian Patent Application No. 2,743,548.
State Intellectual Property Office, Office Action dated Aug. 23, 2013, issued on Chinese Patent Application No. 200980149872.1 (english translation provided).
State Intellectual Property Office, Office Action dated Apr. 30, 2014, issued on Chinese Patent Application No. 2009801498721 (english translation provided).
European Patent Office, Extended European Search Report dated Jan. 3, 2013, issued on European Patent Application No. 09825684.5.
United States Patent and Trademark Office, Office Action Summary dated Apr. 29, 2014, issued on U.S. Appl. No. 13/420,938.
United States Patent and Trademark Office, Office Action Summary dated Apr. 9, 2010, issued on U.S. Appl. No. 12/269,439.
United States Patent and Trademark Office, Office Action Summary dated Dec. 7, 2010, issued on U.S. Appl. No. 12/269,439.
United States Patent and Trademark Office, Office Action Summary dated Jun. 23, 2011, issued on U.S. Appl. No. 12/269,439.
The Patent Office of the People's Republic of China, Notification of the First Office Action for CN Application No. 2014800435995 dated Sep. 5, 2016.
The Patent Office of the People's Republic of China, Search Report for CN Application No. 2014800435995.
Mushroom Networks, Inc.; Mushroom Networks; http://www.mushroomnetworks.conn/productaspx?product_id=1000&tab=features; p. 1-2; 2004-2008.
United States Patent and Trademark Office, Office Action Summary dated Jul. 19, 2013, issued on U.S. Appl. No. 13/420,938.
United States Patent and Trademark Office, Office Action Summary dated Apr. 29, 2014, issued on U.S. Appl. No. 131420,938.
IP Australia, Office Action dated Jul. 25, 2014, issued on Australian Patent Application No. 2009316197.
WIPO, International Search Report and Written Opinion for PCT Application No. PCT/CA2016/000185 dated Sep. 30, 2016.
Patent Cooperation Treaty, International Search Report and Written Opinion dated May 27, 2015 for PCT Application No. PCT/CA2014/000694.
IP Australia, Notice of Acceptance dated Aug. 6, 2015 issued in Australian application No. 2009316197.
IP Australia, Office Action dated Jun. 17, 2015 issued in related Australian application No. 2014295861.
United States Patent & Trademark Office, Office Action dated Jul. 1, 2015 issued in related U.S. Appl. No. 13/958,009.
United States Patent & Trademark Office, Office Action dated Jul. 2, 2015 issued in related U.S. Appl. No. 14/489,036.
Norton Rose Fulbright Canada LLP, Office Action Response dated Oct. 21, 2013, filed on U.S. Appl. No. 13/420,938.
Miller Thomson LLP, Office Action Response dated Sep. 30, 2010, filed on U.S. Appl. No. 12/269,439.

(56) References Cited

OTHER PUBLICATIONS

Miller Thomson LLP, Office Action Response dated Jun. 7, 2011, filed on U.S. Appl. No. 12/269,439.
Miller Thomson LLP, Office Action Response dated Nov. 10, 2011, filed on U.S. Appl. No. 12/269,439.
WIPO, International Search Report and Written Opinion for PCT Application No. PCT/CA2017/050787 dated Oct. 12, 2017.
IP Australia, Patent Examination Report No. 1 for AU Application No. 2015258288 dated Nov. 25, 2016.
Patent Cooperation Treaty, Written Opinion and International Search Report dated Oct. 17, 2014, issued on PCT Application No. PCT/CA2014/000595.

* cited by examiner

SYSTEM, APPARATUS AND METHOD FOR PROVIDING A VIRTUAL NETWORK EDGE AND OVERLAY

CROSS REFERENCE TO RELATED APPLICATIONS

This application claims the benefit of and priority to U.S. patent application Ser. No. 14/791,311 which is a continuation-in-part of U.S. patent application Ser. No. 14/489,036 filed on Sep. 17, 2014, which is a continuation-in-part of U.S. patent application Ser. No. 13/958,009 filed on Aug. 2, 2013, which is a continuation-in-part of U.S. patent application Ser. No. 13/420,938 filed on Mar. 15, 2012, which is a continuation of U.S. patent application Ser. No. 12/269,439 filed on Nov. 12, 2008, all of which are hereby incorporated by reference.

FIELD

Embodiments described herein relate generally to network communications and, in particular, to aggregating or bonding communications links for a variety of different networks including wired and wireless networks, and including Wide Area Networks ("WAN").

INTRODUCTION

While the capacity of network connections has increased since the introduction of dial up, high speed connectivity is not ubiquitous in all regions. Also, bandwidth is not an unlimited resource.

Various solutions exist for improving network performance such as load balancing, bonding of links to increase throughput, as well as aggregation of links. In regards to bonding/aggregation various different technologies exist that associated two or more diverse links (which in this disclosure refers to links associated with different types of networks and/or different network carriers) with one another for carrying network traffic (such as a set of packets) across such associated links to improve network performance in relation for such packets. Examples of such technologies include load balancing, WAN optimization, or ANA™ technology of TELoIP as well as WAN aggregation technologies.

Many of such technologies for improving network performance are used to increase network performance between two or more locations (for example Location A, Location B, Location N; hereinafter referred to collectively as "Locations"), where bonding/aggregation of links is provided at one or more of such locations. While the bonded/aggregated links provide significant network performance improvement over the connections available to carry network traffic for example from Location A to an access point to the backbone of a network (whether an Internet access point, or access point to another data network such as a private data network, an MPLS network, or high performance wireless network) ("network backbone"), the bonded/aggregated links are generally slower than the network backbone.

Prior art technologies including bonding/aggregation generally result in what is often referred to as "long haul" bonding/aggregation, which means that the bonded/aggregated links are maintained for example from Location A and Location B, including across the network backbone, which in many cases results in network impedance. As a result, while bonding/aggregation provides improved network performance for example from Location A to the network backbone, network performance across the entire network path for example from Location A to Location B, may be less than optimal because the technology in this case does not take full advantage of the network performance of the network backbone.

SUMMARY

In an aspect, embodiments described herein may provide a network system for improving network communication performance between at least a first client site and a second client site, wherein the first client site and the second client site are at a distance from one another that is such that would usually require long haul network communication. The system may include at least one client site network component implemented at least at the first client site, the client site network component bonding or aggregating one or more diverse network connections so as to configure a bonded/aggregated connection that has increased throughput. The system may include at least one network server component configured to connect to the client site network component using the bonded/aggregated connection, the network server component including at least one concentrator element implemented at a network access point to at least one network, the network server component automatically terminating the bonded/aggregated connection and passing data traffic to the network access point to the at least one network. The system may include a virtual edge connection providing at least one of transparent lower-link encryption and lower-link encapsulation using a common access protocol for the bonded/aggregated connection between the client site network component and the network server component. The system may include a cloud network controller configured to manage the data traffic so as to provide a managed network overlay that incorporates the virtual edge connection and at least one long haul network path carried over the at least one network.

In accordance with some embodiments, the network server component may include a first concentrator element implemented at the network access point to the at least one network and a second concentrator element implemented at another network access point to at least one other network. The first concentrator element and the second concentrator element may be configured to interoperate to provide a virtual core connection between the network access point and the other network access point, the virtual core connection providing another bonded/aggregated connection. The cloud network controller may be configured to manage the data traffic so as to provide the managed network overlay that incorporates the virtual edge connection, the virtual core connection and the at least one long haul network path carried over the at least one network and the at least one other network.

In accordance with some embodiments, the virtual core connection may provide at least one of the transparent lower-link encryption and the lower-link encapsulation using the common access protocol for the other bonded/aggregated connection.

In accordance with some embodiments, the network server component may have at least one other concentrator element, the at least one other concentrator element bonding or aggregating one or more other diverse network connections so as to configure another bonded/aggregated connection that has increased throughput, the other bonded/aggregated connection connecting the at least one concentrator element and the at least one other concentrator element.

In accordance with some embodiments, the cloud network controller may be configured to manage the data traffic so as to provide the managed network overlay that incorporates the bonded/aggregated connection and the other bonded/aggregated connection.

In accordance with some embodiments, the client site network component may be configured to separate lower-link data traffic and encapsulate data packets of the lower-link data traffic using the common access protocol for the bonded/aggregated connection.

In accordance with some embodiments, the client site network component may be configured with a route to the at least one network server component to separate the lower-link traffic to prepare the data traffic for the bonded/aggregated connection or the managed network overlay.

In accordance with some embodiments, the route is a static route, a dynamic route or a route from a separate or independent virtual routing forwarding table.

In accordance with some embodiments, the network server component is configured to connect with an intelligent packet distribution engine that manages data packets transmission over the at least one long haul network path by obtaining data traffic parameters and, based on the data traffic parameters and performance criteria, selectively applies one or more techniques to alter the traffic over the at least one long haul network path to conform to the data traffic parameters.

In accordance with some embodiments, the network server component is configured to provide Multi-Directional Pathway Selection (MDPS) for pre-emptive failover using echo packets received from the client site network component.

In accordance with some embodiments, the network server component is configured to provide an intelligent packet distribution engine (IPDE) for packet distribution with differing speed links using weighted packet distribution and for bi-directional (inbound and outbound) QoS.

In accordance with some embodiments, the first client site and the second client site are at a distance from one another such that data traffic transmission between the first client site and the second client site is subject to long haul effects.

In accordance with some embodiments, each of the least one network server components is accessible to a plurality of client site network components, each client site network component being associated with a client site location.

In accordance with some embodiments, the system may have a network aggregation device that: (A) configures a plurality of dissimilar network connections or network connections provided by a plurality of diverse network carriers ("diverse network connections") as one or more aggregated groups, at least one aggregated group creating the bonded/aggregated connection that is a logical connection of the plurality of diverse connections; and (B) routes and handles bi-directional transmissions over the aggregated network connection; wherein two or more of the diverse network connections have dissimilar network characteristics including variable path bidirectional transfer rates and latencies; wherein the logical connection is utilizable for a transfer of communication traffic bidirectionally on any of the diverse network connections without any configuration for the dissimilar network connections or by the diverse network carriers; and wherein the network aggregation engine includes or is linked to a network aggregation policy database that includes one or more network aggregation policies for configuring the aggregated groups within accepted tolerances so as to configure and maintain the aggregated network connection so that the logical connection has a total communication traffic throughput that is a sum of available communication traffic throughputs of the aggregated group of diverse network connections.

In another aspect, embodiments described herein may provide a client site network component implemented at least at least a first client site in network communication with a second client site, wherein the first client site and the second client site are at a distance from one another that is such that would usually require long haul network communication, the client site network component bonding or aggregating one or more diverse network connections so as to configure a bonded/aggregated connection that has increased throughput, the client site network component configured to connect to at least one network server component implemented at an access point to at least one wide area network, the network server component automatically terminating the bonded/aggregated connection and passing the data traffic to an access point to at least one wide area network, the client site network component configuring a virtual edge providing at least one of transparent lower-link encryption and lower-link encapsulation using a common access protocol for the bonded/aggregated connection.

In accordance with some embodiments, the client site network component may be configured to separate lower-link data traffic and use the common access lower-link protocol for encapsulation of data packets of the lower-link data traffic for the bonded/aggregated connection.

In accordance with some embodiments, the client site network component may configure a route to the at least one network server component to separate the lower-link traffic to prepare the data traffic for the bonded/aggregated connection or the managed network overlay.

In accordance with some embodiments, the route may be a static route, a dynamic route or a route from a separate or independent virtual routing forwarding table.

In accordance with some embodiments, the client site network component may be configured to transmit echo packets to the network server component to provide Multi-Directional Pathway Selection for pre-emptive failover using the echo packets.

In accordance with some embodiments, the client site network component may be further configured to provide IPDE for packet distribution with differing speed links using weighted packet distribution and for bi-directional (inbound and outbound) QoS.

In another aspect, there is provided a network server component configured to interoperate with a client site network component at a first client site to bond or aggregate one or more diverse network connections so as to configure a bonded/aggregated connection that has increased throughput, the network server component including at least one concentrator element implemented at a network access point to at least one network, the network server component automatically terminating the bonded/aggregated connection and passing data traffic to the network access point to the at least one network for data transmission to a second client site, the first client site and the second client site at a distance from one another that is such that would usually require long haul network communication, the network server component configuring a virtual edge connection providing at least one of transparent lower-link encryption and lower-link encapsulation using a common access protocol for the bonded/aggregated connection, the network server component in communication with a cloud network controller configured to manage the data traffic so as to provide a managed network overlay that incorporates the virtual edge connection and at least one long haul network path carried over the at least one network.

In accordance with some embodiments, the network server component may have a first concentrator element implemented at the network access point to the at least one network and a second concentrator element implemented at another network access point to at least one other network. The first concentrator element and the second concentrator element are configured to interoperate to provide a virtual core connection between the network access point and the other network access point, the virtual core connection providing another bonded/aggregated connection. The cloud network controller is configured to manage the data traffic so as to provide the managed network overlay that incorporates the virtual edge connection, the virtual core connection and the at least one long haul network path carried over the at least one network and the at least one other network.

In accordance with some embodiments, the network server component may be configured to use the common access lower-link protocol for encapsulation of data packets of the lower-link data traffic for the bonded/aggregated connection.

In accordance with some embodiments, the network server component may be configured to receive echo packets from the client site network component to provide Multi-Directional Pathway Selection (MDPS) for pre-emptive failover using the echo packets.

In accordance with some embodiments, the network server component may be configured to provide IPDE for packet distribution with differing speed links using weighted packet distribution and for bi-directional (inbound and outbound) QoS.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Examples of embodiments of the invention will now be described in greater detail with reference to the accompanying drawings, in which:

FIG. 1a illustrates an example problem of long haul aggregation/bonding.

DETAILED DESCRIPTION

Figure 1A:
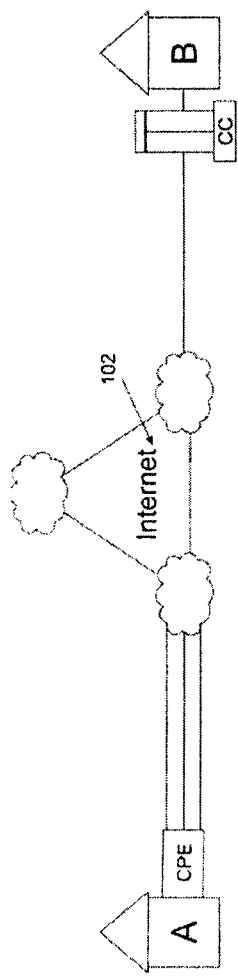
FIG. 1a illustrates a prior art network configuration that includes a bonded/aggregated network connection.

Embodiments may provide network infrastructure with utilization of diverse carriers and diverse connections via high-quality link aggregation in combination with a secured and trusted virtual network overlay. The virtual network overlay may provide a managed and encrypted connection of virtual links to provide a virtual WAN, for example.

Wide Area Networks ("WAN")

A Wide Area Network ("WAN") is a network that covers a wide or broad geographic area that may span cities, regions, countries, or the world. The Internet may be viewed as a WAN, for example. A WAN may be used to transmit data over long distances and connect different networks, including Personal Area Networks ("PAN"), Local Area Networks ("LAN"), or other local or regional network. A WAN may connect physically disparate networks and different types of networks that may be local or remote. An Enterprise WAN may refer to a private WAN built for a specific enterprise often using leased or private lines or circuit-switching or packet-switching methods.

Multi-Protocol Label Switch (MPLS)

Multi-Protocol Label Switch (MPLS) is a technology framework developed by the Internet Engineering Task Force. MPLS can be a WAN virtualization using virtual routing and forwarding. The technology may be used to build carrier and enterprise networks, implemented with routers and switches. Notably, MPLS is protocol independent and can map IP addresses to MPLS labels. MPLS improves network performance by forwarding packets (e.g. IP packets) from one network node to the next based on short path labels, avoiding complex lookups in a routing table. MPLS utilizes the concept of labels to direct data traffic, as a label associated with a packet generally contains the information required to direct the packet within an MPLS network. Generally speaking, a packet can enter an MPLS network through an MPLS ingress router or a provider edge/point-of-entry (PE) router, which encapsulates the packet with the appropriate labels. As the packet is transmitted along the MPLS network paths, various nodes in the network forward the packet based on the content of the labels. Sometimes a label switch router (LSR) switches or swaps the label(s) on a packet as it forwards the packet to the next node. When the packet leaves the MPLS network, an MPLS egress router or a provider edge (PE) router removes the label(s) from the packet and sends it on its way to the final destination. Typically, provider edge (PE) routers or their equivalent network elements sit on the edge of an MPLS network and act as an interface between the customer-side network and the MPLS core network. PE routers, as described above, can add or remove label(s) to incoming and exiting packets or data traffic. A single PE router may be connected to one or more customer networks. Within the MPLS core network, label switch routers (LSRs) receive incoming packets and route or forward the packets in accordance with their respective label information. LSRs can also swap or add label(s) to each packet.

A customer who wishes to connect to an MPLS network may employ the use of customer edge (CE) routers or their equivalent network elements, which can be located on the customer premises. The CE routers can connect to one or more PE routers, which in turn connects to the MPLS core network.

MPLS can deliver a range of benefits to customers, including: convergence of voice and data networking, high performance for mission-critical and cloud applications, easy-to-manage or fully managed environments reducing operating cost, SLA based assurances, and so on. MPLS can be delivered with a variety of access technologies such as layer2, layer3, on the edge over the internet via IPSEC, and so on. In addition, MPLS itself is trending as a core networking technology with options to establish access edge points.

Routers may be any device including, without limitation, a router, switch, server, computer or any network equipment that provides routing or package forwarding capacity. Routers may or may not have routing tables. Routers may be implemented in hardware, software, or a combination of both. Routers may also be implemented as a cloud service and remotely configurable.

IPVPN/IPSEC

To improve security and confidentiality of data communicated over an MPLS network, Internet Protocol Security (IPSEC), a protocol suite for securing IP communication, may be adapted in addition to an MPLS network. With IPSEC VPN, the MPLS network is considered secured and trusted. IPSEC gateways can be any network equipment such as computers, servers, routers, or special IPSEC devices. IPSEC VPN is typically provisioned using a CE router connected to a broadband Internet circuit. Alternatively, IPSEC may be implemented at the PE routers or device. AN MPLS network with IPSEC features is also sometimes also referred to as an IPSEC VPN or IPVPN network.

For example, IPSEC VPN can access MPLS networks on the edge, which may be a low cost approach for branch connectivity. However, while typical IPSEC VPN can offer low price tag and reach, it lacks traffic prioritization/CoS capabilities and may be hindered by poor provider Service Level Agreement (SLA) and/or Mean Time to Repair (MTTR). IPSEC VPN for MPLS Edge has not been innovated.

Generally speaking, the MPLS market in North America is growing quickly, however, price of MPLS is suffering from commoditization of private networks and from customer demand for lower prices. Despite such constraints, purchasing MPLS network can be as much as 30% more expensive compared to getting typical broadband network. Many customers are seeking an IPVPN solution with a lower price tag and increased bandwidth. For example, many MPLS customers seek an IPVPN backup solution on top of their primary network. These customers may also desire alternative network providers, technologies and implementations (e.g. 4G, other broadband solutions). Today IPVPN is typically purchased for cost and reach. However, IPVPN has numerous drawbacks such as the lack of traffic prioritization and CoS capabilities. IPVPN can also be hindered by poor provider service-level agreement (SLA) and mean time to repair (MTTR) on a given service or provider. There is thus a need for an innovative network solution that provides better network performance and quality of service.

Link Aggregation with MPLS

For customers who want to have an end-to-end VPN or MPLS network, at least one issue with MPLS networks is that they do not typically extend to the actual customer or client sites as the PE or ingress routers defining the "edge" of the MPLS network core are typically situated at network providers' premises. In order to maintain the high level of performance provided by an MPLS (with or without IPSEC) network, a solution is required to connect the client site to the MPLS network at the PE routers. To date, some form of link aggregation technology has been occasionally adapted to fill the gap between the MPLS PE routers and the actual client site(s). However, in the current state of the art, most link aggregation technologies cannot connect to dissimilar or diverse carriers or connections.

An MPLS network or Enterprise WAN is typically sold as a private product or service and thus cannot offer diverse carriers or network providers, but rather require physical local loop to the end customer using the same carrier or network provider.

In a market research, drivers for corporations to choose a network architecture solution may include:
  Demand for low-cost IP network services to converge business applications
  Support for multiple access technologies
  Cost competitiveness against MPLS and IPVPN
  Support for traffic prioritization
Reasons for deploying a network architecture solution may include:
  Improved operational efficiency/lower OPEX
  Improved service scalability (quick & simplified service deployment)
  Link major company sites/facilities
  Consolidate converged applications (voice, data, Internet, video)
  Focus on core business while provider manages the routing
  Reduce IT/Telecom staff
Criteria for selecting WAN network architecture solution and services may include:
  Security
  Price and pricing structure complexity
  Service reliability/QoS
  Adequate guaranteed bandwidth
  Service availability at key sites (geographic reach)
  Performance/SLA guarantees
  Operation/OPEX costs
  Interoperability with existing network and access services
  Self-service portals and customer support/customer care
  Flexibility/scalability (quick service provisioning/bandwidth changes)
  CAPEX/equipment costs (including ability to leverage existing CPE)

Examples are described herein in relation to MPLS as an illustrative example transport mechanism where data packets are assigned labels. This is an example only and other transport mechanisms may be used with different labeling or encapsulation techniques.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

MPLS Edge

Some embodiments may involve an MPLS network as an example network. MPLS Edge is an improved alternative to IPSEC VPN on the MPLS network. In one aspect, Autonomous Network Aggregation (ANA) or a network bonding/aggregation technology can be used as part of a hybrid solution to extend an MPLS network, allowing partners to use lower-cost broadband connectivity while maintaining the quality and reliability of an MPLS service. In another aspect, MPLS Edge virtualizes MPLS over network bonding/aggregation on the edge of carrier infrastructures, delivering MPLS labels to the customer premises equipment or device coupled with network bonding/aggregation. For example, cloud concentrators in ANA or a link aggregation system may act as an MPLS PE (Provider Edge) router on the edge of the network.

Most existing prior art link aggregation technologies cannot connect to dissimilar or diverse network carriers or connections. In addition, MPLS network is typically sold as a private product or service and thus cannot offer diverse carriers or network providers, but rather require physical local loop to the end customer using the same carrier or network provider. Using the network bonding/aggregation technology with MPLS network as described herein allows for the utilization of diverse carriers and diverse connections via high-quality link aggregation in combination with a secured and trusted MPLS network.

MPLS Edge technology can extend an MPLS network to the customer's LAN as a private service offering that can deliver consolidated WAN, VoIP, and Internet access.

In one aspect of embodiments described herein, a system and network architecture is provided for aggregating multiple network access connections from similar or diverse carriers to create a new aggregated connection that accommodates greater speed and high availability characteristics, and that connects to an MPLS network via customer premises equipment (CPE-CE) or cloud concentrator/provider equipment (CCPE).

In another aspect of embodiments described herein, a network solution is provided for improving network communication performance between at least two sites, where the two sites are at a distance from one another that is such that would usually require long haul network communication. The network solutions includes at least one network bonding/aggregation system that includes (A) at least one first network component that is implemented at a first service site, the first network component being configured to bond or aggregate one or more diverse network connections so as to configure a bonded/aggregated connection that has increased throughput; and (B) a second network component, configured to interoperate with the first network component, the second network component including a server/concentrator (also referred to as network server component) that is implemented at an access or point-of-entry point to a multiple protocol label switching network. Multiprotocol label switching (MPLS) is a network mechanism that directs data between network using path labels rather than network addresses, avoiding complex routing table lookups. The labels identify virtual links or paths between nodes rather than endpoints. MPLS can encapsulate packets of various network protocols and supports a range of access technologies. As will be described herein, embodiments described herein may provide a virtual edge provide encryption over the bonded/aggregated network connection.

In one aspect, the first network component may be implemented using what is called in this disclosure a "CPE-CE" or customer premises equipment (also referred to as customer edge (CE) router or client site network component). The CPE-CE and a server/concentrator (also known as a Cloud Concentrator Provider Equipment CCPE) component (more fully described below) interoperate to configure the bonded/aggregated connections in order to provide improved network connections at a site associated with the CPE-CE. The CPE-CE may involve a third party router that may be particularly configured in accordance with embodiments to provide the bonded/aggregated network connection. This configuration may involve separating lower-link data traffic on third party routers by removing default routing information and adding routes on each respective lower-link for the corresponding concentrator lower-link IP address. This configuration may further involve using a common access protocol for encapsulation of lower-link data packets. Further configuration details are described herein. The CPE-CE may be implemented using a virtual edge, as will be described herein.

In one aspect of the embodiments described herein, the server/concentrator is implemented at an access or point-of-entry point to an MPLS network or other network, with access to the network backbone provided by an MPLS networking solution so as to provide a high-quality, end-to-end, secured network connection. The server/concentrator may provide a bridge between the bonded/aggregated network and the broadband network portion to deliver MPLS to the CPE. The server/concentrator may be configured to operate as a provider edge or point-of-entry (PE) router on the MPLS network. As will be described below, MPLS is protocol independent and supports a bonded/aggregated network supported protocol. This is an example protocol described for illustrative purpose.

The server/concentrator may also support lower-link encapsulation to be compatible with CPE-CE routers that are configured to provide separation and encapsulation of lower-link data traffic.

In addition, the server/concentrator may be implemented as a cloud service, a cluster service or simply a cluster hosted in cloud, or a router server configured based on certain configurations. It may also be referred to as a cluster or a cloud concentrator throughout this application. The clusters or cloud concentrators may serve multiple CPE-CEs. A client site may have multiple CPE-CEs and a cluster can serve multiple client sites. The clusters or cloud concentrators may also communicate with one another on a basis of multiple points-of-presence ("Multi-POP"), as will be described below.

In another embodiment, the server/concentrator (or network server component) may be remotely or closely coupled with one or more CPE-CEs, and comprise of software, or entirely of hardware, or include both software and hardware components. The server/concentrator may be implemented to one or more server computers, or may be implemented as an interconnected network of computer residing at the same or different physical locations, and connected to one or more CPE-CEs and the core network (e.g. MPLS or other protocol) through one or more trusted network connections. The server/concentrator can interoperate with CPE-CEs and/or the other components in the network architecture in order to deliver the functionalities described herein.

Network architectures that involve long-haul bonded/aggregated network communication result in less than optimal performance, thereby minimizing the advantages of the bonding/aggregation technology. In other words, while the bonding/aggregation technology may improve service to Site A associated with for example a CPE (or equivalent to customer premises equipment), based on bonding/aggregation between the CPE and an associated server/concentrator (or equivalent such as a cloud concentrator), overall performance may be less than desired and in fact may be less than what would be available without bonding/aggregation because of the long haul effects of carrying the bonded/aggregated from Site A, to at least Site B. These long haul effects will present wherever Site A and at least Site B are at a substantial distance from one another. The Example in Operation described below illustrates the decrease in performance that results from the long haul effects. In one exemplary embodiment of the invention, the CCPE may be implemented with virtualization software such as vmWare, vSphere5, Citrix Xen, and so on.

Referring now to FIG. 1a, which illustrates the problem of long haul aggregation/bonding generally. In a bonded/aggregated network communication shown in FIG. 1a, packets are carried over the Internet through an extension of the bonded/aggregated connection across the Internet (102), rather than a high performing Internet core network such as an MPLS core network. The bonded/aggregated connection, across a distance that is subject to long haul effects, will not perform as well as the Internet, thereby providing less than ideal performance.

Figure 1B:
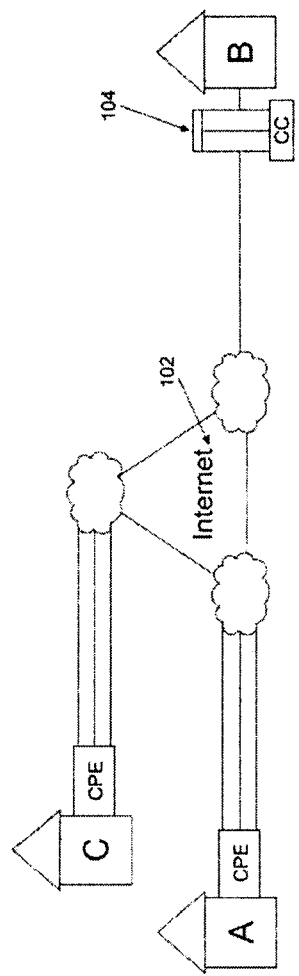
FIG. 1b also illustrates a prior art network configuration that includes central management of bonded/aggregated network connections, which also shows the problem of long-haul aggregation/bonding with multiple customer sites.

Another problem with some bonding/aggregation solutions is that they generally require control or management by a central server. Depending on the location of the central server, this can result in multiplying the long haul effects because traffic between Site A and Site B may need to also be transferred to a Site C that is associated with the central server. This aspect of the prior art technology is illustrated for example in FIG. 1b. Central server (104) manages network communications, and routes network communications between Site A and Site C. To the extent that the distance between central servers (104) is substantial from either of Site A or Site C, long haul effects will present. If central server (104) is at a substantial distance from each of Site A and Site C, then there will be a multiplying of the long haul effects, as network traffic will pass from Site A to the central server (104) to Site C, and from Site C to the central server (104) to Site A.

As illustrated in the Example in Operation described below, long haul effects have a negative impact on speed (slowing traffic) and also on latency. Conversely, embodiments of the present invention may provide significant improvements in regards to both speed and latency.

Embodiments of the present invention provide a network solution, including a network system and architecture and associated networking method that addresses the aforesaid long haul effects that have a negative effect on performance.

Figure 1C:
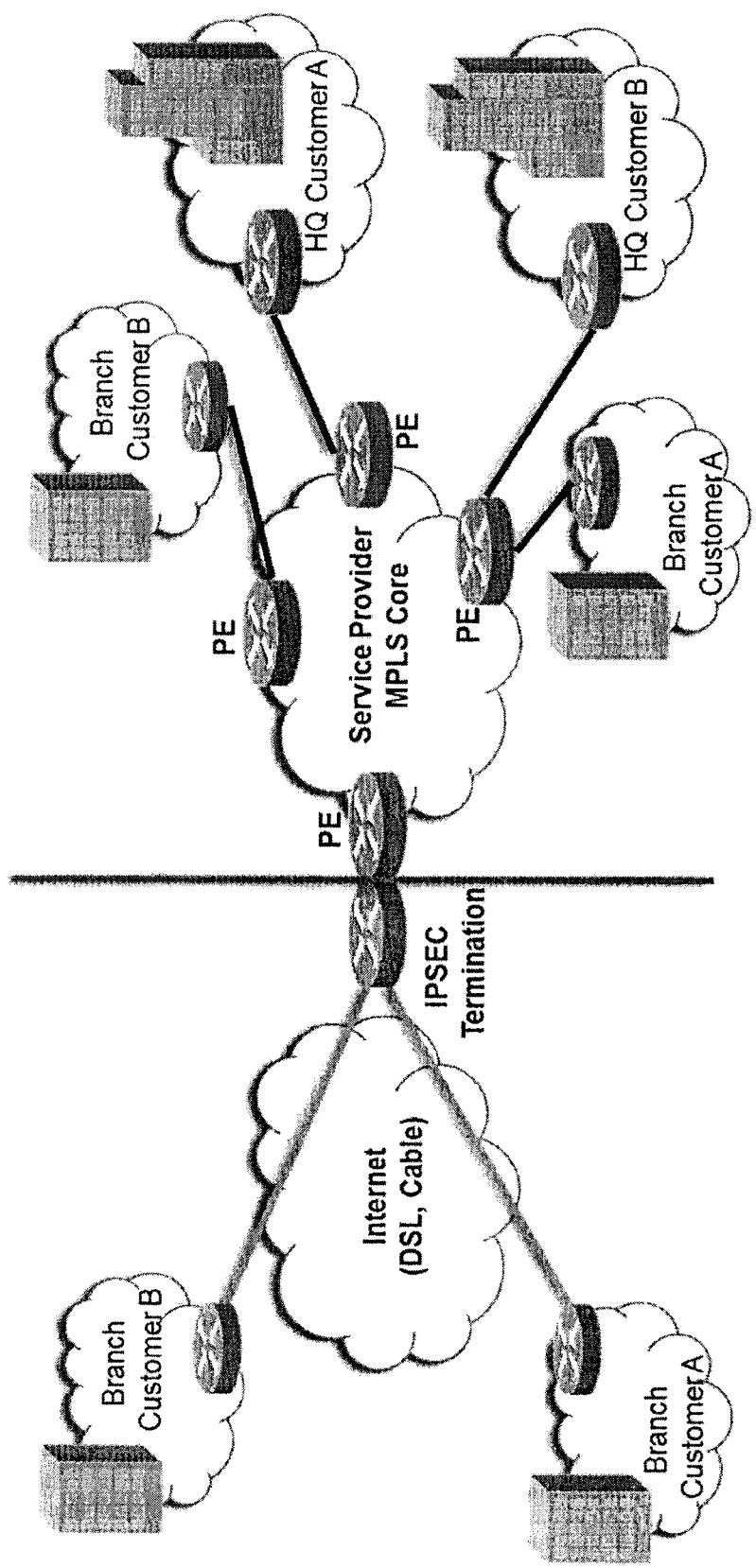
FIG. 1c illustrates a prior art MPLS network configuration with IPSEC embedded.

FIG. 1c illustrates a prior art MPLS network configuration with IPSEC embedded therein. In the prior art MPLS network shown in FIG. 1c, packets are carried over the Internet through a single connection such as DSL or cable, from Branch Customers A or B (e.g. Sites A or B) to one PE router of MPLS. An IPSEC tunnel may be implemented between the Branch Customers A or B to the MPLS PE router, and terminated immediately before or at the PE router. The PE router therefore fulfills two tasks: IPSEC remote access termination and providing an MPLS PE router. IPSEC in this prior art configuration serves mainly as a secure access method into the MPLS network. The protection of IPSEC secures the data on transport over any untrusted infrastructure, such as public WIFI hot spots or DSL Internet.

As can be seen from FIG. 1c, the network path from Branch Customer A or B to IPSEC Termination may be over a sole connection that can be, for example, a cable or a DSL connection. If the cable connection from Branch Customer A fails for any reason, then that customer would not be able to connect to the MPLS network as there is no alternative Internet connection available. In contrast, embodiments of the present invention provide significant improvements in regards to a number of additional features such as bi-directional communication, failover protection and diversity of carriers.

Though not illustrated here, it is understood that IPSEC tunnel may also be implemented from one PE router to another PE router over the MPLS network core or from Branch Customer A to HQ Customer B (CPE-CE to CPE-CE). Regardless of the particular configuration of IPSEC over MPLS, MPLS networks with embedded IPSEC are very costly to set up, difficult to maintain and reconfigure, and generally leave much to be desired in terms of carrier diversity, failover protection, aggregated bandwidth, bi-directional communication, quality of service (QoS), prevention of dropped calls, application acceleration, and scoring of quality of experience (QoE), to name a few.

Figure 2A:
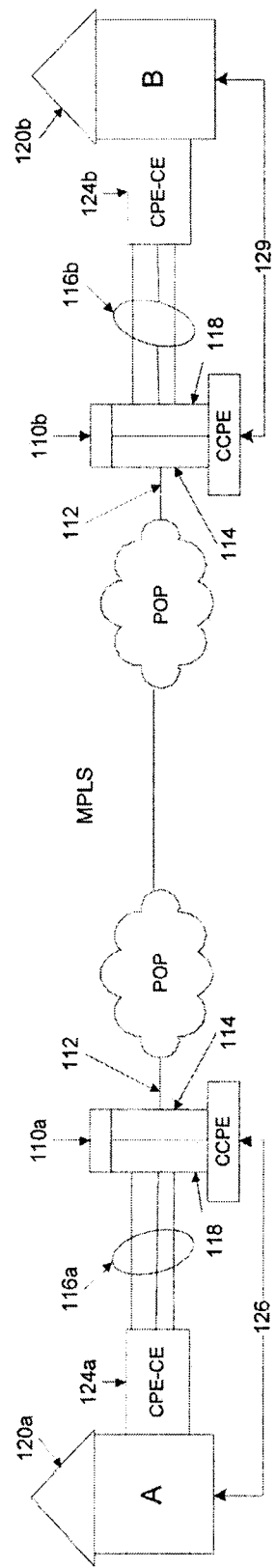
FIG. 2a shows a network solution in accordance with an embodiment of the present invention, with bonding/aggregation implemented at both Site A and Site B, while minimizing long haul effects based on the technology of the present invention.

As shown in FIG. 2a, in one aspect of embodiments described herein, the server/concentrator (or otherwise known as cloud concentrator) side of a bonding/aggregation network solution for Site A (120a) is implemented such that (A) the location of the cloud concentrator (110a) is implemented with access to the network core of MPLS (112), and (B) the cloud concentrator (110a) includes functionality for (i) receiving packets by means of the bonded/aggregated connection (116a), (ii) interrupting the bonded/aggregated connection (116a) using an interrupter (118), and (iii) directing the packets (114) to the MPLS (112) for delivery to a Site B (120b). In the case of (iii) directing the packets (114) to the MPLS (112), the cloud concentrator (110a) is also acting as the PE router of MPLS (112). The cloud concentrator (or the server/concentrator) (110a) thus is also known as the cloud concentrator provider edge or the cloud concentrator point-of-entry (CCPE) of the MPLS. If Site B also has bonded/aggregated network service, then the packets are delivered to a Site B side cloud concentrator or CCPE (110b). The CCPE (110b) can then establish a further bonded/aggregated connection (116b) and directs the packets (114) via the bonded/aggregated connection (116b) to a CPE-CE (B) (124b) at Site B.

In some embodiment, the MPLS network 112 may also be Wide Area Network WAN 112.

Figure 2B:
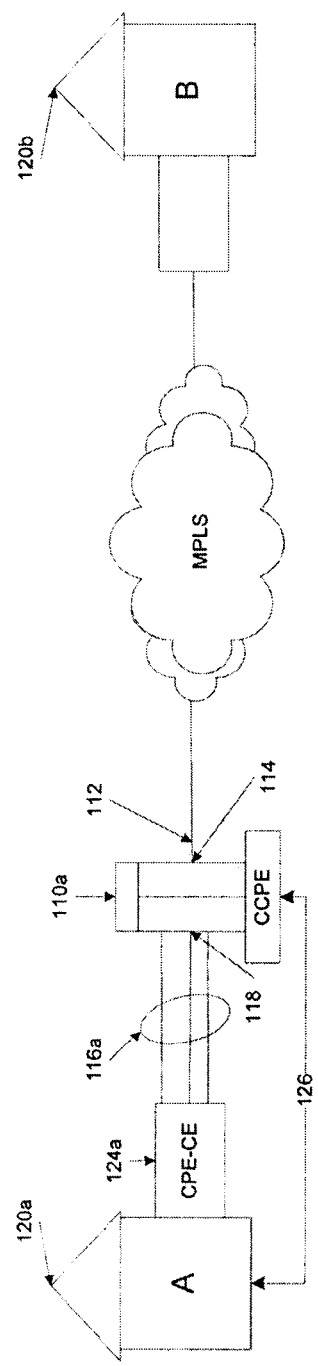
FIG. 2b shows another network solution in accordance with an embodiment of the present invention, in which bonded/aggregated network service exists at Site A but not at Site B.

FIG. 2b illustrates a configuration where bonded/aggregated network service exists at Site A but not at Site B.

Figure 2C:
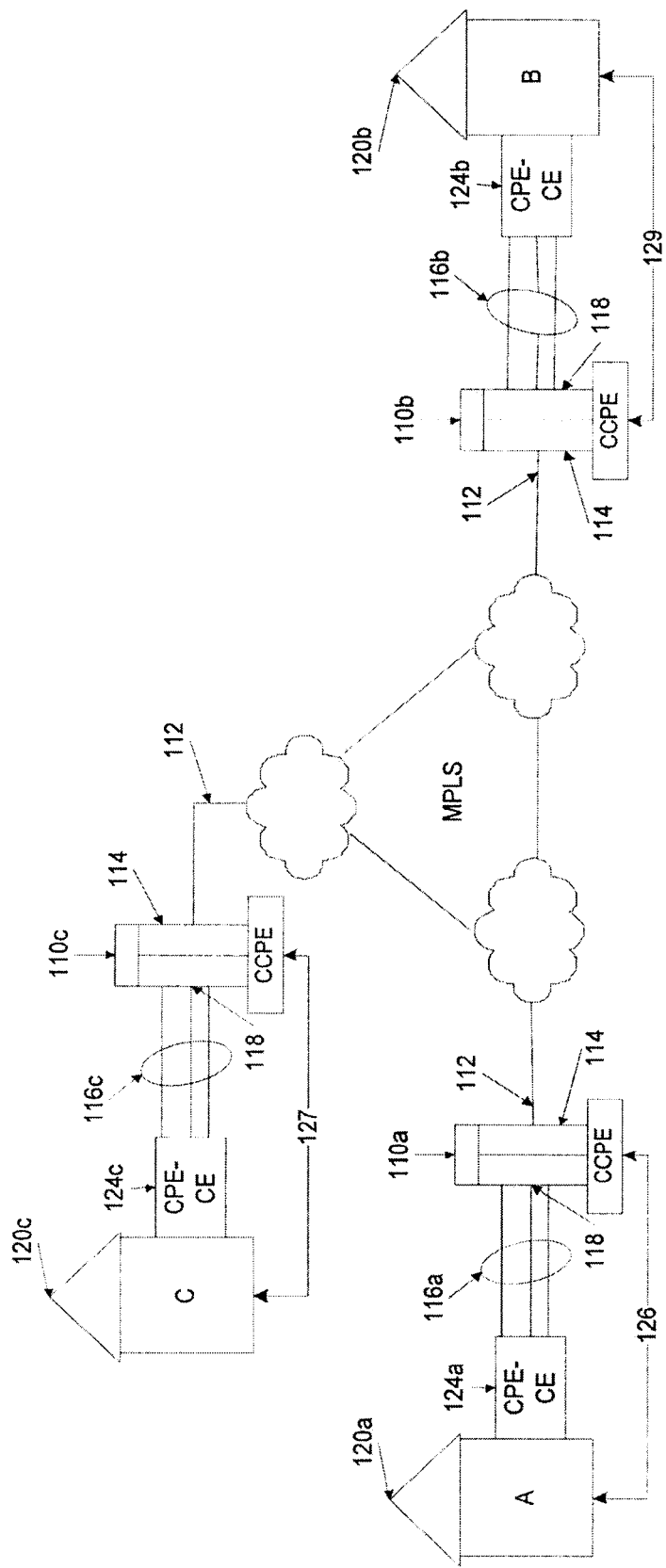
FIG. 2c shows a still other network solution in accordance with an embodiment of the present invention, in which bonding/aggregation is implemented as between Site A, Site B, and Site C.

More than two sites are possible, where the network system of an embodiment improves network performance for network communications between for example Site A, Site B, and Site C where one or more sites will include bonded/aggregated service. In one implementation, as shown in FIG. 2c, bonded/aggregated service is present for each of Site A, Site B and Site C. FIG. 2c illustrates one possible implementation, where the network system is based on a distributed network architecture where CCPEs (110*a*) (110*b*) (110*c*) and corresponding CPE-CEs (124*a*) (124*b*) (124*c*) are configured to provide improved network communications, including interruption of network communications at the network backbone so as to reduce long haul effects, dynamically and on a peer to peer basis without the need for a persistent central manager. In one implementation, each of the network components of the network system included functionality to operate on a peer-to-peer basis.

A CPE-CE (124) initiates network communications on a bonded/aggregated basis, cooperating with a CCPE (110), with packets destined for a remote location. Each CCPE (110) receives dynamic updates including a location and identifier associated with other CCPE (110). Packets are dynamically sent to a CCPE (110) at the remote location, if available, and from the CCPE (110) at the remote location to its CPE-CE (124). The CPE-CEs (124) and their CCPEs (110) use bi-directional control of network communications to establish a network overlay to provide improved network performance. The network overlay for example provides desirable quality of service despite underlying network conditions that may otherwise result in a decrease in network performance.

In accordance with embodiments described herein, the network system establishes and manages two or more network overlays. Referring for example to FIG. 2*a* a first network overlay (126) is established between the CPE-CE (A) (124*a*) and CCPE (110*a*); then, communications are transferred over the MPLS (112) without a network overlay; then, a second network overlay (129) is established between CCPE (110*b*) and CPE-CE(B) (124*b*). As a result, IP transport is provided between Site A and Site B where this will provide better performance than the aggregated/bonded network connections. Bonding/aggregation in effect is distributed across the locations, rather than attempting to span the distance between the locations with end to end bonding/aggregation.

Embodiments therefore provide distributed bonding/aggregation. Embodiments also provide a network system that automatically provides distributed bonding/aggregation in a way that bonding/aggregation is proximal, and beyond proximal connections IP transport is used, with proximal bonded/aggregated connections and fast Internet being used as part of end-to-end improved service.

In addition, system elements enabling the monitoring and maintenance of Quality of Experience (QoE) and Quality of Services (QoS) may be optionally included in the CCPE and/or CPE-CE configuration. As will described herein, an intelligent packet distribution engine may be supported to implement QoE and QoS functionality. In another example, the QoE and QoS elements may be implemented as part of the underlying link aggregation technology.

Embodiments may offer advantages over the prior art technologies, including, for example:
1. Suited for voice and data transmission:
SLA Supported with Quality of Experience (QoE)
Bi-Directional QoS
OTT QoS Maintains CoS
No Dropped Calls on Link Failover
2. Carrier diversity, including network aggregation and failover protection
3. Failover: no disconnections on failover scenarios
4. Aggregated bandwidth: more reach options and scale
5. Bi-directional communication
6. Network quality of service (QoS)
7. Application acceleration
8. Quality of Experience These are illustrative non-limiting examples. Combining diverse networks (MPLS, WAN) with the link aggregation/bonding technology in accordance with exemplary embodiments may satisfy end customer needs on the network, including, for example:
Use of multiple low cost broadband circuits (for greater uptime and resiliency).
Support of prioritization and CoS for priority traffic.
Hybrid MPLS or backup network strategy without having to abandon MPLS features.
The cloud concentrator would bridge the MPLS portion of a customer's network to the broadband portion using network aggregation delivering MPLS to the CPE device (MPLS added to link aggregation technology as a supported Protocol).

Figure 2D:
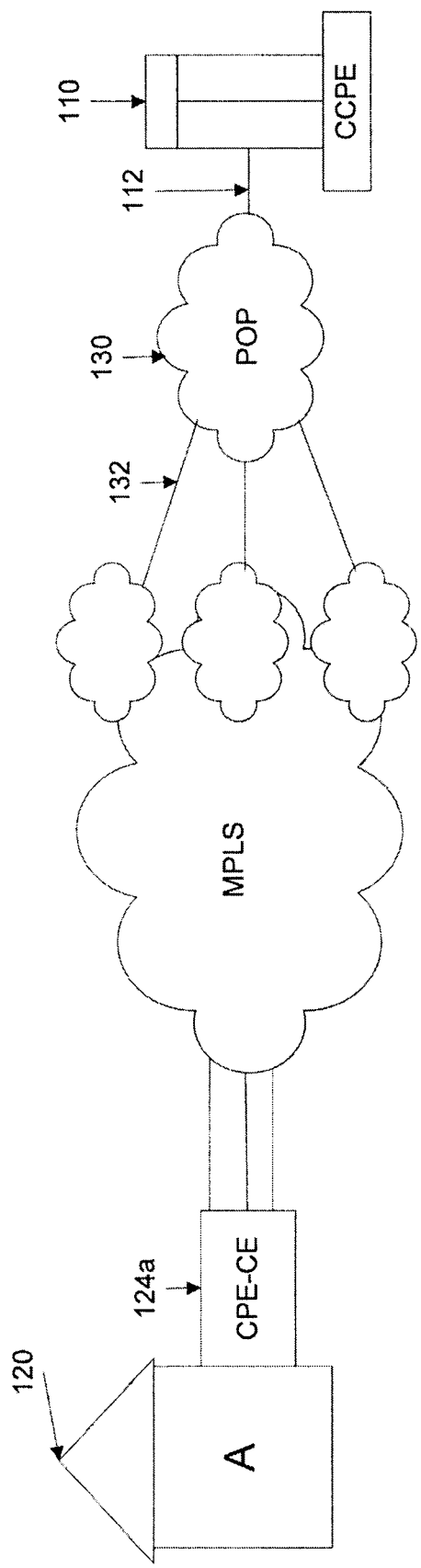
FIG. 2d shows a further implementation of the network architecture of an embodiment of the present invention, in which a plurality of servers/concentrators are implemented as part of a Point-of-Presence.

In another aspect of embodiments, and as shown in FIG. 2*d*, one or more CCPEs can be implemented at a given physical location, as part of a Point-of Presence (PoP) (130). In one aspect, a PoP (130) can define a relatively high concentration of servers, concentrators, and/or CCPEs within an area. In another aspect, a plurality of PoPs (130) may be available in a given geographic location. A plurality of PoPs (130) may be established based on network topology or service requirements in a given area.

In one aspect, each PoP (130) may have one or more network backbone connections (132), because in some locations different network backbones, such as a wireless Internet, a private data network, or the MPLS network, may be available. The PoP (130) may be implemented so that it dynamically interoperates with surrounding networks. The PoP (130) is a collection of network components, established at the periphery of the network backbone (112), associated with a plurality of networks, and cumulatively providing network communication service to one or more clients in a defined geographic area. In one possible implementation, the server/concentrators or CCPEs (110) located within the PoP (130) functions as a network access server for connecting to the Internet or the MPLS (112). The network access server (110) acts as the access point to the Internet (112) for a plurality of CPE devices (124) that are connected to the PoP (130). The servers/concentrators or CCPEs (110) may be configured to communicate with one another to share information regarding network conditions. Servers/concentrators and CCPEs (110) provide connectivity to CPEs and CPE-CEs (124) and may also run a networking protocol such as BGP to route servers and other network backbone connections (112).

In one aspect, servers/concentrators and CCPEs (110) are configured to detect changes in their network environment.

The CPE-CE (124) may be configured to collect information from network components in its vicinity including from one or more available PoPs (130) and their CCPEs (110). The CPE-CE (124) for example connects to a closest available CCPE (124), implemented as part of a PoP (130), and thereby having access to a connection to the MPLS network core (112). Whether the connection to the network core (112) is direct or indirect, the network connections are established so as to minimize long haul effects.

In one implementation, each CPE-CE (124) establishes a connection by dynamically advertising its IP address, and receiving replies from associated CCPE (110) along with their current network performance information. The CPE-CE (124) initiates a bonded/aggregated connection with a CCPE (110) that is proximal (to minimize long haul effects between the CPE-CE (124) to the MPLS network core (112)), and also performing well based on network conditions relevant to the particular CCPE.

In one implementation, a network device is deployed that bonds or aggregates multiple, diverse links. The network device may be WAN aggregator or a link aggregator.

Once the network overlay is established, various other network optimization and quality of services ("QoS") techniques may be applied.

One or more CPE-CEs and one or more CCPEs can create various different network configurations that may improve network performance in relation to network communications there between. In one embodiment of the invention, the CPE-CEs and CCPEs are designed to be self-configuring and self-healing, and to interoperate with one another to manage traffic in a more effective way.

"Proximal" means a distance such that based on relevant network conditions; long haul network communication and associated effects are avoided. The distance between the CPE-CE and the CCPE may be proximal.

In order to take advantage of the network architecture of embodiments described, the CCPE (110) can be located at an access point to the MPLS network core (112) or in some other way to minimize the long haul effect, for example, by the CCPE being located proximal to an access point so as to further avoid long haul network communication.

In another aspect of embodiments described herein, the bonded/aggregated connection at Site A and the bonded/aggregated connection at Site B may be different. In particular, each may include different types of network connections and that may be associated with different carriers. In one aspect of embodiments described herein, the network overlay provided operates notwithstanding such diversity.

Typically, the more sites that have the CPE-CEs/CCPEs associated with them the better network performance between them. Representative performance details are included herein.

The network backbone (112) could be any high performance network including for example a private WAN, the Internet, or an MPLS network.

Network Overlay

In one aspect of the embodiments described herein, one or more network overlays are established, thereby in one aspect providing a multi-POP network that exploits multiple points of presence so as to provide a persistent, configurable/reconfigurable network configuration that provides substantial network performance improvements over prior art methods. In one aspect of embodiments described herein, the CPE-CEs/CCPEs may monitor network performance, including in the areas proximate to their position, and may reconfigure the network overlay dynamically, across multiple locations (including multiple PoPs) based on changes in MPLS network performance while providing continuity of service. The network overlay may be made up of multiple virtual connections, such as virtual edge and virtual core connections, as described herein.

In one aspect, the network components of embodiments described herein are intelligent, and iteratively collect network performance information. Significantly, in one aspect each CPE-CE is able to direct associated concentrator(s)/CCPE and any CPE-CE to in aggregate re-configure the network overlay.

Significantly, in the network overlay created by the embodiments described herein management of the network may be centralized or decentralized, depending on the configuration that provides the best overall performance. This is in contrast to prior art solutions that generally require central management for example of termination of connection which results in traffic being carrier over bonded/aggregated connection that involve long haul transmission that fail to take advantage of network paths that may provide inherently better performance than the bonded/aggregated connection paths.

In one aspect, decentralized managed is made possible by peer-to-peer functionality implemented to the network components of the embodiments described herein.

In another aspect, a plurality of CCPEs may be established in multiple locations covering a plurality of different access points. Each CCPE may be used for multiple clients associated with different CPE-CEs to improve network performance for such multiple clients by providing termination of their bonded/aggregated connection, routing of communications, and encapsulation of packets to the MPLS network core. The network solution therefore may include multiple Points-of-Presence, distributed geographically including for example in areas requiring network service, and through the network architecture bridging geographically disparate areas with improved network communication.

Additional Implementation Detail

As previously stated, the present invention may be implemented in connection with any technology for bonding or aggregating links, and thereby reduce long haul effects. The present invention may also be implemented with any kind of MPLS network, thereby providing a high-performance, secure, end-to-end network connection between various client or customer sites.

In one aspect of embodiments described herein, the system, method and network architecture may be implemented such that the aggregated/bonded network connections described are implemented using the link aggregation technology described in U.S. Pat. No. 8,155,158. In another aspect of embodiments described herein, the system, method and network architecture may be implemented using one or more Points-of-Presences as described in patent application Ser. No. 13/958,009. What follows is additional detail regarding link aggregation/bonding in combination with an MPLS network, emphasizing the creation and management of the bonded/aggregated connections between them, and the encapsulation at CCPEs, which in the network configuration of the present invention may form a part of the overall network overlay that incorporates the one or more portions that are carried over the network backbone.

Diverse network connections may be aggregated into virtual (logical) connections that provide higher throughput as well as independence of the network characteristics of the constituent (physical) network. Aggregation may be performed at a given CPE-CE.

For instance, in one example implementation, a Metro Ethernet 10 Mbps (E10) link and a T1 (DS1) link are aggregated in accordance with embodiments described herein, in order to provide higher fault tolerance and improved access speeds. The aggregation of diverse carriers may extend to any broadband network connection including Digital Subscriber Line (DSL) communications links, Data over Cable Service Interface Specification (DOCSIS), Integrated Services Digital Network, Multi-protocol Label Switching, Asynchronous Transfer Mode (ATM), and Ethernet, etc. The network connections may also include a WAN.

According to one aspect of embodiments described herein, an apparatus is provided for managing transfer of communication traffic over diverse network connections aggregated into a single autonomous connection, independent of the various underlying network connections. The apparatus may include a network aggregation device and an aggregation engine. The network aggregation device may be adapted to configure a plurality of network connections, and transfer communication traffic between a further network connection and the plurality of network connections, as an aggregated group for providing a transfer rate on the further communication link, and to allocate to the aggregate group a rate of transfer equal to the total available transfer rate of the underlying networks. The aggregation engine may be adapted to manage the distribution of communication traffic received both to and from a plurality of network connections, establishing newly formed aggregated network connections. The aggregation engine may be implemented in software for execution by a processor, or in hardware.

In accordance with this aspect of embodiments described herein, a plurality of diverse network connections may be aggregated to create an aggregated network connection. The diversity of the network connections may be a result of diversity in provider networks due to the usage of different equipment vendors, network architectures/topologies, internal routing protocols, transmission media and even routing policies. These diversities may lead to different network connections with different latencies and/or jitter on the network connection. Also, variation within transmission paths in a single provider network may lead to latency and/or jitter variations within a network connection.

Latency and jitter typically affect all data communication across the network connection. Latency is the round-trip time for a transmission occurring end-to-end on a network connection. Jitter is the variance in latency on a network connection for the same data flow. High latency and jitter typically have a direct and significant impact on application performance and bandwidth. Applications such as VOIP, and video delivery are typically highly sensitive to jitter and latency increases and can degrade as they increase.

Transparent aggregation of a plurality of network connections in an aggregated network connection requires the management of data transmitted over the aggregated connection by the aggregation engine and received from the aggregation traffic termination engine. In one aspect, transparent aggregation does not require any configuration by a network provider. The aggregation engine and the aggregation traffic termination engine may manage data transmission such that the variable path speeds and latencies on the plurality of network connections do not affect the application data transmitted over the aggregated network connection. The network aggregation engine and the aggregation traffic termination engine may handle sequencing and segmentation of the data transmitted through the aggregated connection to transparently deliver application data through the aggregated connection with minimal possible delay while ensuring the ordered delivery of application data.

In one aspect of embodiments described herein, the network aggregation engine provides a newly aggregated network connection with a capacity equal to the sum of the configured maximum throughput of the network connections.

The aggregation engine and an aggregation traffic termination engine (further explained below) handle the segmentation of packets as required in confirmation with architectural specifications such as Maximum Segment Size (MSS) and Maximum Transmission Unit of the underlying network connections. The network aggregation device is operable to handle assignment of sequence identifiers to packets transmitted through the aggregated network connection for the purpose of maintaining the ordering of transmitted data units over the aggregated network connection.

In a further aspect of embodiments described herein, the network connection device includes or is linked to a connection termination device, and a plurality of fixed or hot swappable transceivers for transmitting communication traffic on respective sets of network connections, for the purpose of configuring a plurality of network connections as an aggregated connection or the management of multiple aggregated network connections and providing access to the aggregated network connection for any network communications traversing the device.

In the present disclosure, routing protocols or route selection mechanisms described are intended only to provide an example but not to limit the scope of the invention in any manner.

Figure 2E:
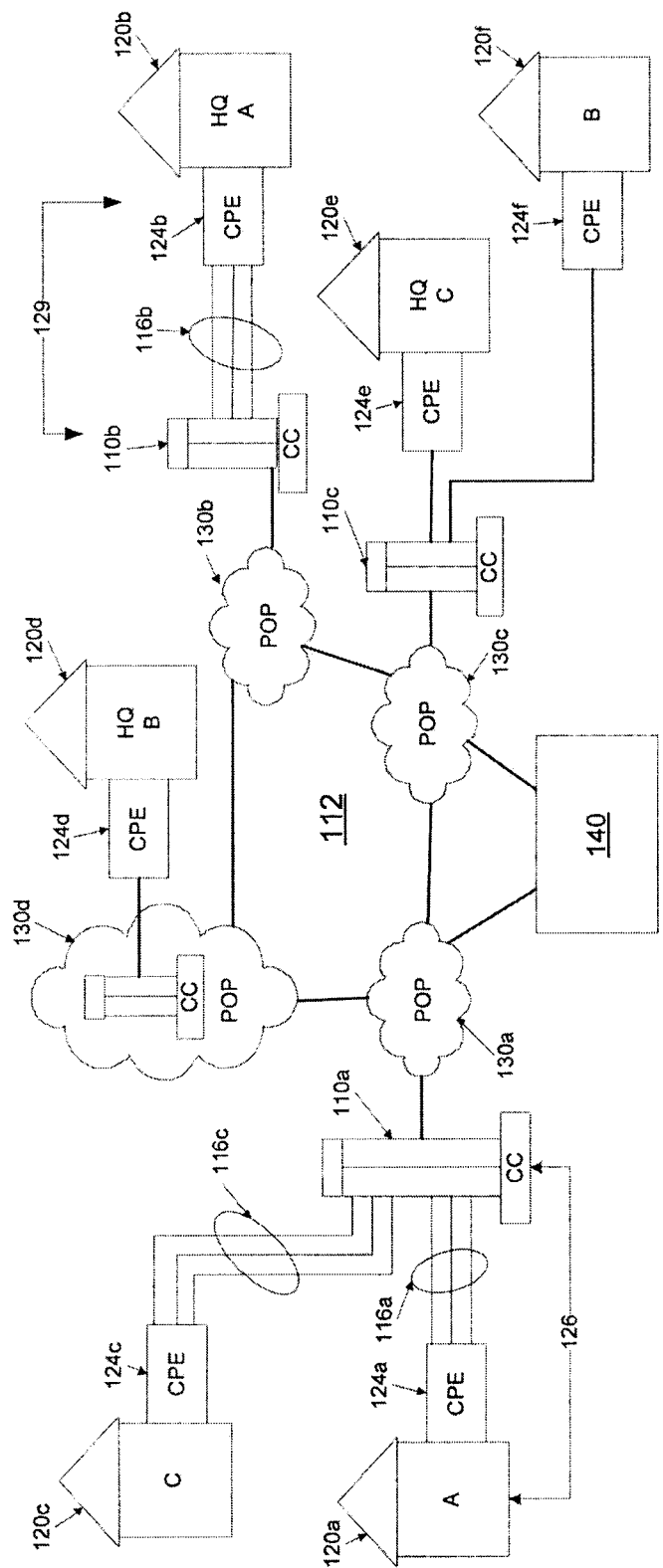
FIG. 2e shows a network solution with bonding/aggregation implemented at both Site A, Headquarter (HQ) A and Site C to connect to a network connecting to Headquarter (HQ) B, Headquarter (HQ) C, and Site B.

FIG. 2e shows an exemplary embodiment of a network solution with bonding/aggregation implemented at both Site A, Headquarter (HQ) A and Site C to connect to an MPLS network connecting to Headquarter (HQ) B, Headquarter (HQ) C, and Site B.

As shown in FIG. 2e, a number of customer sites (120a, 120b, 120c, 120d, 120e, and 120f) are connected to each other via a core network 112, which may provide a secured VPN network solution to multiple users. As an illustrative example, the core network 112 may be an MPLS network. The network backbone is typically provided by one carrier but multiple networks provided by multiple carriers may also be connected via multiple Points-of-Presence (POPs) to form a super network. As can be seen from the exemplary embodiment, each of Site A 120a and Site C 120c has a CPE-CE (124a and 124c, respectively), which is then connected to a CCPE 110a with some form of link aggregation/bonding technology as described elsewhere in this disclosure. The CCPE 110a can be also connected to other CCPEs (not shown) within a Point-of-Presence 130a located closest to Site A 120a and Site C 120c. As mentioned earlier in this disclosure, CCPE 110 also acts as a PE router to a core network 112 in that it takes incoming or inbound traffic or packets, examines each packet and then encapsulates the packet with an appropriate label (e.g. MPLS label) based on a variety of factors. As MPLS can be layer 2 independent, it can work with any layer 2 protocol including but not limited to ATM, frame relay, Ethernet MAC layer, or PPP. Depending on the content of the incoming (un-labeled) packet, CCPE is operable to inspect/examine the destination IP address and other information in the packet header, insert a label into the packet and forward the labeled packet to the output port. Once the labeled packet exits CCPE 110 and enters the MPLS network core 112, another router commonly known as a Label Switch Router (LSR), receives the labeled packet. It examines the label and performs a table loop-up at the forwarding table to find the new label and the output port. The LSR then swaps the old label with the new label and routes the newly labeled packet to the next output port. Other LSRs within the MPLS network will perform the same tasks. Eventually the labeled packet will reach another provider edge router. The provider edge router can then examine the label and perform a table look-up at the forwarding table to find that the packet is to be sent to, for example, CCPE 110c connected to HQ C 120e and Site B 120f. It then removes the label and sends an unlabeled packet to CCPE 110c. CCPE 110c will receive the unlabeled packet and examine the IP header information to determine the final destination e.g. HQ C 120e, Site B 120f, or another destination, such as, e.g., HQ A 120b.

In another exemplary embodiment, CCPE can also act as the provider edge router for data packets exiting (e.g. "outbound data packets") the MPLS network core 112. For example, labeled packets traveling through the MPLS network core 112 can be routed to and reach a CCPE on the edge of the MPLS network. The CCPE can then examine the label of the outbound data packet and perform a table look-up at the forwarding table to determine that the packet is to be sent to a CPE-CE ("destination CPE-CE") connected to the CCPE. The CCPE can further remove the label from the outbound data packet and send it to the destination CPE-CE over ANA link aggregation connections. In some instances the CCPE may determine that the destination CPE-CE may be associated or connected with another CCPE over a POP 130 or the MPLS network core 112, in which case the CCPE may re-encapsulate the data packet if necessary and send it back to the POP and/or MPLS network for further transmission to its final destination. As will be described below, each CCPE may comprise a Network Aggregation Device 23 including a Network Aggregation Engine 11 and an MPLS Data Store 40.

In one aspect of embodiments described herein, encapsulation of data packets by a CCPE 110 can be done as an on-stack protocol implementation by a network aggregation engine 11 (further described below) based on information supplied by an MPLS data store 40 within or connected to the CCPE 110. This way, network data can be transparently sent and received over link aggregation/bonding network 116 by CCPE and CPE-CE. Optionally, the CPE-CE can also implement full MPLS network data encapsulation capabilities.

It is shown that some CCPEs may not be associated with a POP, such as CCPE 110c or 110b. Whether a CCPE is part of a POP may change over time, as CCPE dynamically receives and analyzes real-time data regarding various network characteristics. For example, CCPE 110b may receive information indicating that a commonly used network path has failed due to power outage, it then may decide to seek alternative connection to the MPLS core via the closest POP 130d. Cloud provisioning services 140 may also configure/reconfigure the CCPEs in real time based on a plurality of network characteristics.

It is further shown that some sites such as HQ B 120d, HQ C 120e, and Site B 120f do not have link aggregation/bonding technologies. That is, an MPLS network as described herein and its associated CCPEs may take both link aggregation/bonding connections or typical broadband connections without said link aggregation technology. Depending on what connection it is, a CCPE may adjust accordingly and encapsulates the incoming packets with appropriate labels before forwarding the packets to the MPLS network core 112. A CCPE may also de-label data packets before forwarding the packets to the final destination CPE-CEs for outbound data packets exiting the MPLS network core 112. For greater clarity, a CCPE may act as a provider edge router and provide, in a simultaneous manner, encapsulation and de-labeling functionalities for inbound and outbound data packets respectively.

As an overarching cloud service, some form of cloud provisioning (or zero touch provisioning ZTP) 140 may also be provided to dynamically configure and reconfigure some or all of the CCPEs and all the CPE-CEs.

Benefits of the exemplary embodiments described in this disclosure include: i) the proprietary link aggregation/bonding technology described herein can utilize any kind of network connection, private or public, layer 2 or layer 3; and ii) the CPE-CEs and CCPEs can encapsulate the data packets for transparent interconnectivity across diverse carriers, with the lower-links aggregated. In other words, even though an MPLS network is typically sold as a private offering utilizing diverse physical local loops to the end customer using the same carrier, embodiments described herein can encapsulate over any carrier using any local physical loop, some times without the need to participate at layer 1 network.

The architecture of embodiments can be understood as a centralized architecture for aggregating network connections, broadband or otherwise. Diverse network connections are aggregated into a virtual (logical) connection that provides higher throughput as well as independence of the network characteristics of the constituent (physical) network. The virtual connection can then be connected to an MPLS network in manners as described herein. Aggregation may be performed to a given CPE-CE terminal.

For instance, in one example of the implementation of the present invention a Metro Ethernet 10 Mbps (E10) link and a T1 (DS1) link can be aggregated in accordance with the invention as described below, in order to provide higher fault tolerance and improved access speeds. The aggregation of diverse carriers in accordance with the present invention extends to any broadband network connection including Digital Subscriber Line (DSL) communications links, Data over Cable Service Interface Specification (DOCSIS), Integrated Services Digital Network, Multi-protocol Label Switching, Asynchronous Transfer Mode (ATM), and Ethernet, etc.

The links to be aggregated can be any private or public Internet services such as cable, ADSL, T1, Fibre, xOE (over Ethernet types), wireless, as well as other MPLS connections so long as the network path reaches a CCPE for lower-link processing from a CPE-CE terminal.

Furthermore, the various network configurations shown in FIGS. 2a to 2f allow the use of low cost Internet links on the client side and where appropriate, between a first MPLS network and a second MPLS network, in order to provide connectivity on the client side and manage connectivity to the one or more MPLS network(s). In effect, this network architecture allows one or more MPLS networks to be brought to normal broadband users. Security is provided through the link aggregation/bonding technologies described elsewhere in this disclosure. The various network configurations can further allow various intelligent network performance features to be deployed.

Figure 2F:
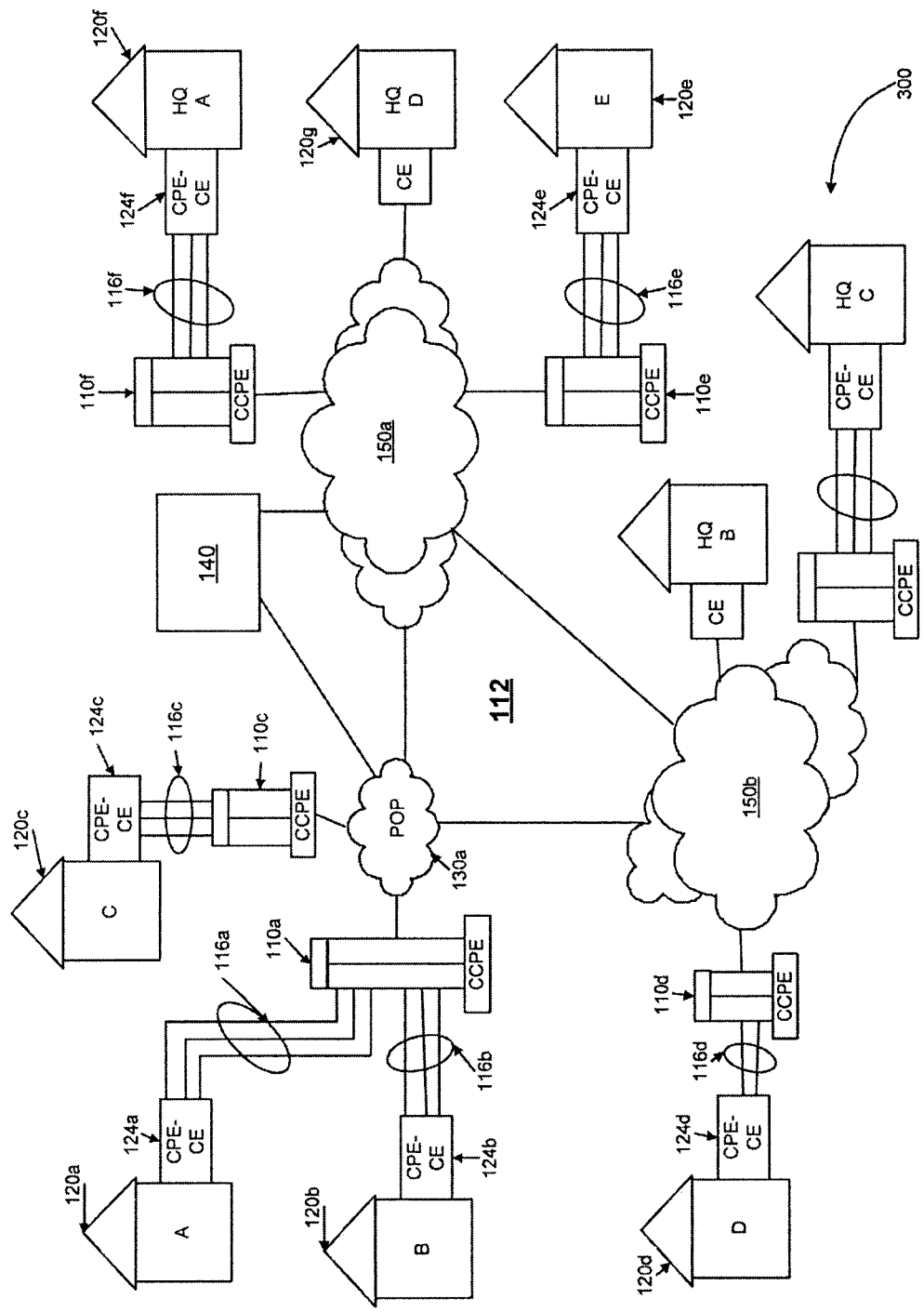
FIG. 2f shows a network solution with bonding/aggregation implemented at Site A, Site B, Site C, Site D, HQ A, HQ C and Site E to connect to a first MPLS network from a first provider connecting and a second MPLS network from a second provider.

Turning now to FIG. 2f, which shows a network solution with bonding/aggregation implemented at Site A, Site B, Site C, Site D, HQ A, HQ C and Site E to connect to a first MPLS network from a first provider connecting and a second MPLS network from a second provider.

As can be seen from FIG. 2f, with the unique advantages of multiple POPs, a plurality of MPLS networks from different MPLS providers can be connected to provide a secure, fast network between different end users. A first MPLS network 150a provided by a first MPLS provider is connected to HQ A 120f, HQ D 120g, and Site E 120e. HQ A 120f and Site E 120e each has link aggregation (116f and 116e) facilitated by CCPEs 124f and 124e, respectively. Similarly, a second MPLS network 150b provided by a second MPLS provider is connected to Site D, HQ B and HQ C. Each of the MPLS networks 150a and 160b can act as part of a POP in the overall network architecture 300. Even though only two MPLS networks are illustrated here, there can be a plurality of MPLS networks not limited to two or any particular total of networks. This way, one can extend an MPLS network to use other MPLS or non-MPLS connections to reach the end customer, whether using static or dynamic IP addressing, and without the participation of carriers.

Specifically, a CCPE 110*a* can be connected to more than one CPE-CE devices 124*a*, 124*b* and 124*c*, supporting a multi-tenant service for multiple customers. That is, a CCPE 110*a* can treat each CPE-CE 124*a*, 124*b* or 124*c* connected to the CCPE independently, with link aggregation 116*a*, 116*b* and 116*c* between each CPE-CE and CCPE.

In another example (not explicitly illustrated), a CCPE can facilitate many CPE-CE's to one CCPE implementation, supporting a multi-tenant service for multiple customers on their own MPLS network. This can be serviced by a single CCPE treating each CPE-CE independently on a tenant instance or MPLS network.

Figure 3:
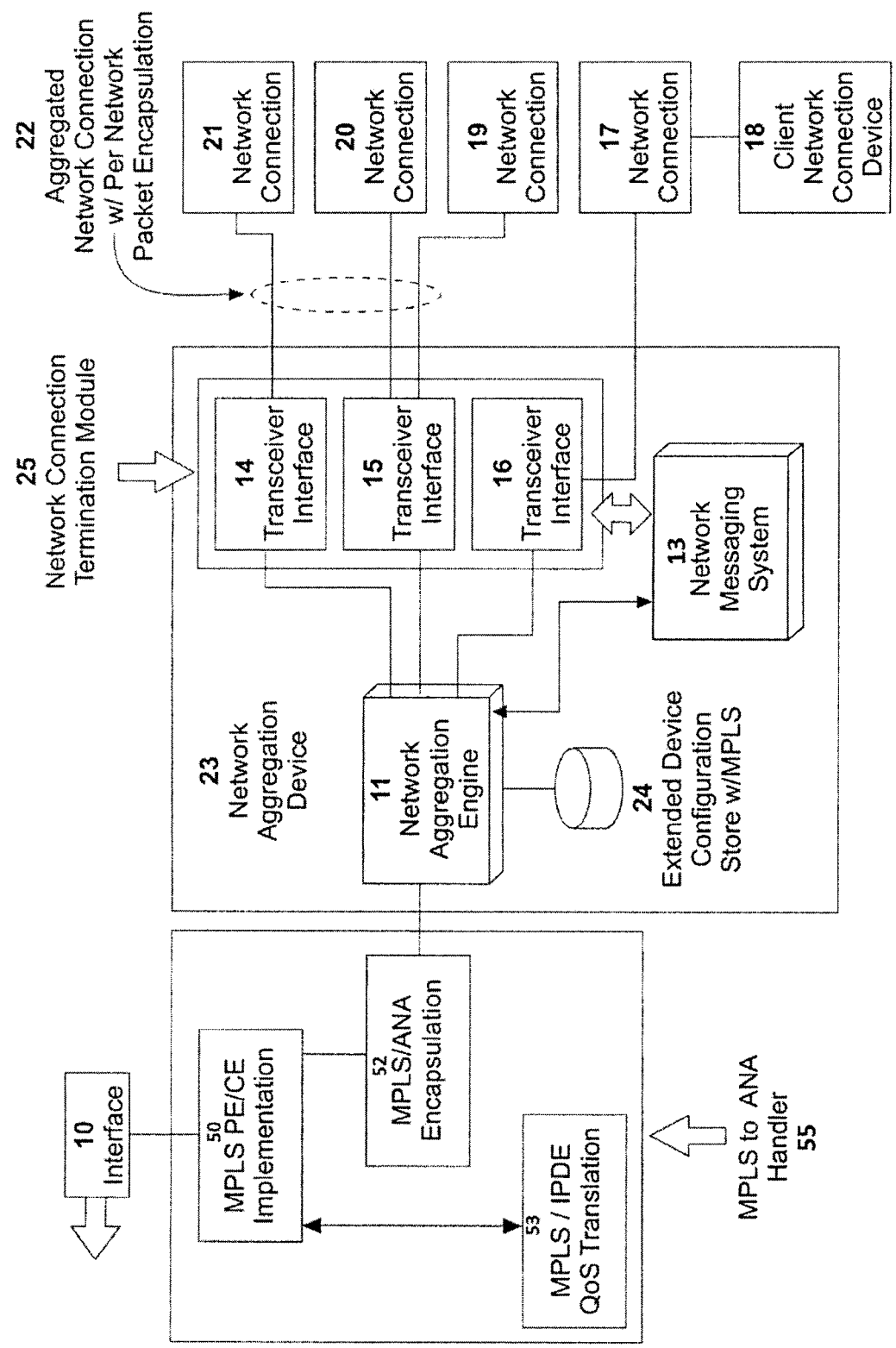
FIG. 3 is a block diagram of a communication device incorporating a particular embodiment of the invention, demonstrating the device as an aggregation means on the client/CPE-CE side of a network connection.

FIG. 3 is a block diagram of a communication device incorporating a particular embodiment of the invention, demonstrating the device acting as a client or CPE-CE.

As shown in FIG. 3, the network element/network aggregation device (also referred to in this disclosure simply as the "device" or the "network aggregation device") 23 includes (in this particular embodiment shown for illustration) a network connection termination module 25 that includes representative transceiver interfaces 14, 15 and 16. Each transceiver interface 14, 15 and 16 represents an interface to a physical communication medium through which communications may be established to network connections.

A possible implementation of the network aggregation device may use a single or multiple chassis with slots for multiple network connection termination modules and multiple network aggregation engine modules. The multiple network connection termination modules may be grouped by protocol specific or medium specific transceiver/interfaces.

The network aggregation engine 11 may handle the configuration of the network aggregation device and all related interactions with external inputs. An extended device configuration store with MPLS capacity 24 may provide persistent data storage for device configuration information such as a network aggregation policy and MPLS related configuration information and policies. MPLS related configuration information may include label lookup table, forwarding table, routing table, labeling and mapping policies, and/or MPLS provider information.

The network aggregation engine 11 may handle queries from external sources, such as configuration parameters a network management protocol such as Simple Network Management Protocol, for example. The interface 10 may be a protocol agent and may provide for communication with a Network Management System (NMS) or operator system for configuration of the aggregation engine by the definition of an aggregation policy. Control and management information may be transferred between the network aggregation device 23 and the NMS or operator system through the interface 10 via any available or specifically designated network connection 19, 20, 21 and 17 through any transceiver interface 14, 15 and 16.

In one exemplary embodiment, the described system can transport MPLS packets back and forth between MPLS core network and ANA link aggregation connection(s) so as to enable extending communication of MPLS packets beyond the edge of the MPLS core network, using ANA link aggregation technology. The system can include specific mechanisms for enabling the transport of the MPLS packets (e.g., data packets leaving MPLS core network and entering ANA) using transcoding/translating and then encapsulation for ANA link aggregation connection(s), in a way that maintains the integrity of the MPLS packet, including processing instructions such as those related to QoS. In the reverse transport flow, MPLS packets (e.g. data packets leaving ANA and entering MPLS core network) can be de-encapsulated to remove ANA protocol and where appropriate, transcoding/translation in order to obtain the original data packet without affecting integrity, and in such a way that can enable further, if any, MPLS processing to happen automatically.

For example, encapsulation, as will be described further herein, can be handled either by MPLS-to-ANA Handler 55. The MPLS-to-ANA Handler 55 can be implemented either as the ANA client, the ANA server and/or the ANA protocol itself.

In accordance with an aspect, multiple network connections may be combined to form an aggregated network connection 22, as disclosed in further detail herein. Each individual network connection may be configured with a maximum communication traffic rate, which could be expressed as a bit rate in bits per second.

The network aggregation engine 11 may be implemented in software for execution by a processor in the network aggregation device 23, or in hardware such as by means of a Field Programmable Gate Array (FPGA) or other integrated circuit, or some combination thereof. The network aggregation engine 11 may be implemented in a distributed manner by distributing aggregation engine intelligence to the network connection termination module 25, in a manner that is known.

The network aggregation engine 11 may receive traffic from client network connection device 18 through a network connection 17 provided through a transceiver interface 16. The client network connection device 18 may be any device including, without limitation, a router, switch, or media converter that is capable of providing termination for a single or multiple client nodes, where nodes are any devices capable of connecting to a network irrespective of protocol or interface specificity. In various embodiments, traffic may be received over multiple network connections through a single or multiple transceiver interfaces. The network aggregation engine 11 may accept all traffic from the client network connection, may provide encapsulation and segmentation services for the traffic for transmission through the aggregated network connection 22, and may transmit it over any of the network connections 19, 20 and 21 through any of the transceiver interfaces 14, 15 and 16. The network aggregation engine 11 may handle segmentation in a manner that avoids the fragmentation of aggregated communication traffic received through the client network connection device 18, when transmission occurs over the aggregated network connection 22 through any of the network connections 19, 20 and 21, by ensuring that the length of a packet/frame transmitted over any of the network connections 19, 20 and 21 is less than or equal to the configured or detected frame length for the respective connections in the aggregated network connection 22.

In the embodiment as shown in FIG. 3, the network aggregation engine 11 may be connected to an MPLS to ANA Handler 55. The engine 55 may comprise an MPLS PE/CE implementation module 50, an MPLS/ANA encapsulation module 52 and an MPLS to IPDE QoS Translation module 53. During operation of transmitting data packets from client site CPE-CE to MPLS core, network aggregation engine 11 may send the packet to the MPLS to ANA Handler 55. The data packet may be encapsulated via MPLS/ANA Encapsulation 52 based on specific MPLS configuration data in the extended device configuration store 24. The encapsulated data packet can then be sent to MPLS PE/CE implementation module 50, which may further provide segmentation in a manner that avoids the fragmentation of aggregated communication traffic received through the client network connection device 18, when transmission occurs over the aggregated network connection 22 through any of the network connections 19, 20 and 21, by ensuring that the length of a packet/frame transmitted over any of the network connections 19, 20 and 21 is less than or equal to the configured or detected frame length for the respective connections in the aggregated network connection 22.

In addition, MPLS to link aggregation (or ANA) transcoding can be performed between the MPLS core and the Customer LAN via the MPLS to ANA Handler 55. In a direction from MPLS core to the edge, as an example, the CCPE MPLS protocol implementation can communicate with the MPLS core recognizing packets that are destined for the customer LAN located over the link aggregation session serviced by the a CCPE implementation. At this point, the data packets with MPLS protocol can be transcoded and transmitted over the link aggregation session to the customer's CPE-CE device with labels intact. When the packets reach the ANA CPE-CE device, the CPE-CE device can transcode from link aggregation ANA to MPLS again and deliver the packets on to the customer LAN.

In one embodiment, the virtual (logical) link aggregated from a variety of diverse or dissimilar network connections through a single or multiple transceiver interfaces may be implemented over one physical link to encompass a single link aggregation for MPLS Edge with a bi-directional IP Quality of Service (QoS) achieved.

In one exemplary embodiment, data packets with MPLS protocol may be transmitted across the MPLS core and arrive at the CPE-CE side of a network connection with MPLS label(s). The MPLS labels can be retrieved and/or parsed by the CPE-CE device 124 (e.g. by an MPLS to ANA Handler 55) in order to determine further processing of the packet. In the system described herein, (1) the MPLS labels can be acquired from the data packet with MPLS protocol (or also known as "MPLS packet"); (2) a table (such as a distribution table) maintained within or connected to the CPE-CE device 124 can cause the destination associated with the data packet and/or the MPLS label to be determined and accessed, and to retrieve corresponding rules (from e.g. Extended Device Configuration Store 24) to determine how to distribute the data packet over aggregated network connections; (3) if corresponding MPLS processing rules are found these may be used for distribution of the data packet over aggregated network connection(s); and if (4) no corresponding MPLS processing rules are found the data packet is not handled. In the case of (4) the system may default to IP processing rules.

The MPLS packet can include a header that can be used for sub-processing. The sub-processing can include IPDE to QoS transcoding or translation by MPLS/IPDE QoS Translation module 53. This involves transcoding or translating the QoS request associated with a packet, as opposed to the packet itself. This now enables the link aggregation ANA system to handle the MPLS packet based on the associated QoS requests, and also ensure that those QoS requests remain intact for handling by MPLS PE/CE at the destination. The packet's integrity is maintained, including its MPLS label.

Once transcoding/translation is done, ANA encapsulation may occur. An encapsulation technique used can be MPLS network compatible or MPLS aware. This can be accomplished by using MPLS protocol as part of ANA encapsulation by MPLS/ANA Encapsulation module 52.

Extended Device Configuration Store 24 can allow ANA system to process MPLS packets. It may contain some of the same information that is used to perform the MPLS to IPDE QoS translation.

The system can continue to apply the QoS requests and therefore handling of MPLS packets continues to happen within ANA in a way that is consistent with transport of MPLS packets on an MPLS network. The packets are not necessarily modified, rather, handling of the MPLS packet can occur based in part on ANA rules that are made to adhere dynamically to MPLS handling rules.

In another embodiment, a similar process may operate in a reverse direction: MPLS packets may come out of ANA link aggregation connection first by de-encapsulating, and then translating/transcoding so as to provide the MPLS data packets.

In one embodiment, the network aggregation engine 11 may poll the state of network connections 19, 20 and 21, for example, as per configured intervals stored in the device configuration store 24, to ensure that all network connections configured in an aggregated group are within configured acceptable tolerances. If a network connection 19, 20, and 21 exceeds acceptable tolerance values for any of the polled parameters, the network aggregation engine 11 may remove the network connection 19, 20, and 21 from within the aggregated network connection 22 without removing it from the polled network connections list. By leaving the removed network connection 19, 20, and 21 in the polled network connection list, the network aggregation engine 11 may aggregate the network connection into the aggregated network connection 22 once it has come back within acceptable tolerance values. This may ensure that a network connection may change states between residing in an aggregated network connection 22 or not, without the intervention of an external system or input. The network aggregation engine 11 may handle notifications to all end points configured within the device configuration store 24 with internal events such as changes in network connection state, threshold violations on configured thresholds for any number of configurable variables for any object within or connected to the network aggregation device 23. The network aggregation engine 12 may also handle events such as changes in the state of a network connection 19, 20, and 21 included in the aggregated connection, changes in latency of a network connection included in the aggregated network connection 22, scheduling changes, event logging, and other events.

Figure 4:
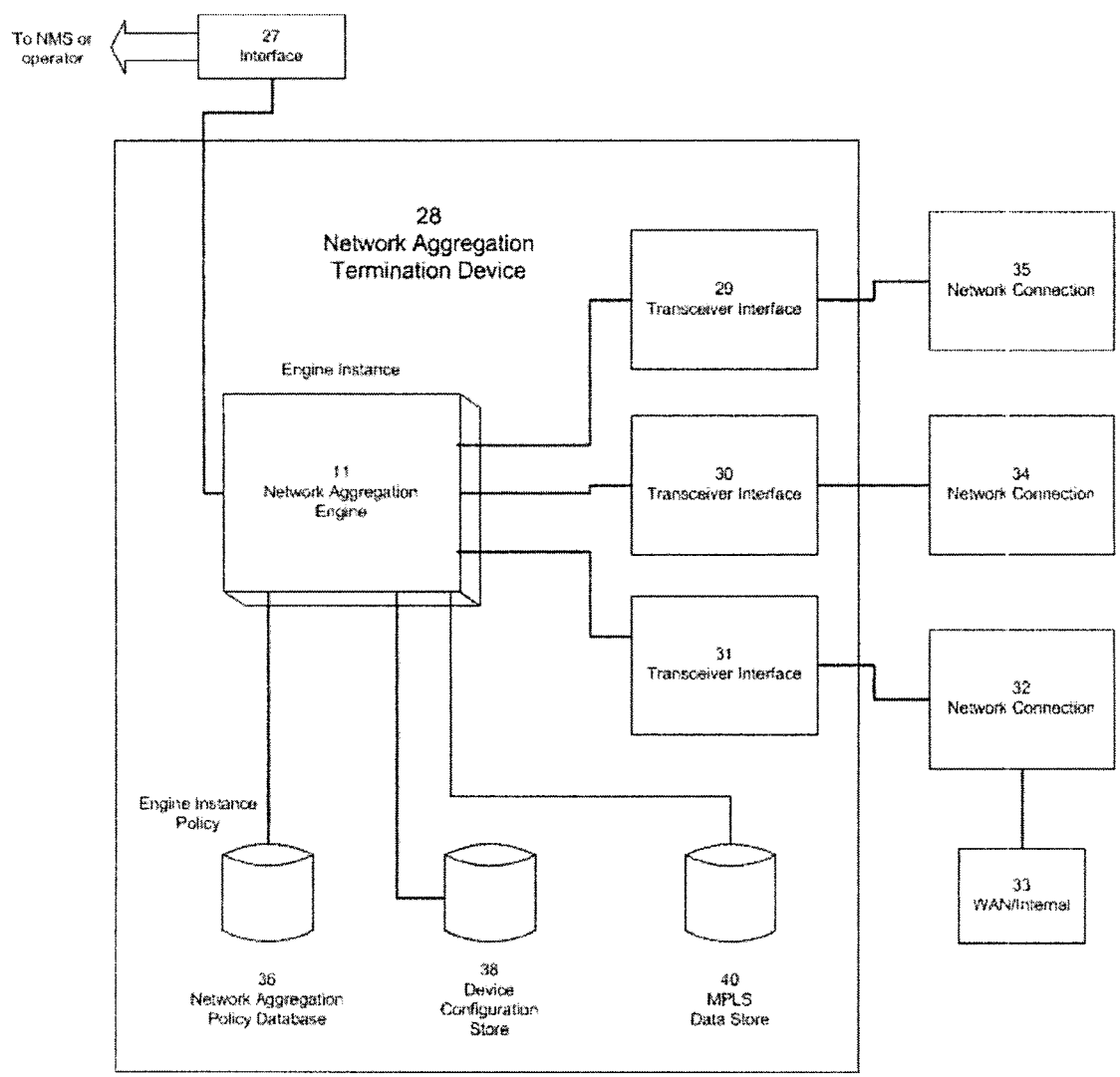
FIG. 4 is a block diagram of a communication device incorporating a particular embodiment of the invention, demonstrating the device as an aggregation means on the server/concentrator side of a network connection and an MPLS data store.

FIG. 4 is a block diagram of a communication device incorporating a particular embodiment, demonstrating the device acting as a server/concentrator or CCPE.

The network aggregation engine 11 may provide access to a network aggregation policy database 36 which stores configuration information related to the various aggregated network connections that terminate on the aggregated network connection device 28. The network aggregation termination device 28 may be implemented in such a manner that each aggregated network connection defined in the network aggregation policy database 36 is handled by its own virtual instance, the use of which enables termination of each aggregated network connection from multiple customer premises equipment (CPE-CE). In addition, an MPLS data store 40 may provide persistent data storage for MPLS related configuration information such as label lookup table, forwarding table, routing table, labeling and mapping policies, and/or MPLS provider information. As described above, based on the information in MPLS data store 40, Network Aggregation Engine 11 may be operable to encapsulate incoming or inbound data from CPE-CE for transmission into core MPLS network. In a similar fashion, Network Aggregation Engine 11 may remove MPLS label from outbound data packets exiting an MPLS network and forward the data packets to the appropriate CPE-CE based on a label look-up table or a forwarding table. In cases where multiple CPE-CE devices are handled by one CCPE, Network Aggregation Engine 11 is further operable to determine, based on the MPLS data store 40 and/or the MPLS label information on the outbound data packets, the final destination CPE-CE(s) to which each outbound data packet should be delivered.

Figure 5:
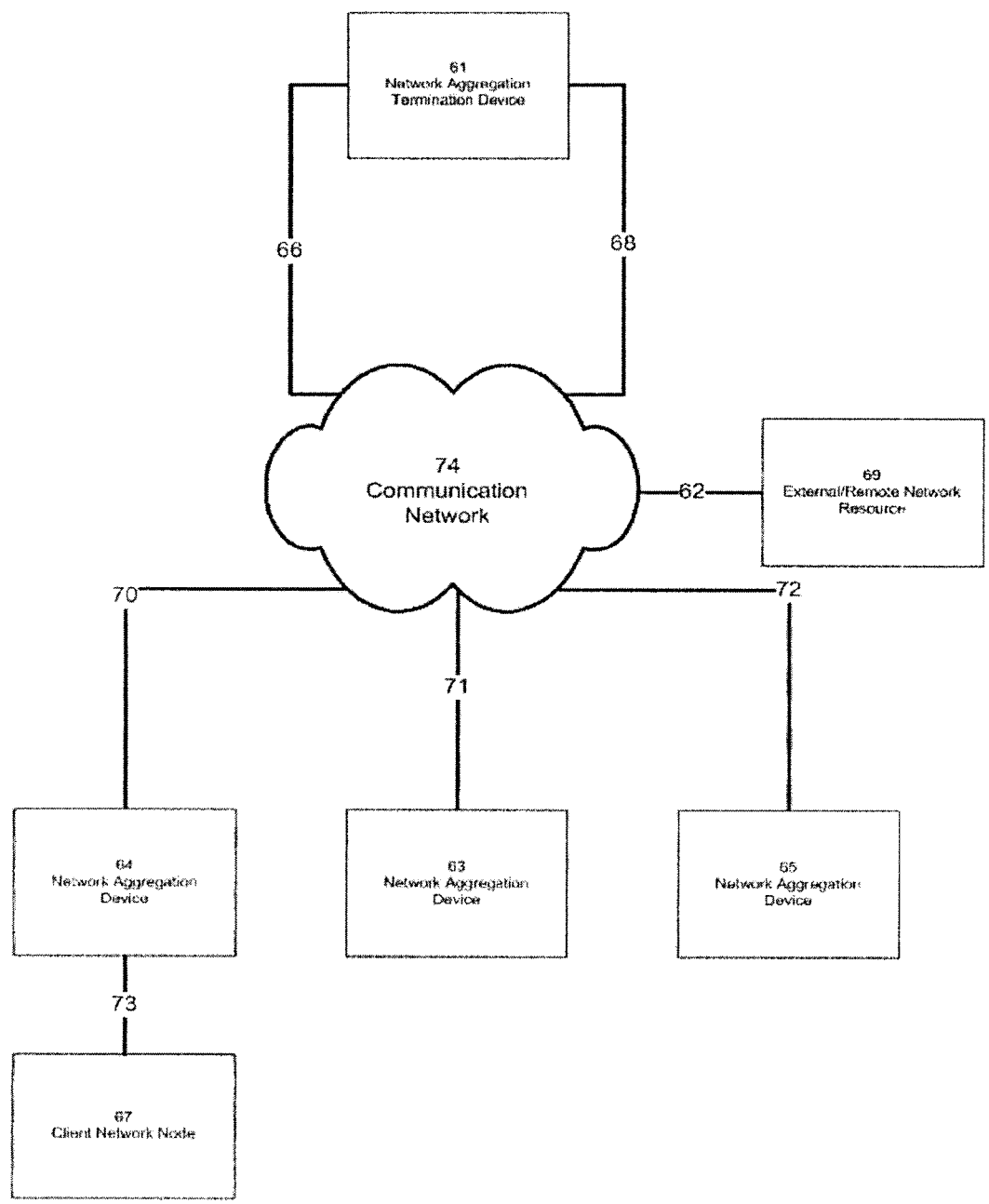
FIG. 5 is a block diagram of a communication network incorporating a particular embodiment of the invention, demonstrating the device as an aggregation means on both the client/CPE-CE side and server/concentrator or CCPE side of a network connection.

FIG. 5 is a block diagram of a communication network incorporating a particular embodiment, demonstrating the function of the device acting as a client/CPE-CE and server/concentrator or CCPE.

In accordance with a particular embodiment, aggregated network connections 70, 71 and 72 may be built by network aggregation devices 63, 64 and 65, which terminate to a single aggregated network connection termination device 61 through network connections 66 and 68 as their endpoint. The aggregated network connection termination device 61 may access external communications networks through network connections 66 and 68 to access external/remote network resource 69. Access to external communications networks, such as an MPLS network or the Internet, may be provided by the aggregated network connection termination device 61 by using either network connection 66 or 68 through the use of a routing protocol, such as Border Gateway Protocol (BGP), Open Shortest Path (OSPF), or through the use of simpler mechanisms such as load sharing over multiple static routes within the communication network 74 that acts as the valid next-hop for the aggregated network connection termination device 61.

Aggregated network connections 70, 71 and 72 may provide access to client network nodes 67 connected to the network aggregation devices 63, 64 and 65 through the aggregated network connections 70, 71 and 72 to communications networks 74 accessible by the aggregated network connection termination device 61.

A client network node 67 may request data provided by an external/remote network resource 69 accessible through a communication network 74. This request for the external/remote network resource may be routed over the network connection 73 providing access from the client network node 67 over the aggregated network connection 70 to its endpoint which is the aggregated network connection termination device 61. This may be done through the communication network 74 through the network connection 66 into the aggregated network connection termination device 61. Any data sent by the external/remote network resource 69 may be routed back through the aggregated network connection termination device.

A particular embodiment may use the Internet as the communication network 74 referenced in FIG. 5, or another WAN network for example. The communication network 74 may alternatively be built by multiple sub-networks created through the use of multiple network aggregation devices 63, 64 and 65 with aggregated network connection termination device 61 end points through multiple network connections 66 and 68. Furthermore, the communication network 74 may also be an MPLS network provided by an MPLS provider or carrier.

Figure 6:
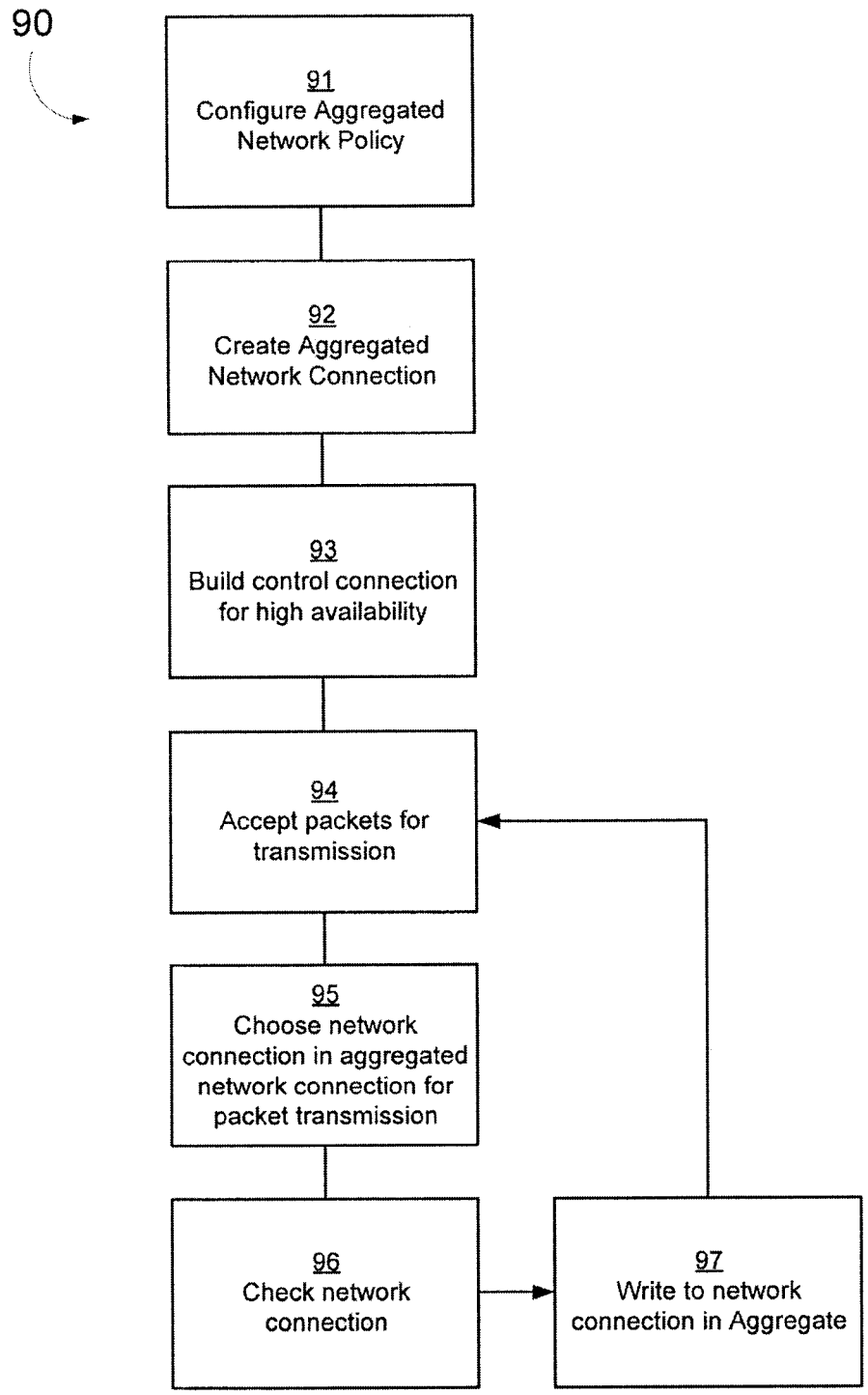
FIG. 6 is a flow diagram of a method of providing redundancy and increased throughput through a plurality of network connections in an aggregated network connection.

A further aspect relates to the provisioning of high availability over the aggregated network connection by the network aggregation engine 11. FIG. 6 illustrates a method of providing redundancy and increased throughput through a plurality of network connections in an aggregated network connection. The method 90 may begin with a step of configuring a plurality of network connections 91 through the creation of a network aggregation policy to form 92 the aggregated network connection. The aggregated network connection may be initialized as per the network aggregation policy. Control connections may be created 93 for the plurality of network connections configured as part of the aggregated connection to allow the aggregation engine 11 to manage the membership of a network connection within the aggregated connection. The network aggregation engine 11 may accept packets for transmission 94 over the aggregated network connection 22. The network aggregation engine 11 may choose a network connection 95 among the group of network connections configured 91 in the aggregate in the stored aggregation policy for transmission of the current packet being transmitted. The choice of network connection for transmission of the current packet may be specified within the aggregation policy and may take into account data provided by the control connection built at 94.

According to one embodiment, a non-responsive network connection may be easily detected when using latency and packet loss as a measure. The mechanism for detecting 96 and adapting to 97 the network connection change within an aggregated network connection may be implemented within the data transmission routine in the aggregation engine 11 or as a separate process in parallel to the transmission routine in the aggregation engine 11 to allow for further flexibility in provisioning redundancy within the aggregated network connection.

Since this may occur on a per packet basis as opposed to on a per stream basis, a single non-responsive network connection may not affect the aggregated network connection and may allow data transmission to continue regardless of the individual states of network connections so long as a single network connection within the aggregated network connection is available for data transmission.

Encryption

Encryption may be provided for the link aggregation connections between a CPE-CE and a CCPE. In one exemplary embodiment, each lower-link connection handled and aggregated by a CCPE or CPE-CE may be encrypted by the Network Aggregation Engine 11 using transparent encryption.

In an embodiment, an overlay of IPSEC may be implemented over the link aggregated connections, sometimes in conjunction with existing IPSEC Edge implementations. For example, IPSEC gateways or clients can be installed on the CPE-CE's connected to the various CCPEs. In turn, the CPE-CEs with the IPSEC clients can terminate the IPSEC sessions on the CCPE or an existing carrier's IPSEC gateway on the MPLS network. Alternatively, IPSEC may be implemented at the PE routers or device such as a CCPE.

In an embodiment, a virtual edge overlay may provide transparent encryption for the aggregated connection between the CPE-CE and the CCPE. An example is IPSEC. The virtual edge may provide lower link transparent encryption as described herein.

Example in Operation

Figure 7A:
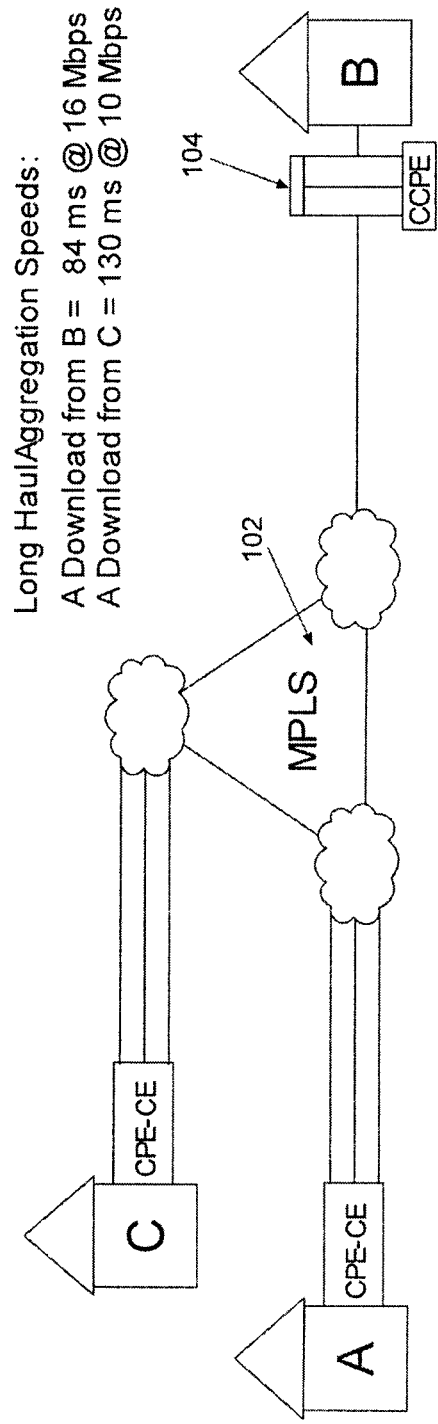
FIG. 7a illustrates a prior art network architecture where long haul effects apply, and presents network performance based on download speed.
Figure 7B:
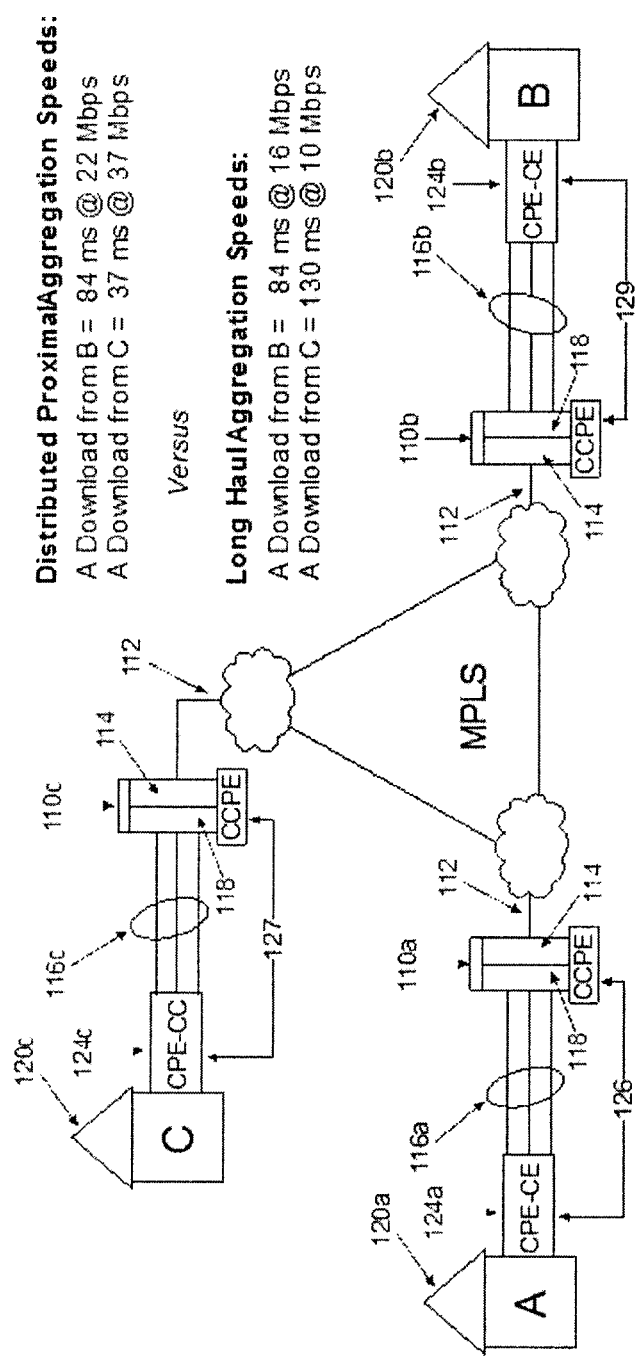
FIG. 7b illustrates, in similar network conditions as in FIG. 7a but implementing the present invention in order to reduce long haul bonding/aggregation, improved network performance based on faster download speed.

In one possible implementation, 3 locations are provided namely Site A, Site B, and Site C, and Site D. FIGS. 7a and 7b illustrate network performance as discussed herein. FIG. 7a illustrates performance with long haul effects. FIG. 7b illustrates performance with reduction of long haul effects, based on embodiments in network conditions otherwise similar to those on which FIG. 7a is based.

FIG. 7b shows an improvement in performance over FIG. 7a, based on reduction of long haul effects in relatively long distance network communications are implemented using the network architecture.

Embodiments may provide improved network performance relative to speed. A skilled reader will appreciate that the improvement in performance shown for the above example is significant. Other aspects of network performance, e.g., latency may also be improved.

Virtual Network Overlay and Tunnels

Embodiments may provide a network system for improving network communication performance between client sites at a distance from one another that is such that would usually require long haul network communication.

In some embodiments disclosed herein, there is provided a Virtual Network Overlay for multiple networks, such as for example one or more WAN. The Virtual Network Overly may allow multiple CPE devices to connect with CC devices and create an Over-The-Top Secure Network across Multiple Points-of-Presence between disparate sites. The Virtual Network Overlay service can provide features such as optimized Internet access, secure WAN (or other secure networks), and diverse carrier failover, for example. The Virtual Network Overly may support and integrate SCN, MDPS, and IPDE as described herein.

Figure 8A:
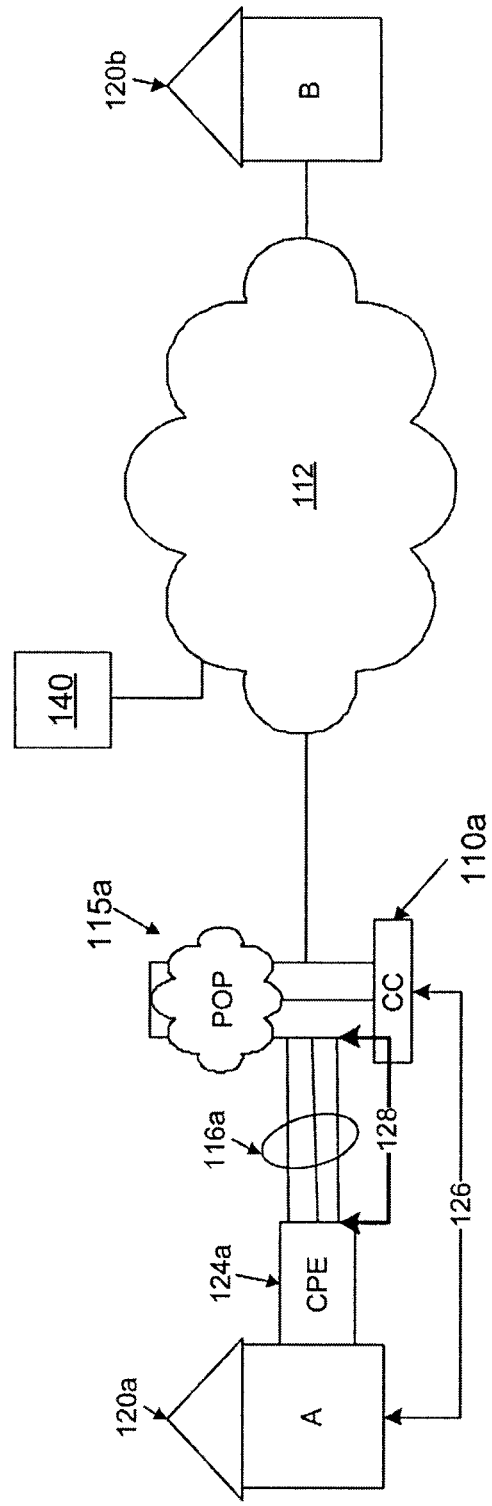
FIG. 8a illustrates a network solution with aggregated/bonded connections with a virtual edge in accordance with one embodiment.

As shown in FIG. 8a, there may be at least one client site network component 124a implemented at a client site A 120a for bonding or aggregating one or more diverse network connections so as to configure a bonded/aggregated connection 116a that has increased throughput.

There may be at least one network server component 115a that is configured to connect to the client site network component 124a using the bonded/aggregated connection 116a. The network server component 115a includes at least one concentrator element 110a implemented at a network access point to at least one network 112. As described, the network server component 115a automatically terminates the bonded/aggregated connection and passes the data traffic to an access point to at least one network 112.

A virtual edge 128 connects the network server component 115a and the client site network component 124a. The virtual edge 128 may provide transparent lower-link encryption for the connection between the client site network component 124a and the network server component 115a. The virtual edge 128 may implement a common access protocol for encapsulation of data packets for the data traffic carried over the bonded/aggregated connection 116a. This provides lower-link encapsulation support for protocols such as for example L2TP, PPPoE, PPTP, DHCP, UDP, and so on. By way of example, L2TP is a link-layer tunneling protocol to support VPNs. The virtual edge 128 may provide transparent encryption of the tunneling protocol to provide security and confidentiality The virtual edge 128 component addresses the Transparent Encryption Layer aspect of the SDN to SCN Mapping architecture as per the tables of system and network components herein. The tunneling protocol allows for provision of network services that the underlying network does not provide directly. A tunneling protocol may use a data portion of a data packet (e.g. payload) to carry the packets that provide the desired service. For example, L2TP may use L2TP packets to provide different network services. In computer networking, the link layer is the lowest layer in the IP suite which may be referred to as TCP/IP which it the networking architecture of the Internet. A link may be the physical and logical network component used to interconnect hosts or nodes in the network. Accordingly, the link layer relates to the links the physically connect the nodes of the network including the devices of the client site network component 124a and the network server component 115a. The link layer may be described as a combination of the data link layer and the physical layer in the Open Systems Interconnection model. As another example, Point-to-Point Protocol over Ethernet (PPPoE) is a network protocol for frame encapsulation inside Ethernet frames. As a further example, Point-to-Point Tunneling Protocol (PPTP) may implement VPNs and may use a control channel over TCP and a GRE tunnel operating to encapsulate PPP packets. These are illustrative example protocols that may be used to support encapsulation of data packets using a common access protocol. The virtual edge 128 lower-link tunneling protocol connections address the Site/Branch Infrastructure component of the SDN to SCN mapping for the Lower Plane infrastructure architecture as per the tables of system and network components herein.

A cloud network controller 140 is configured to manage the data traffic so as to provide a managed network overlay 126 that incorporates the at least the bonded/aggregated connection 116a and at least one long haul network path carried over the at least one wide area network 112. The network overlay 126 may include one or more virtual edges 128. The Network Overlay 126 addresses the Virtual Data Plane aspect of the SDN to SCN Mapping as per the tables of system and network components herein.

Figure 8B:
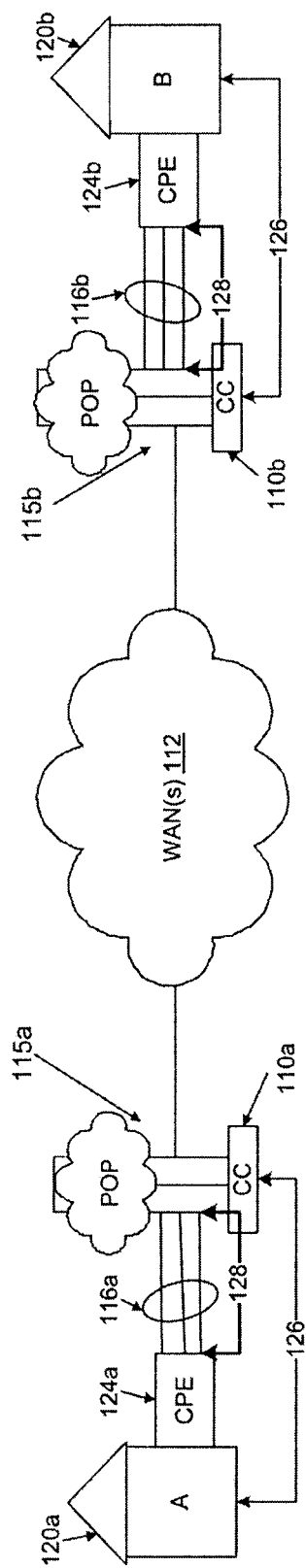
FIG. 8b illustrates another network solution with aggregated/bonded connections with a virtual edge in accordance with another embodiment.

As shown in FIG. 8b, there may be at least one other client site network component 124b implemented at a client site B 120b for bonding or aggregating one or more diverse network connections so as to configure a bonded/aggregated connection 116b that has increased throughput. Network server components 115a, 115b connect through a WAN network 112. There may also be a virtual edge 128 with transparent encryption and a managed network overlay 126 between the client site network component 124a, 124b and the corresponding network server component 115a, 115b. The client site A 120a and client site B 120b may be at a distance from each other such that at least one long haul network path is required to transmit data there between. The managed network overlays 126 may integrate to provide a single managed network overlay between disparate client sites and may include both virtual edges 128.

Figure 9A:
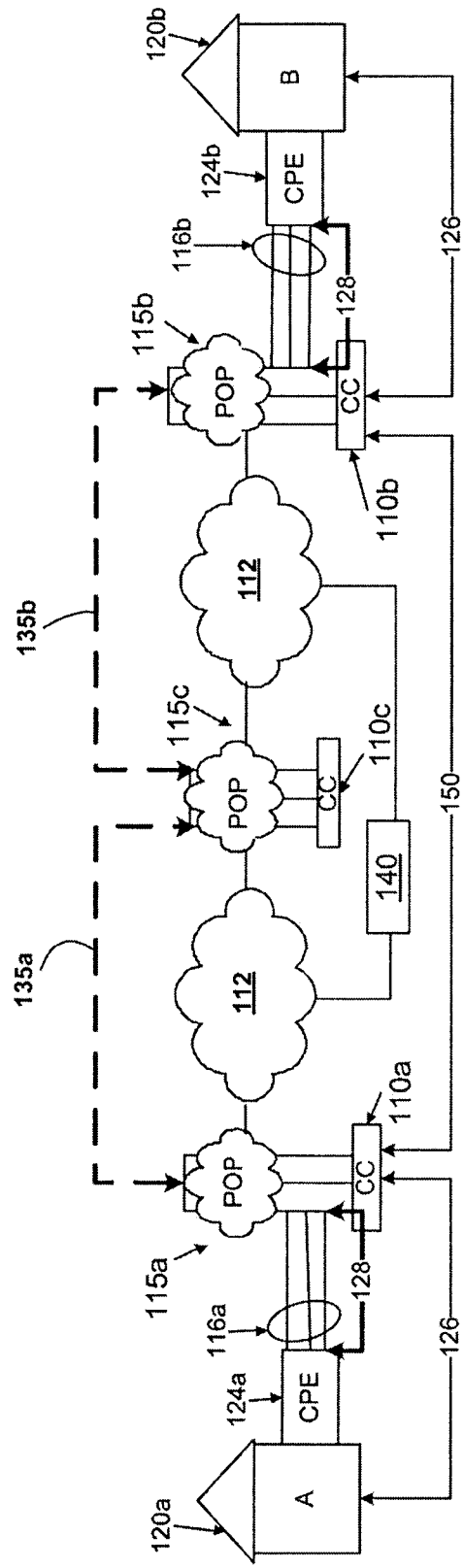
FIG. 9a illustrates a network solution with aggregated/bonded connections with a virtual edge and two virtual core connections in accordance with one embodiment.
Figure 9B:
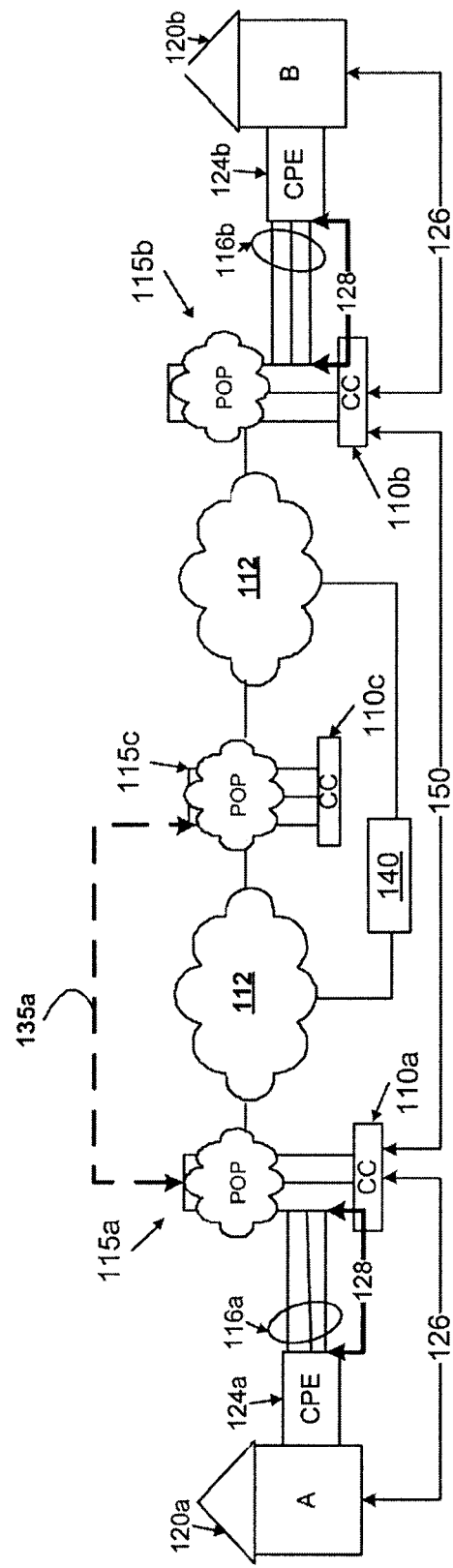
FIG. 9b illustrates a network solution with aggregated/bonded connections with a virtual edge and one virtual core connection in accordance with one embodiment.

In some examples, as shown in FIGS. 9a and 9b there may be multiple networks 112 connected by concentrator elements 110a, 110b, 110c. For example, there may be a first concentrator element 110a implemented at the access point to the at least one WAN 112. There may be a second concentrator element 110c implemented at another access point to at least one other WAN 112. There may be a third concentrator element 110b connected to an access point to a WAN 112. The first concentrator element 110a and the second concentrator element 110c are configured to interoperate to provide a virtual core (VC) connection 135a between the access points. The VC connection 135 may be a virtual Ethernet tunnel in some example embodiments. The third concentrator element 110b and the second concentrator element 110c are configured to interoperate to provide another VC connection 135b between the access points. The VC connection 135a, 135b provides transparent encryption. The VC connection 135a, 135b may also support a common access protocol for encapsulation of data packets. The VC connection 135a, 135b may provide both transparent encryption and support of the common access protocol in some embodiments. The Virtual Core connection 135 addresses the Virtual Control Plane aspect of the SDN to SCN Mapping as per the tables of system and network components herein.

The cloud network controller 140 is configured to manage the data traffic so as to provide a managed network overlay 150 that incorporates at least one long haul network path carried over the WANs 112. The managed network overlay 150 may be referred to herein as the Virtual Network Overlay 150. As shown in FIG. 9*a*, the Virtual Network Overlay 150 may involve the VC connections 135*a*, 135*b* to provide a virtual connection between the concentrator elements 110*a*, 110*b*. The VC connection 135*a*, 135*b* may provide a bonded/aggregated connection. As shown in FIG. 9*b*, the Virtual Network Overlay 150 may involve a VC connection 135*a* to provide a virtual connection between the concentrator elements 110*a*, 110*c*. A single managed virtual network overlay may integrate multiple Network Overlays 126, 150, multiple virtual edge connections 128, and multiple VC connections 135*a*, 135*b*. The singled managed virtual network overlay may provide an end-to-end overlay connecting disparate client sites (e.g. site A 120*a*, site B 120*b*). The Cloud Network Controller 140 addresses the Orchestration aspect of the SDN to SCN Mapping as per the tables of system and network components herein.

Figure 9C:
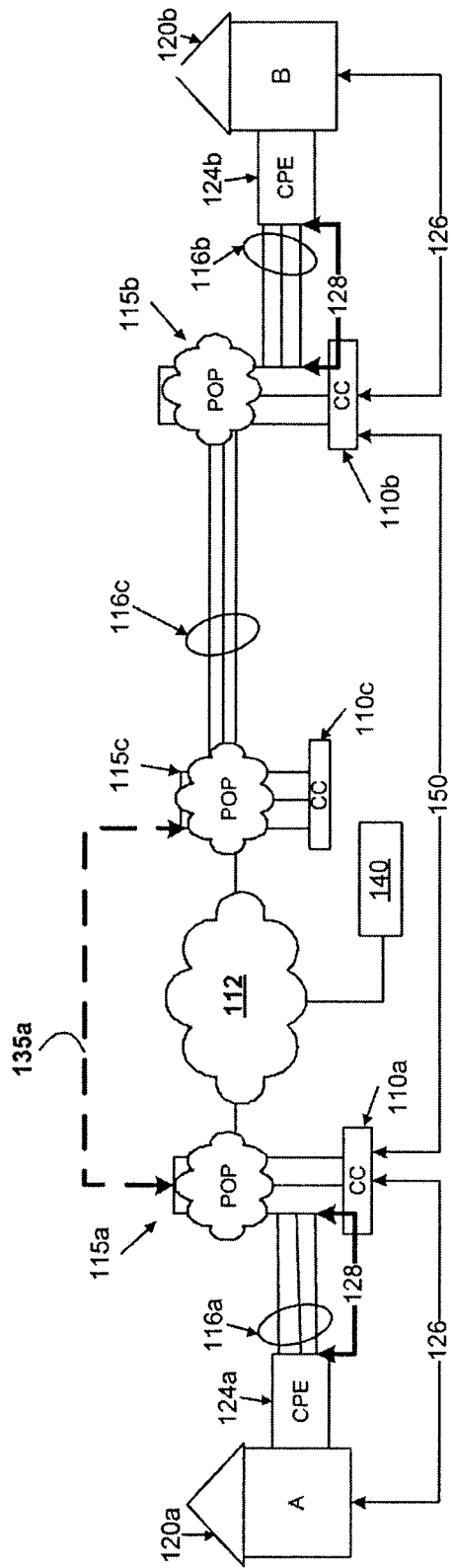
FIG. 9c illustrates another network solution with aggregated/bonded connections with a virtual edge and a virtual core connection in accordance with another embodiment.

As shown in FIG. 9*c*, there may be an bonded/aggregated connection 116*c* between a concentrator element 110*c* in a network server component 115*c* and at least one other concentrator element 110*b* in another network server component 115*b* connecting to the other client site network component 124*b* implemented at the client site B 120*b*. There may be a virtual edge 128 with transparent encryption. A cloud network controller 140 may be configured to manage the data traffic so as to provide the managed network overlay 150 that incorporates the other bonded/aggregated connection 116*c*.

Embodiments described herein may implement a cloud network controller 140 to implement Software Controlled Networking (SCN) to deliver bonded/aggregated connection and WAN virtualization between existing PoPs with concentrator elements. The solution may provide the ability to offer WAN-as-a-Service (WaaS) through a distributed PoP network.

Extending Bonded/Aggregated Connections from Edge to Core

Embodiments described herein may implement SCN-edge into a core network to provide end-to-end Virtualized Networking and deliver next generation WAN solutions using a Virtual Network Overlay 150. Examples are shown in FIGS. 8*a*, 8*b*, 9*a*, 9*b*, 9*c*. For example, the VC connections may extend a bonded/aggregated connection to a core network 112.

Figure 10:
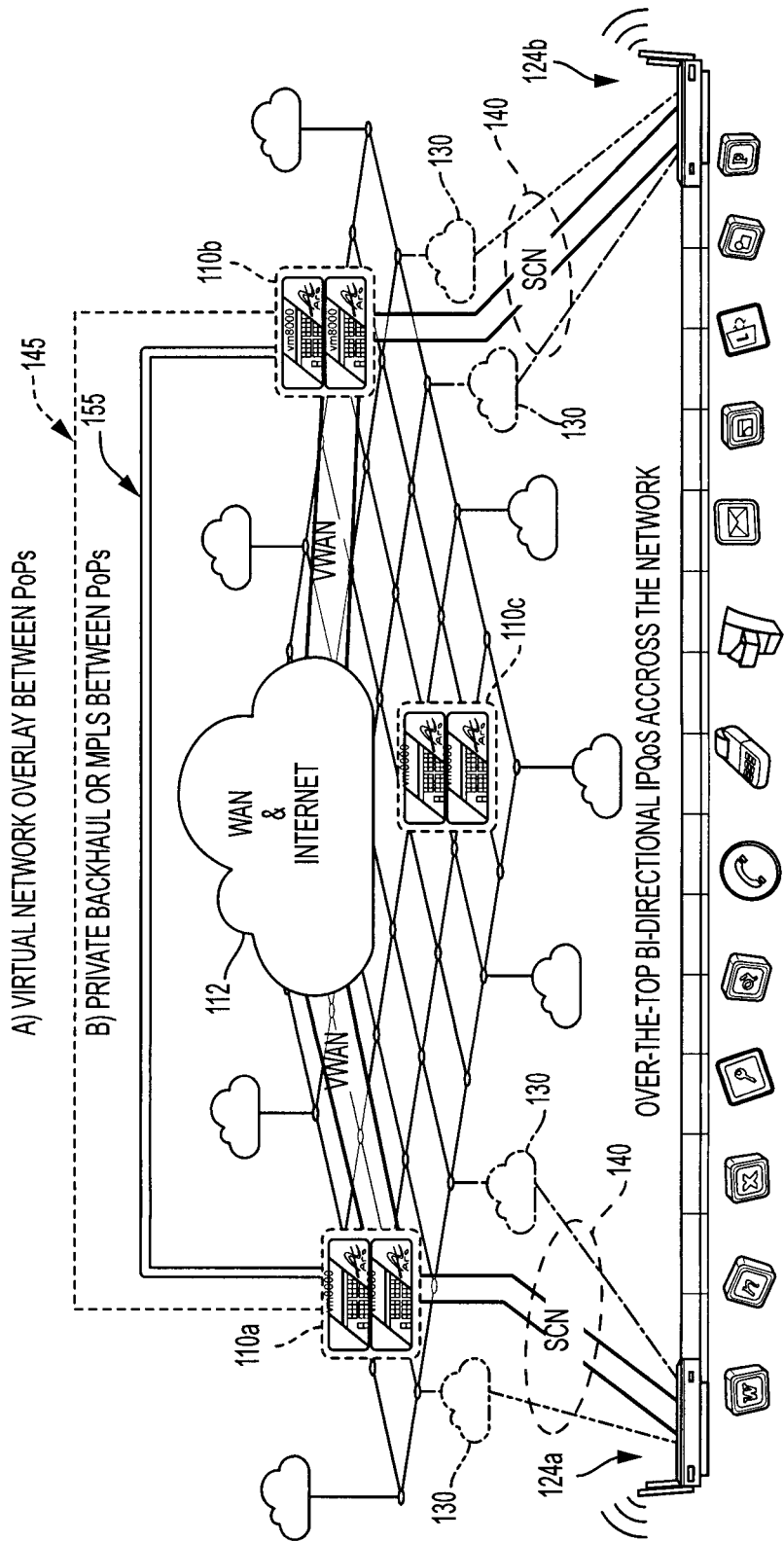
FIG. 10 illustrates a Virtual Network with aggregated/bonded connections with Virtual Network Overlay and private backhaul options in accordance with one embodiment.
Figure 12:
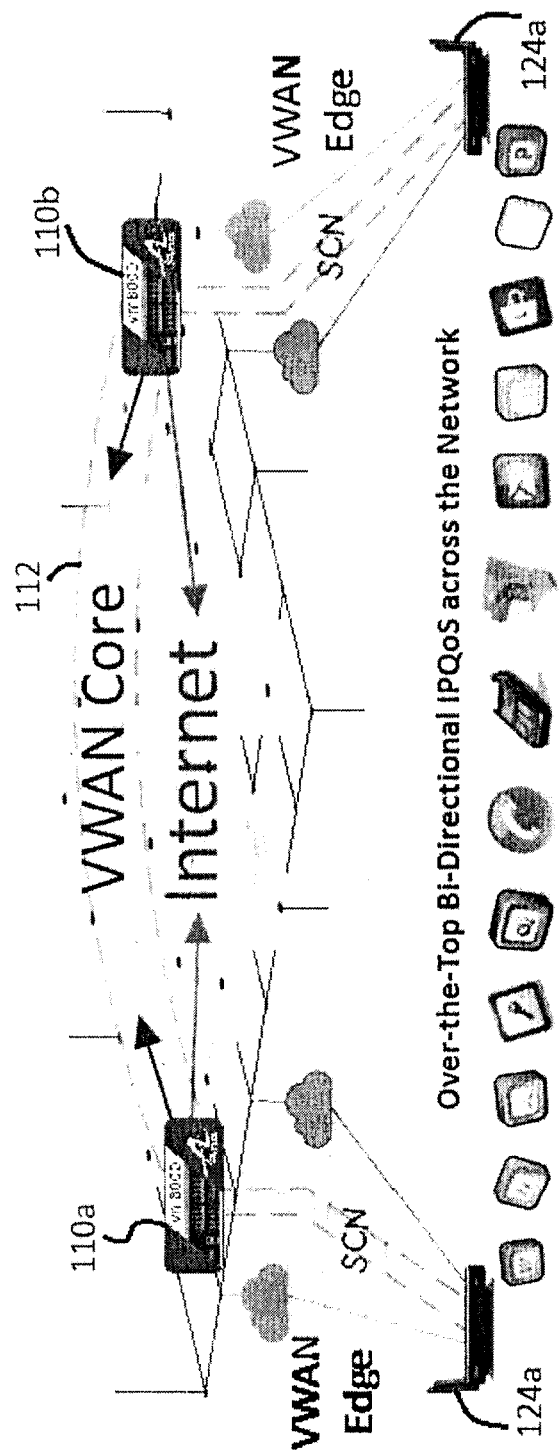
FIG. 12 illustrates another Virtual Network Overlay with aggregated/bonded connections and private backhaul options in accordance with one embodiment.

Two additional illustrative examples are shown in FIGS. 10 and 12. As shown in FIG. 10, the extension of a bonded/aggregated connection from the edge to core may be provided using the following illustrative example options: 1) deploying a virtual network overlay strategy between PoP's with encryption (A); and 2) interconnecting PoP's with private lines (B). These are illustrative examples only.

In one exemplary embodiment, the Virtual Network Overlay 145 may provide autonomy from any Carrier or Network in the core network 112. The core network 112 may be a central component or part of a communications network and may be implemented using different networking technologies and protocols. The Virtual Network Overlay 145 may be implemented as a virtual WAN backhaul between POPs 130 or concentrator elements 110. The Virtual Network Overlay 145 may be meshed Generic Routing Encapsulation (GRE) or virtual Ethernet tunnel network (e.g. using VC connections 135*a*, 135*b*) connecting multiple cloud concentrator elements (e.g. from cloud concentrator 110*a* to cloud concentrator 110*b*). The GRE protocol may belong to a specific VLAN by IP or Bridged.

Each concentrator element 110*a*, 110*b* may be part of a POP 130 or may be connected to a nearby POP 130. The concentrator element 110 may be referred to as a virtual WAN cloud concentrator instance generated by network controller 140 accessible by way of an SCN portal. Each concentrator element 110*a*, 110*b* may handle multiple bonded/aggregated connections and may handle one process per network or customer.

The network controller 140 may be accessed using an SCN portal as an illustrative embodiment. The SCN portal may be an interface to display real-time data about the network infrastructure and may be used to configure various components of the network infrastructure.

A CPE 124 *a*, 124*b* may be a virtual access CPE providing WAN or Internet access. It may have diverse carrier support with bandwidth aggregation. Additional optional features may include pre-emptive failover, lossless/same IP and bi-directional IPQoS capabilities.

A private backhaul or backbone option 155 may also be deployed to provide WAN solution. The private backhaul may include private MPLS or P2P links between POPs 130.

As an illustrative embodiment a WAN employing Virtual Network Overlay may be referred to herein as VWAN.

In some instances, a VWAN can be a VLAN associated per network or customer.

Furthermore, virtual edge architecture may allow for the Layering of MPLS or other network protocol over the top of this implementation.

PoP-to-CPE Transparent Lower-Link Encryption for Aggregated/Bonded Connection

Embodiments described herein may provide a virtual edge for aggregated/bonded connections with transparent lower-link encryption. FIG. 8*a* shows an example virtual edge 128.

Proximal Aggregation & Distributed CPE Encryption

In one embodiment, implementation of proximal aggregation connects multi-site customer CPE 124 devices to the nearest point-of-presence (POP) 130, thereby establishing an overlay network session with aggregated connections using the aggregated/bonded connection technology described herein. CPE 124 devices belonging to multi-site customers may use the larger non-aggregated Internet or backbone upstream connections to establish Internet access and build IPVPN connections for inter-office communications. This may eliminate the need to perform long-haul aggregation between sites which may degrade and/or negate the aggregated network performance when communicating at a distance.

Complexity of CPE Encryption for Multiple Tenants

CPE encryption for multi-tenant implementations add complexity to the practice of encrypted VPN when observed on a per customer basis and having to manage overlapping CPE LAN IP Subnets from various customers. Furthermore, this multi-tenant management of per customer IPVPN connections carries additional complexity when considering the distributed nature of these diverse VPN implementations and overlapping CPE LAN subnets.

Simplifying PoP-to-CPE Encryption

To help ease the complexity and limitations of standard encrypted IPVPN implementations while addressing the nuances of overlapping CPE LAN IP Subnets; a transparent Lower-Link protocol encryption technology or process may be deployed for the virtual edge that does not concern itself with the CPE LAN IP Subnet. This technology or process can encrypt the Lower-Link encapsulated traffic and moves the responsibility of the CPE LAN IP Subnet management up into the ANA and IP transport layers, where it can be addressed adequately without the complications of encryption management and complex encryption policy definitions in a multi-tenant deployment.

PoP-to-CPE Transparent Lower-Link Encryption for Aggregated/Bonded Network

In one exemplary embodiment, the Virtual Network Overlay may provide PoP-to-CPE Transparent Lower-Link Encryption for each aggregated/bonded connection 116 using virtual edge connections and virtual core (VC) connections. In an example embodiment, the VC connection may be implemented as a virtual Ethernet tunnel. This may eliminate the need for Customer IP intelligence in the encryption layer for Lower-Links. The transparent lower-link encryption at concentrator elements 110 can encrypt all aggregated/bonded encapsulation of Lower-Link connections transparently. In one embodiment, the Virtual Network Overlayis designed such that concentrator element 110 if and when CPE 124 is configured to enable lower-link encryption. This allows for both the Virtual Network Overlayand non-Virtual Network OverlayCPE implementations. Therefore, the Virtual Network Overlay can reach customers with a secure connection that may go faster and may cost less than traditional MPLS.

Figure 13A:
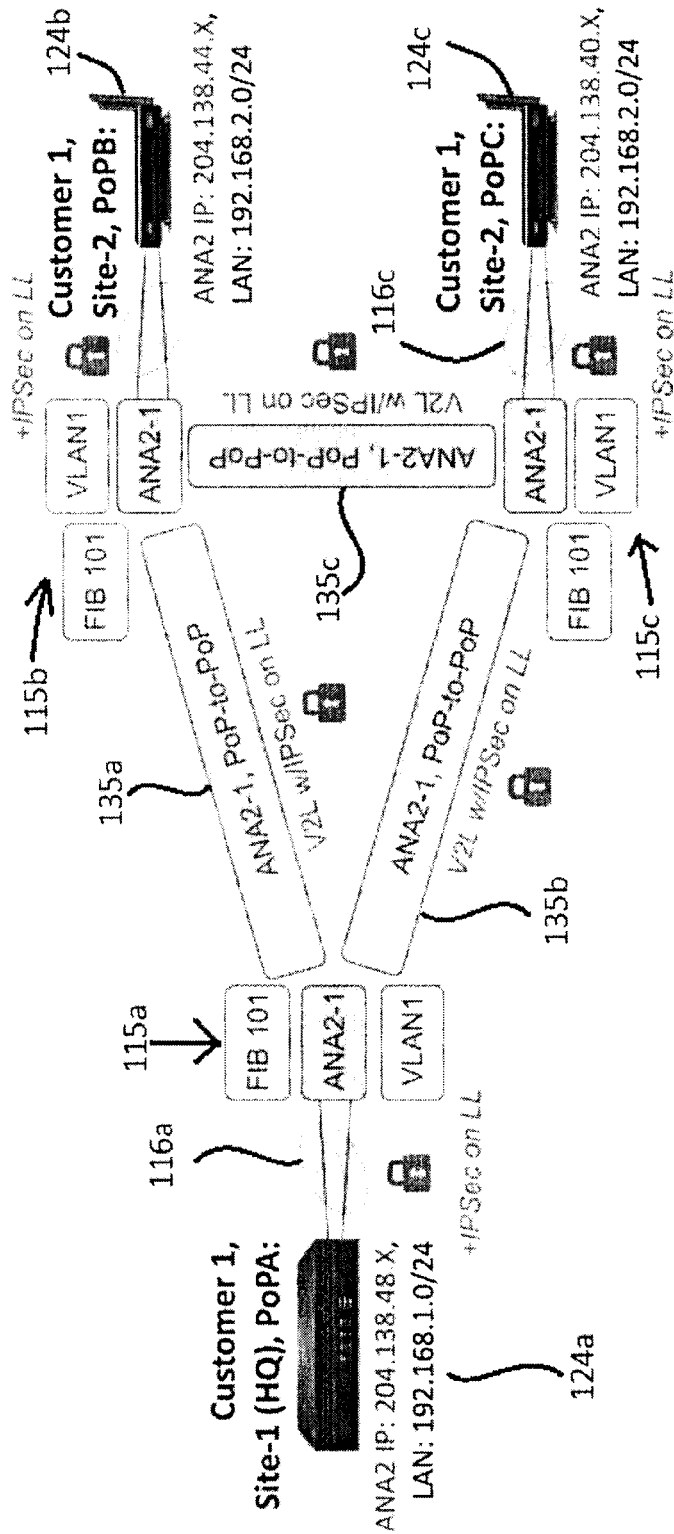
FIG. 13a illustrates a network solution where IPSEC encryption is used for Lower-Link transport, in accordance with one embodiment.
Figure 13B:
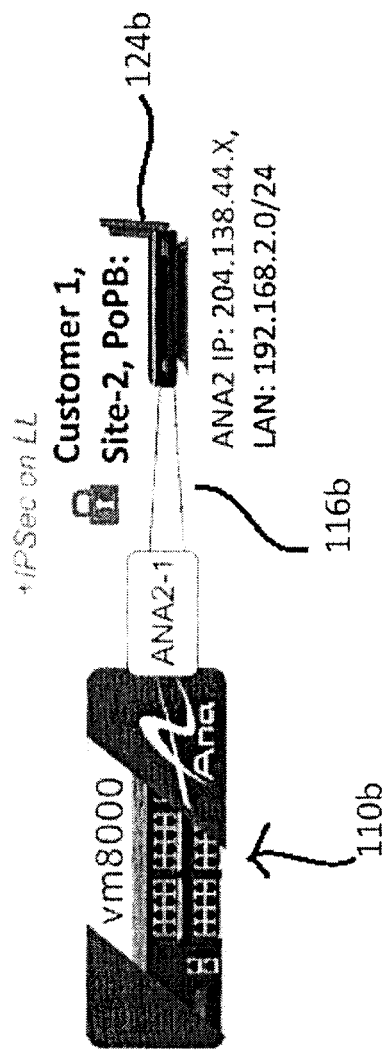
FIG. 13b illustrates another network solution where IPSEC encryption is used for Lower-Link transport, in accordance with one embodiment.

As illustrated in FIGS. 13a and 13b, IPSEC encryption may be used for Lower-Link transport. This allows for multiple CPE customers with overlapping IP subnets by not triggering the policy based on customer LAN subnet.

In one embodiment, lower-link encapsulation may have a 32 Byte overhead per packet implemented on the LMTU and LMRU settings. Furthermore, the Vif0 or 'ana session', may also have an overhead of 8 bytes implemented on the LMRRU setting of 1508.

IPSec encryption for Lower-Links may require an additional 72 Bytes for ESP Tunnel Mode and may be accommodated in configuration in the LMTU and LMRU settings, which may require changes to the calibration and also template configuration in cloud network controller 140 for service type of the Virtual Network Overlay.

Figure 11:
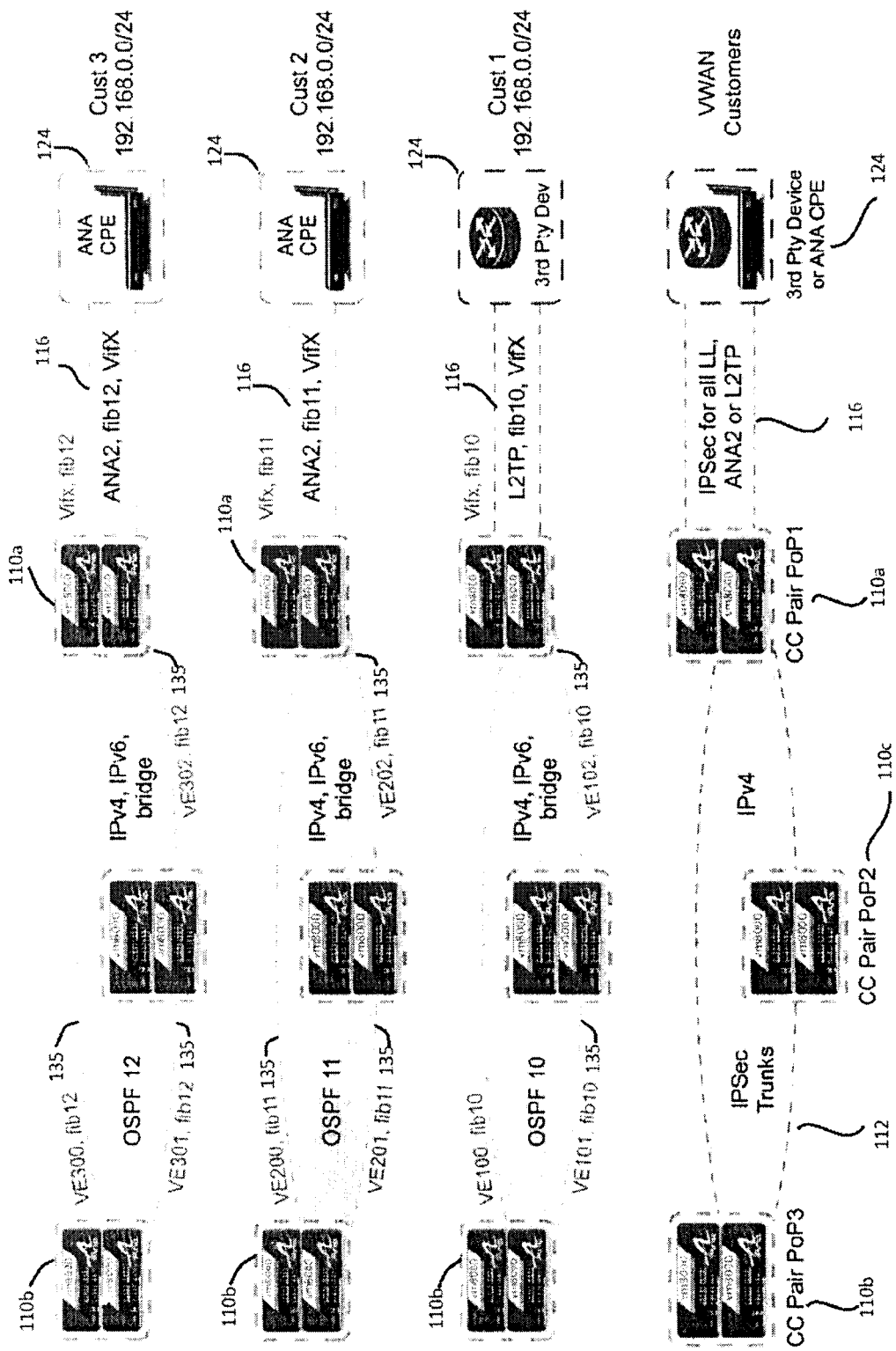
FIG. 11 illustrates an example of the Virtual Network Overlay framework is illustrated in accordance with one embodiment.

Referring now to FIG. 11, an example of the Virtual Network Overlay framework is illustrated in accordance with one embodiment. At customer premises, a CPE 124 or a third party device may be used to connect to concentrator element 110a through aggregated/bonded connection 116.

The CPE 124 or a third party device may be situated at overlapping IP subnets and possibly dealing with cpelan conflicts. The concentrator elements 110a may map Virtual Edge to CPE Vif and update routing accordingly, via for example RADIUS protocol, which provides overlay identifier (e.g. vwanid) and other attributes (e.g. cpelan attributes). Concentrator elements 110a may also inject route to OSPF. Concentrator elements 110a may also inject the route(s) into the Virtual Core's dynamic routing mechanism such as OSPF, RIP, or BGP.

In some embodiments, as shown, various VC connections 135a, 135b can be established between various concentrator elements 110a, 110b, 110c. These VC connections form a POP-to-POP Network Overlay, where each POP may include one or more concentrator elements 110. Transparent Encryption may be provided for the Virtual Network Overlay core transport. The Virtual Core connection 135 addresses the Virtual Control Plane aspect of the SDN to SCN Mapping as per the tables of system and network components herein. The transparent encryption of the virtual core tunneling protocol connections address the Core/Branch Infrastructure component of the SDN to SCN mapping for the Lower Plane infrastructure architecture as per the tables of system and network components herein.

The below tables demonstrate example functions and descriptions for selected components of the Virtual Network Overlay in accordance with one embodiment. The Virtual Network Overlay may be referred to herein as VWAN or virtual WAN as an illustrative example.

System Components

| Item | Function | Description |
| --- | --- | --- |
| 5 | Monitoring & Management | The SCN Portal application may be extended to support the new VWAN monitoring and management requirements and provide a single sign-on unified Portal for VWAN customers. |
| 4 | Cloud Orchestration/ Provisioning | The SCN Portal application may be modified to support the new VWAN requirements as an extension to the aggregated connection CPE device provisioning. |
| 3 | Virtual Control Plane VRF w/OSPF | Concentrators may join VWAN CPE sessions with VWAN Core Routing to create secluded customer Route Domains managed dynamically using OSPF, a dynamic routing protocol. This may avoid a network trombone impact and may to support a split Internet & WAN access from the PoP for the Virtual Data Plane. |
| 2 | Virtual Data Plane Network Access & CPE Authentication | Concentrators perform Network Access Server (NAS) type functions that connect and aggregate CPE devices on the edge of the Core Network. New RADIUS (Remote Authentication Dial In User Service) attribute capability may be added to support VWAN. |
| 1 | Security with IPSec & Firewall | Concentrators and CPE devices may handle both Edge and Core encryption and Firewall to secure the network end-to-end. |

Network Overlay Core Layers

| Layer | Function | Description |
| --- | --- | --- |
| 5 | Virtual Control Plane VRF w/OSPF | FIB for VRF Backbone Mapping Customer VWAN Trunk to aggregated connection Sessions (Core to Edge) |
| 4 | Star or Mesh Topology | VWAN Core Tunnels between PoPs/CCs in a Star or Mesh Topology |

-continued

| Layer | Function | Description |
|---|---|---|
| 3 | Virtual Data Plane w/ Dynamic Routing | OSPF for Dynamic VWAN Routing Between PoPs/CCs |
| 2 | Encryption for VWAN Core: | Encryption for VWAN Trunks w/IPSec for lower layer traffic fully meshed between all CC's at all PoPs. |
| 1 | Firewall | Allowing VWAN Trunk encryption while protecting foreign encryption attempts. |

Network Overlay Edge Layers

| Layer | Function | Description |
|---|---|---|
| 4 | Virtual Control Plane VRF w/OSPF | FIB for VRF Edge Mapping Customer ANA Sessions to VWAN Trunks (Edge to Core) |
|  | Virtual Data Plane w/ Dynamic Routing | OSPF for Dynamic VWAN Routing Between PoPs/CCs |
| 3 | Virtual Data Plane for ANA w/Proximal Aggregation using Distributed PoPs | Uses Proximal Aggregation connecting multi-site customer CPE devices to the nearest PoP establishing an overlay network between sites. The CPE devices establish ANA Sessions with Lower-Links Aggregation, Pre-emptive Lossless Failover, and Bi-Directional IPQoS. Split Internet & WAN access from the PoP. |
| 2 | Encryption for ANA Lower-Links | Encryption for Lower-Links w/IPSec of aggregated connection encapsulated transport. Supports both VWAN and non VWAN CPE implementations. |
| 1 | Firewall | Allowing CPE Lower-Link encryption while protecting foreign encryption attempts. |

SDN to SCN Mapping

| SD WAN (SDN) | IP Networking | SCN | SCN and VWAN (Virtual Network Overlay) |
|---|---|---|---|
| Orchestration | Management Plane | SCN Portal | Multi-System Integration (OE, Tickets, NMS, CPE API) |
| Control Plane | Forwarding Plane | CC Multi-PoP | Virtual Control Plane (FIB, VE to ViF, OSPF) |
| Data Plane | Route Table | CPE | Virtual Data Plane (Routes, ANA Vif, DG or OSPF) |
| Encryption | IPSec | Security | Transparent Encryption (LL & Core Transport) |
| OTT - Lower Plane Infrastructure (IP Underlayer) | | | |
| Core/Cloud Infrastructure | Internet | Multi-PoP (Multi-Peer, NNI, CNI) | iBGP |
| Site/Branch Infrastructure | Internet or Private Line | Cable, ADSL, etc . . . | IP, MPLS, Ethernet |

The SDN to SCN table provides an illustrative example mapping between IP networking, SDN, SCN and Virtual Network Overlay to highlight example features. The terminology is used as an example illustration and other terminology may be used to reference various functionality. The table summarizes example features to provide an illustrative mapping. The table also lists example features for Over-The-Top (OTT) lower plane infrastructure as further illustrative mappings.

Virtual Network Overlay with SCN

In one embodiment, Virtual WAN or Network Overlay may use cloud network controller 140 with SCN Cloud management and automation to create an Over-The-Top Secure High Performance Network that connects multiple WAN sites across Multiple Points-of-Presence between CPE devices.

The Network Overlay may provide Optimized Internet Access, Secure WAN, Diverse Carrier Failover, and Bi-Directional IPQoS.

Carrier/Partner Features

In another embodiment, the VWAN configuration can support multi-tenant implementations by providing features such as route domain separation for overlapping customer IP Subnets, star and/or mesh WAN topology options with multipath WAN trunking, and dynamic per-VWAN routing updates with OSPF.

In one example, the Virtual Network Overlay (which may be referred to as VWAN) may provide PoP-to-PoP transparent VWAN trunk encryption, which has features such as:

Reduction of complexity by eliminating the need for Customer LAN intelligence in the encryption layer between PoPs;

Transparent customer WAN Core/Trunk encryption between PoPs. VWAN core trunks can be established for each multi-tenant customer as transparent Ethernet over IP tunnels that run on top of a single encryption session between CC's/PoPs;

Distributed PoPs provide a Virtual Point-of-Presence Network, enabling VWAN solutions to reach multi-site customers across North America.

The SCN Portal can be provided for accessing and configuring a cloud network controller 140 for ease of deployment and management of the VWAN. The SCN Portal can provide the following exemplary features:

OE, Install and Configuration, Monitoring & Management

Plugs Into Existing Monitoring System

Centralized Firewall, WiFi, & VWAN Control

Consistent Monitoring, Reporting & Management for all sites regardless of local carrier or connection type PoP-to-PoP Transparent Trunk Encryption VWAN may have a distributed PoP network covering North America for aggregation/bonded network services delivering speed, network efficiency, and reach for multi-site businesses.

A Virtual Point-of-Presence Carrier for the aggregated network system as described herein may provide customers with hot failover providing redundant and fault tolerant communications, supporting distributed points of presence for proximal aggregation throughout North America.

Distributed Proximal Aggregation with ANA & Multi-PoP

In another embodiment, Distributed Proximal Aggregation (DPA) may be implemented. DPA uses redundant Concentrators 110 established in multiple locations covering a multitude of Proximal Aggregation points known as Home-PoPs 130. Each Concentrator 110 supports multi-tenant configurations used for multiple clients associated with different CPEs 124 to improve network performance for such multiple clients by providing termination of their aggregation service and transfer of communications to the network backbone/Internet 112. This network solution may include multiple Points-of-Presence 130, distributed geographically bridging disparate areas with improved network communication with proximal aggregation to each customer CPE device 124.

Complexity of PoP-to-PoP Encryption for Multiple Tenants

PoP-to-PoP encryption for multi-tenant implementations adds complexity and may have limitations for the practice of Encrypted VPN between PoPs when observed on a per customer basis and having to deal with overlapping CPE LAN IP Subnets from various customers. Furthermore, the multi-tenant management of per customer IPVPN connections carries additional complexity when considering the distributed nature of these many diverse VPN implementations and overlapping CPE LAN subnets.

Simplifying PoP-to-PoP Encryption

In one embodiment, to overcome complexity and limitations of standard encrypted IPVPN implementations while addressing challenges of overlapping CPE LAN IP Subnets, extrapolation of the CPE LAN transport over the VWAN core from the encryption layer may be implemented to simplify the PoP-to-PoP encryption management.

In one example, Ethernet over IP tunnel (VE/gif) implementations on a per customer VWAN basis provides transparent encryption of these combined tunnels to simplify customer VWAN encryption requirements between PoPs 130.

This method moves the management of CPE LAN IP Subnets away from the VWAN Trunk encryption layer and up into the IP transport and IP routing layers.

In another embodiment, PoP-to-PoP Transparent VWAN Trunk Encryption may be implemented to eliminate the need for customer LAN intelligence in the encryption layer between PoPs, provide transparent customer WAN Core/trunk encryption between PoPs, and provide single encryption session between CC's/PoP's on top of which transparently create per customer multi-tenant Ethernet over IP tunnels (VE/gif) to facilitate VWAN Core Trunks.

The transparent encryption of the virtual core tunneling protocol connections address the Core/Branch Infrastructure component of the SDN to SCN mapping for the Lower Plane infrastructure architecture as per the tables of system and network components herein.

Virtual Backhaul—Multi-Tenant Support

In another embodiment, an over-the-top or Virtual Network Overlay solution can be implemented for the PoP-to-PoP interconnection of the core network. This solution can support multi-tenant implementations by providing route domain separation for overlapping customer IP Subnets, star and/or mesh WAN topology options with multipath WAN trunking, and dynamic per-VWAN routing updates with OSPF. This addresses the Virtual Control Plane component of the SDN to SCN mapping as per the tables of system and network components herein.

Per Customer Trunking

In order to address the potential overlapping of CPE LAN IP Subnets, the design associates VE PoP-to-PoP tunnels per customer VWAN with a distinct route domain by mapping VE trunks and ANA Vif sessions to unique FIBs/Route tables creating a per customer VWAN Route domain from one CPE to another CPE over the VWAN core.

Ethernet Over IP Tunnels (VE/Gif) for Trunking

The VE/gif interface can be a generic tunneling device for IPv4 and IPv6. It can tunnel IP[46] traffic over IPv[46], thereby supporting four possible configurations. The behavior of gif is mainly based on RFC2893 IPv6-over-IPv4 configured tunnel.

Star & Mesh for Backhaul Network

Aggregation sessions are generally established between PoP's on a per customer basis. As seen below, a Star or a full Mesh implementation may be provided to address the varying needs of the customer.

Star Topology

Figure 14:
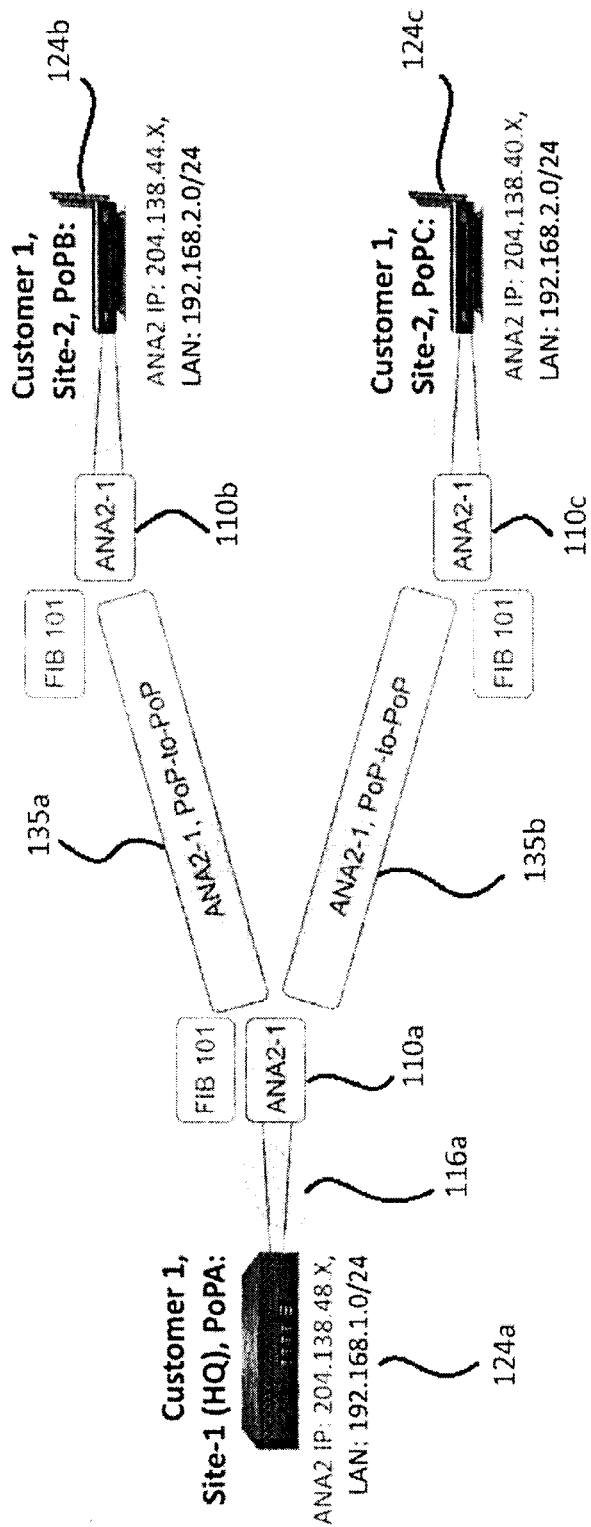
FIG. 14 illustrates a network solution in a star topology in accordance with one embodiment.

Referring now to FIG. 14, aggregation sessions established from all CPE side PoP's to Head Quarter's PoP 110a from the customer VWAN CC's and using the dedicated Multi-ANA instance which is associated to the dedicated customer FIB. CPE LAN traffic destined for the Head Quarter's LAN can traverse the ANA PoP-to-PoP session with full IPSec encryption.

Full Mesh Topology

Figure 15:
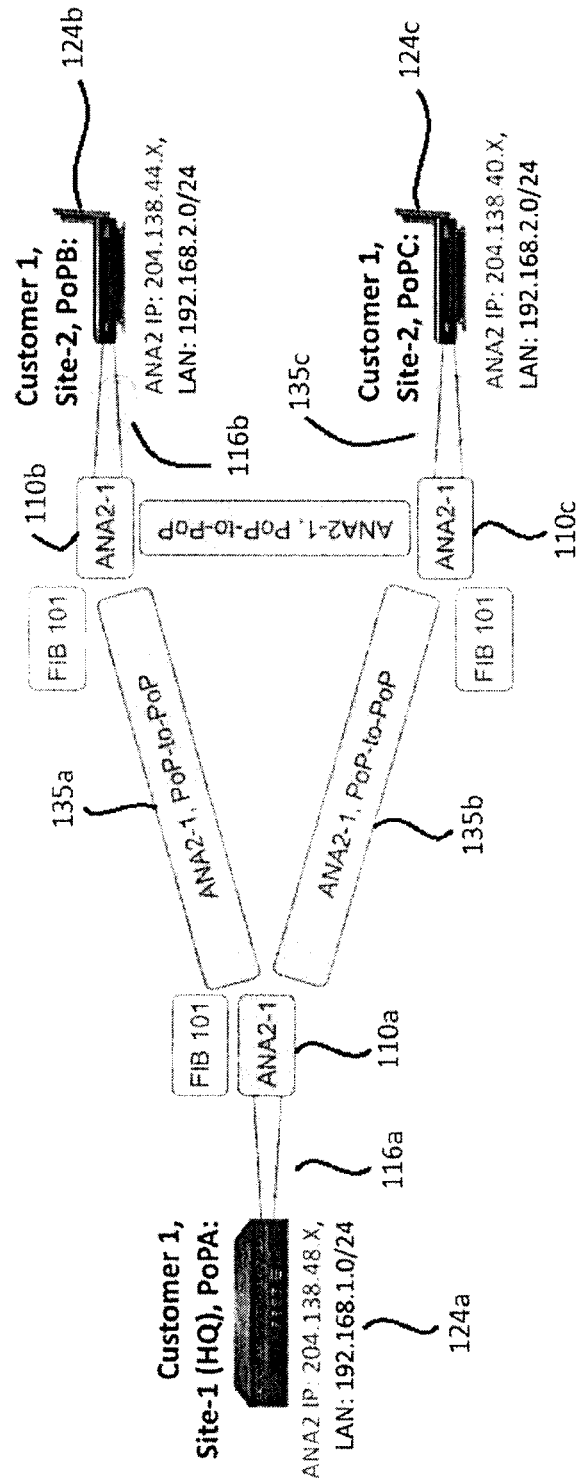
FIG. 15 illustrates a network solution in a full mesh topology in accordance with one embodiment.

Referring now to FIG. 15, aggregation sessions established from CPE side PoP's to Head Quarter's PoP 110a & also to every PoP containing this particular customer's CPE connections. The PoP-to-PoP ANA sessions originate and terminate on the customer VWAN CC's and use the dedicated Multi-ANA instance which is associated to the dedicated customer FIB. CPE LAN traffic destined for any other customer LAN can traverse the ANA PoP-to-PoP sessions with full IPSec encryption.

Rate-Limit & QoS

In another embodiment, The Virtual Network Overlay may provide the ability to subscribe to specific PoP-to-PoP bandwidth controlled by ANA RLA. Virtual Network Overlay may have the ability to use the IPDE RLA on lower-links for the Virtual Data Path (e.g. may be an aggregated product) and also between PoPs in the Virtual Control Plane (VC). The Virtual Network Overlay may provide VC connections, for example.

SCN Lite—RAS & Open Architecture

Figure 16:
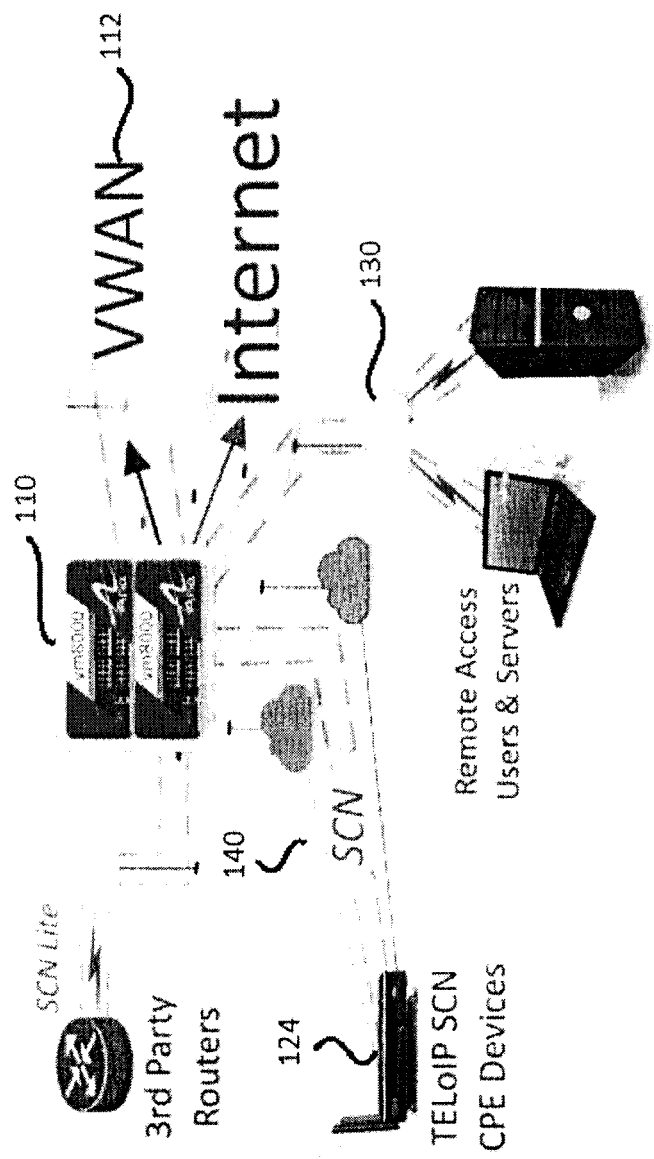
FIG. 16 illustrates a network solution with third party routers in accordance with one embodiment.

As shown in FIG. 16, routers with static ANA IP assignments can be implemented to connect as SCN-Lite for fixed sites. This embodiment opens up access to non-aggregated/bonded connection third party devices and software clients. In some embodiments, this may involve configuration of third party devices including both CPE and CCs. For example, a third party device may be a router. In some embodiments, third party devices, the CPE may be configured to support both non Aggregated and Aggregated implementations.

Embodiments described herein may involve particular configuration of third party network infrastructure for the Virtual Network Overlay, SCN, MDPS and IDPE functionality. The network infrastructure may be configured to support bonded/aggregated connections with multi-POP to provide improved virtual networking functionality. The Virtual Network Overlay may be implemented with carrier autonomy and independent CPE components supplied by third parties, for example. This may enable a user to avoid vendor lock as they update their CPE with particular configurations to support the Virtual Network Overlay. For example, third party routers may be upgraded with particular configurations described herein without requiring replacement of all hardware for the CPE.

In one embodiment, both ANA2 and L2TP link types may be supported simultaneously. There may also be a need to support multiple ANA2 ports such as x.x.x.x:6666, 7777, and 8888.

In another embodiment, ANA2-Server may support L2TP clients by configuring wildcard and NAT for Lower-Links security tasks on IPSec. Therefore, one solution may be implemented via mostly CLI and scripts. In one example, new RADIUS attributes may be added for third party device identification. For instance, new attribute may be set to SCNLITE, with value set to 1 or 0, and default value set to 0.

In yet another embodiment, CLI values may be changed to support both ANA2 and L2TP simultaneously.

A third party device may be configured to connect to an aggregate of multiple connections between concentrator elements using L2TP as the Lower-Links transport. This illustrative example uses L2TP which supports multilink and is used for connecting to ISP's and for remote access.

The particular configurations may enable integration of third party devices into the Virtual Network Overlay infrastructure to turn the third party devices into concentrator elements or CPE devices.

For third party CPE device support, an example illustrative embodiment may use MLPPP RFC 1990 with an aggregated/bonded connection as an overlay on top of common access protocols such as L2TP, PPPoE, or PPTP with multiple route tables and or static routes to manage and separate the Lower-Link traffic for aggregation. Once the traffic is separated we use MLPPP on the CPE to connect with CC elements.

The following process for configuration operations may be used.

First, the process may involve separating CPE traffic on the Lower-Links connecting the network infrastructure components. This may operation may involve configuration of a third party router (as part of the CPE) to update Lower-Links and multiple network connections. This may involve using a static IP route on each of the multiple interfaces or a dynamically assigned IP via DHCP or PPPoE or other protocol. This may further involve removing the default route on these interfaces or use of a separate routing table for each, such as a virtual routing and forwarding (VRF), for example. Static routes or multiple route tables may be added on each respective Lower-Link for the corresponding the CC Lower-Link IP. This effectively separates the Lower-Links data traffic.

Next, the process may involve CPE Links configuration for a Common Access Protocol. The Common Access Protocol may be for encapsulation and aggregation of data packets. This supports third party router equipment configuration for aggregated/bonded connection access using L2TP, PPPoE, PPTP, or other protocol. This may involve setup of virtual dialer templates for the lower-link transport using L2TP, PPPoE, or PPTP, for example. The virtual dialer templates allow for traditional MLPPP RFC 1990 to function over IP versus lower level serial type connections to T1 circuits. This may also involve setup of a multilink bundle with PPP multilink over the lower-link transport infrastructure. The aggregated/bonded connection may be compatible for MLPPP once the lower-link transport is compliant with a supported protocol such as L2TP, PPPoE, or PPTP, for example. This may also involve configuration of the third party router/CPE to use the multilink virtual interface as the default gateway.

These process operations may be used for CPE based on a third party device such as a third party router. From a Lower-Links perspective before aggregation these operations may ensure each lower-link has a separate path, and adds a static route for lower level IP address link. This may provide support for aggregated/bonded connections with a common transport protocol (L2TP). This may configure routers with multi-link over IP and provide lower-link encapsulation of data packets. For example, this may provide lower link encapsulation support for L2TP and PPPoE and PPTP and other protocols such as DHCP, UDP.

Further configurations may involve operations for CC to be compatible with lower links of configured third party device.

An operation may involve CC element configuration with MLPPP for Common Access Lower-Link Protocols. A CC for aggregated/bonded connections may be configured with MLPPP support over common Lower-Link transport protocols such as L2TP, PPPoE, or PPTP. This adds transport compatibility on the encapsulation side.

In an aspect, embodiments described herein may provide a Virtual Network Overlay for intelligent packet distribution over a plurality of potentially diverse links. The system may include an intelligent packet distribution engine ("IPDE") that incorporates or is linked to means for executing a decision tree. The IPDE, in real time, obtains data traffic parameters and, based on the data traffic parameters and performance criteria, selectively applies one or more techniques to alter the traffic over selected communication links to conform to the data traffic parameters. Further details are described in Applicant's U.S. Pat. No. 8,737,214, which is incorporated by reference.

Another operation may involve CC element configuration for the IPDE which can manage outbound packets to the CPE for differing speed links and RLA QoS. The CC element may use echo packets received from the CPE to implement aspects of the IPDE. A third party router may not be configured to support the IPDE and may not support differing speeds upload to the CC. For embodiments described herein, the CC may be updated to provide this IPDE implementation. Some example embodiments may be limited to Nx (Least Common Speed link) for aggregation. The configured CC element provides the aggregated/bonded connections.

A further operation may involve CC element configuration with MDPS support for fast failover and can use the third party Router configuration of Lower-Link transport LCP echo packets as control packets. The CC makes its own calculations based on the LCP echo packets for QoE scores and fast advanced failover. The third party router does not have MDPS and does not pre-emptively inform the CC over the other good links of a potential problem. The third party router may not have MDPS and may not calculate QoE scores from the LCP echo packets in some embodiments. The third party router may not have IPDE and pre-emptive failover. In an example, the CC takes echo packets or requests from the router (an example CPE) and generates QoE scores. The cloud controller may pull data from CC elements and augment data from router QoE to support IPDE, for example. Further details are described in Applicant's U.S. Pat. No. 8,737,214, which is incorporated by reference.

The same may be said in the reverse where some embodiments may involve setup of an ISP access core router to participate as a CC and connect to it with ANA CPE devices.

These operations may configure CC elements for separated lower-link traffic

L2TP & IPSec on CC for Third Party Clients

An example embodiment, may involve IPSec Transport Mode Required with NAT Traversal Support. Example configuration details for third party devices are described herein and may be used for L2TP and IPSec implementations.

New Dynamic IP Address Pool for RAS

For remote access, and portability between PoPs on all CC's, in some embodiment, each CC 110 will be assigned a dynamic IP address Pool configured to support dynamic clients. IPSec may be used to provide the transparent lower-link encryption for CPE devices to address the encryption layer of the lower-link access in the tables of system and network components herein.

Dynamic Client RADIUS Account

In some embodiment, the Virtual Network Overlay may implement a dynamic IP address strategy for RAS accounts and type.

OSPF—BIRD—Route Domains

Figure 17:
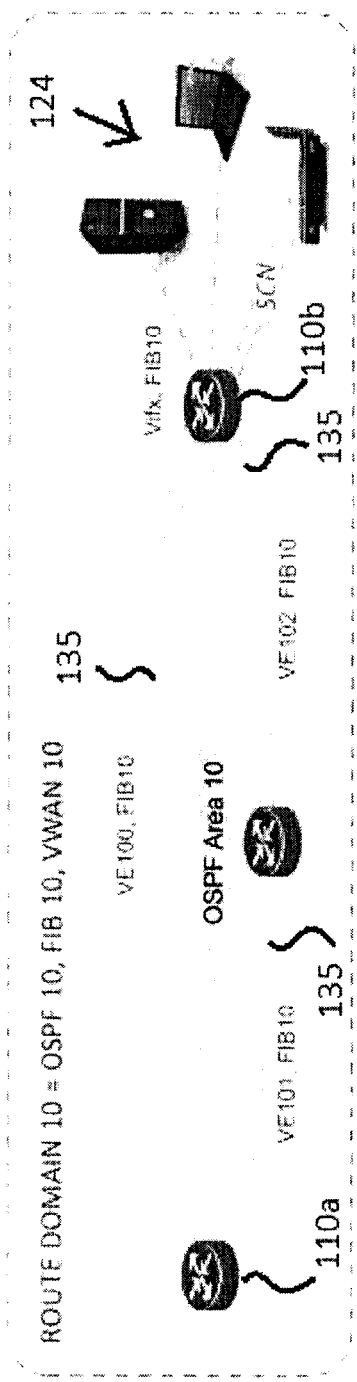
FIG. 17 illustrates a transparent encrypted transport of virtual core connections between PoPs for each customer and multiple CPE devices connecting on either side of the virtual core connections in accordance with one embodiment.

In another embodiment, as shown in FIG. 17, once transparent encrypted transport of VC connections between PoPs for each customer and multiple CPE devices connecting on either side of the VC connections are established, individual Routing Domains may be designated in operating systems to map VE to Vif, creating a per customer Forwarding Information Base (FIB) to address the overlapping CPE LAN IP Subnets problem by implementing per VWAN Customer Routing Domains. For example, individual Routing Domains may be designated for an example operating system using FIBs in AgniOS/FreeBSD to map VE to Vif. BIRD can support for multiple instances per VWAN and iBGP filters out VWANs.

In one embodiment, concentrator element 110 may advertise and receive routes from different FIBs over OSPF. A new CLI node router-ospf may be added to configure, show, enable and disable OSPF routes. In another embodiment, a new configure editor may be needed for OSPF configurations.

In some embodiment, two options exist for ensuring compatibility for BGP & OSPF on concentrator element 110. First option may be to use two different applications, BIRD for eBGP and iBGP, and BIRD-FIB for OSPF. The second option may be use one application for both BGP and OSPF.

In both cases, the routes from the default FIB or all FIBs can be advertised to BGP upstream neighbours. Concentrator element 110 may need to add some filters to prevent unnecessary BGP routes from being advertised. If both BGP and OSPF use the same configuration file for common sections such as kernel, static, direct, parts may need to be compatible for both protocols.

In some embodiment, BIRD may be used with iBGP for propagating connected CPE devices on the concentrator element 110. BIRD may have support for multiple instances of OSPF that can be used for managing virtual network overlay route domains.

OSPF—Managing Per Customer Routing Domains

In one embodiment, using the Open Shortest Path (OSPF) routing protocol for VWAN Route Domains provides an easy to manage dynamic IP Routing Core in a Multi-Tenant environment.

Dynamic Routing for VWAN Mesh Configuration

Figure 18:
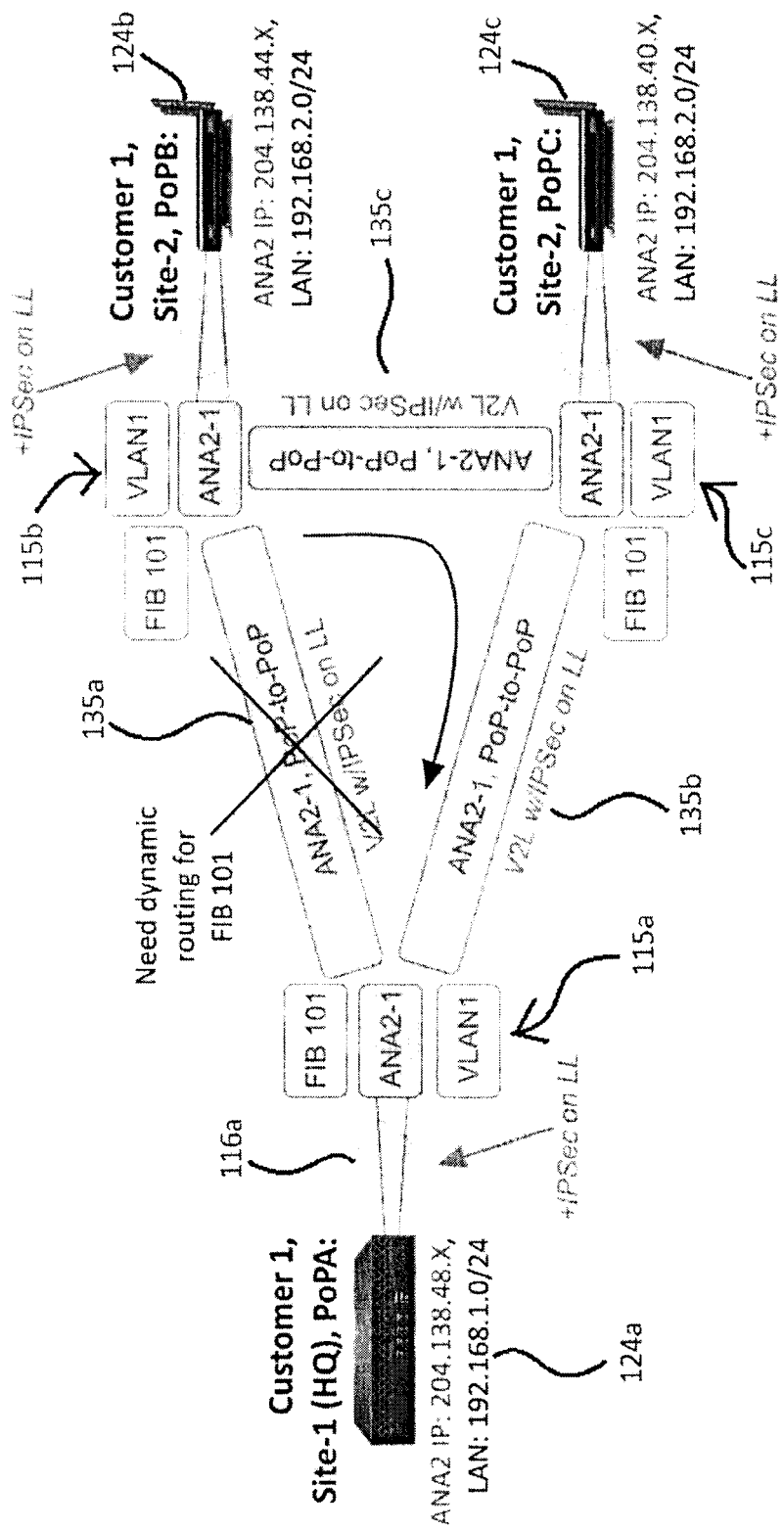
FIG. 18 illustrates BIRD and OSPF (or RIP) with multi-Fib support and filters for each FIB in accordance with one embodiment.

As illustrated in FIG. 18, in one embodiment, BIRD and OSPF (or RIP) with multi-Fib support and filters for each FIB can be implemented to achieve dynamic routing for VWAN Mesh configuration.

In one embodiment, only the remote LAN may be advertised. In another embodiment, IP addresses for CPE bonded connections may not be advertised, as instead they may be handled by the Internet.

RADIUS for Centralized VWAN Access Control

In one embodiment, concentrator element 110 can utilize RADIUS protocol, which provides an overlay identifier (e.g. vwanid) and other attributes (e.g. cpelan attributes). Concentrator elements 110 may also inject route to OSPF for centralized management of new vwanid & cpelan attributes In another embodiment, new concentrator element 110 RADIUS processing of new attributes can dynamically manage customer virtual network overlay mapping for ANA interface to virtual network overlay route domains.

In addition, attributes may be used by concentrator element 110 to inject LAN routes into a dynamic routing protocol such as RIP, OSPF, and iBGP.

For security and to protect against a first Customer connecting to a second Customer ANA2 instance by changing ports on lower-links, an additional RADIUS attribute to identify the unique customer (e.g. "VWANGROUP") may be needed.

An additional level of security on the ANA2 instance may be needed to inform RADIUS the "VWANGROUP" and therefore RADIUS allows this CC/ANA2 instance to authenticate CPE users that belong to the group identified by ID "VWANGROUP".

Furthermore, it may be advantageous to allow multiple customers in the case of a trading partner or trusted partner.

An example configuration on concentrator element 110 may be to set the unique customer ID ("vwangroup") to a first customer ID customer1 and a second customer ID customer2.

In another embodiment, the variable $fib may be used to set values for the unique customer ID ("vwangroup").

Authentication System Modification

Embodiments described herein may implement an Identity, Policy and Audit (IPA) suite or other type of authentication system. An example, is Free IPA. An Lightweight Directory Access Protocol (LDAP) is an open industry standard application protocol for accessing and maintaining distributed directory information services over an Internet Protocol (IP) network. LDAP may also be part of an authentication system. Remote Authentication Dial In User Service (RADIUS) is a networking protocol that provides centralized Authentication, Authorization, and Accounting (AAA) management for users who connect and use a network service. RADIUS may also be part of an authentication system. In one embodiment, a custom attribute may be created in LDAP and enabled to be visible to concentrator element 110. Since everything in LDAP is hierarchical, including object-classes and attributes, to create a custom attribute, the appropriate scheme file needs to be edited. This is an example implement. Embodiments described herein may provide an authentication backend for the Virtual Network Overlay which may include LDAP or RADIUS, or both.

If the custom attribute requires a new ldif file, a new file may need to be created and stored in the appropriate scheme file.

An attribute may be created by matching objectClasses and attributeTypes exactly.

To make a new attribute visible to concentrator element 110, the attribute may be added into two files: attribute map and FreeRadius. These are illustrative example files.

If the attribute needs a custom dictionary, a file can be created. For example, the file may be created as "/usr/share/freeradius" dictionary.yourName.

Define the Attribute in ldap.attrmap

In one embodiment, the ldap.attrmap can map dictionary attributes to LDAP directory to be used by LDAP authentication. For example, the attribute may be added in "/etc/raddb". When all changes are done, RADIUS or other authentication system may be restarted.

IPDE-RLA Dynamic

In another embodiment, dynamic IPDE-RLA implemented on VWAN can bring dynamic bandwidth reservation for RLA allowing IPDE-RLA-bypass rules for traffic for which the reserve bandwidth can be specified and dynamically applied, if the traffic exists. When the traffic is no longer present, the bandwidth can be released for use by other applications.

One illustrative example is Voice and Video with Data. For instance, voice tends to be much easier to deal with in a static configuration. It requires relatively low bandwidth and the reservation of this bandwidth can be an acceptable sacrifice for the other applications. Video conferencing, on the other hand, tends to require large amounts of bandwidth (from upload perspective) and is not always on. The problem is that in order for a static system to support video, it needs to reserve the bandwidth all the time and this is not an acceptable sacrifice for other applications.

In another embodiment, "dynamic, bandwidth, timeout" parameters can be added to support the new feature.

In some embodiment, means to control certificates may be required within cloud manager 140.

There may be many dependencies associated with ANA connections. Some of which govern the Lower-Link activities such as obtaining DHCP address for the links.

Virtual WAN Backhaul—Multi-Tenant Support

In one embodiment, the Virtual Network Overlay may provide a virtual WAN backhaul with multi-tenant support.

VC Connection Management (CLI & SCN)

In one embodiment, the Virtual Network Overlay may provide VC connection management. Example configurations for VC connection management may include:
delete ve VE
set ve VE ip-address Ip Netmask
set ve VC connection IP In one embodiment, the Virtual Network Overlay may provide VC connection management. Example configurations for fibs support may include:
delete ve VC [fib]
set ve VC ip-address Ip Netmask [fib]
set ve VC connection IP [fib]

An automated means may map the various VC interfaces with customer Route tables/VRF in the cloud that uses an API connection to the VC devices (Concentrators) and performs the otherwise manual task Map VC & Vif to FIB (RADIUS on CC)

An automated means may map the various VC interfaces with customer Route tables/VRF and also with customer ANA sessions in the cloud that uses an API connection to the VC devices (Concentrators) and performs the otherwise manual task.

Map Vif to FIB (RADIUS on CC)

In example embodiments, once CPE connects to CC, CC can read the CPEVWANID from CPE radius configuration and then can run commands such as:
ifconfig $interface fib $CPEVWANID This may use the $CPEVWANID as the FIB number for this CPE's Vif interface, and thus map this CPE Vif interface to the specific FIB. The use of a centralized store which in this example scenario is RADIUS to maintain VWAN specific details which in turn are used by the Concentrators/VC to automate the interconnectivity of the VWAN control Plan and Data plane.

Map VC to FIB (RADIUS on CC)

In example embodiments, VC interfaces can be created only in the default FIB (FIB 0) and will manage traffic between this CC and other CCs. Firewall rules and routes will be added to distribute CPE VWAN traffic from/to each FIB.

In example embodiments, VC interfaces can also be created in different FIB's, same as the CPE Vif interface. RADIUS is an illustrative example authentication component.

IP Node, System Node, CLI & Scripts, SCN

In example embodiments, IP nodes may provide FIB support for VE interface management. In some example embodiments, system node may provide FIB support which may be required for any command with an interface specified Operating System Support for 4096 or Greater FIB's In example embodiments, different operating systems may be support multiple FIBs. For example, AgniOS v4.1.2+ may support multiple FIBs (e.g. up to 16 in some examples). For each WAN to have a unique FIB, we will need to add many more FIB's.

net.fibs

In example embodiments, there may be support for 4096 individual VWANs. Each VWAN will not need multiple FIB's for each CPE as the CC brings them in on setfib $FIB ana2-server.

net.add addr allfibs=0 (ANA Only Affect $FIBCUST for ANA2-$CUST)

In example embodiments, implementations may enable addition of routes on all FIBs for new interfaces by default. When this is set to 0, it will only allocate routes on interface changes for the FIB of the caller when adding a new set of addresses to an interface. Note that this tunable and is set to 1 by default.

Portal Management for the Virtual Network Overlay

Cloud manager 140 can provide for Ease of Deployment and Management via implementation of following functions and features:
- OE, Install & Config, Monitoring & Management
- Plugs Into Existing Monitoring System
- Centralized Firewall, WiFi, & the Virtual Network Overlay Control
- Consistent Monitoring, Reporting & Mgmt. for all sites regardless of local carrier or connection type
- Items for management can include:
- CPE ANA Lower-Link Encryption/IPSec
- CC PoP-to-PoP ANA Lower-Link Encryption/IPSec for the V2L
- Spawning dedicated Multi-ANA CC instance per Customer FIB on Virtual Network Overlay CC Virtual Machines/vm9000
- BIRD OSPF for Dynamic Routing of Virtual Network Overlay aggregated/bonded connection sessions
- CC VWAN Firewall profile per Customer/FIB
- CPE Firewall
- Management & Monitoring for Virtual Network Overlay CPE & CC
- QoE rules on CPE for Enterprise Virtual Network Overlay & APPS
- QoE rules on CC VWAN for WAN & APPS
- Advanced Traffic Analytics for Virtual Network Overlay & Internet
- Bandwidth usage reporting for Virtual Network Overlay, CPE, Internet
- Categories for management can include:
- Order Entry
- Install and configuration
- Quality-of-Experience
- Monitoring & Management w/Advanced Traffic Analytics
- New: VWAN Calibrate (CPELAN to HQLAN)
- SCN PostgreSQL Database (ZTP2, Nagios RRD, Netflow)
- Nagios Monitoring System (Config, RRD, MYSQL)
- Netflow Collector System
- Identity, Policy and Audit (IPA) suite software (e.g. FreeIPA with AAA, LDAP)
- RT Tickets System
- AgniOS or other operating system API Design New DB Tables & Structure A new ID Table may be created for the Virtual Network Overlay by specifying variables such as vwanid, vwansubnet (RFC1918/24), partnerid, custid.

VWANID variable may be set by specifying or searching for cloud concentrator pairs and selecting a topology (e.g. star or mesh).

The Core Virtual Network Overlay (e.g. VC connections) between PoPs/Concentrator elements may be set up. Concentrator elements can be configured for VC connections-.sending via AGNIAPID VC connections require private IP assigned from $vwansubnet where each concentrator elements shares same src (x.x.x.1/24) MAP VE interfaces in TABLE for each VWAN and concentrator element Pairs.

Unique identifier for the Virtual Network Overlay may be selected, CPELAN attributes may be set. The attributes may be added to LDAP/RADIUS for CPE profile. QoE parameters may be set for HQ/CC VE.

ZTP Database Design & Structure

Figure 19A:
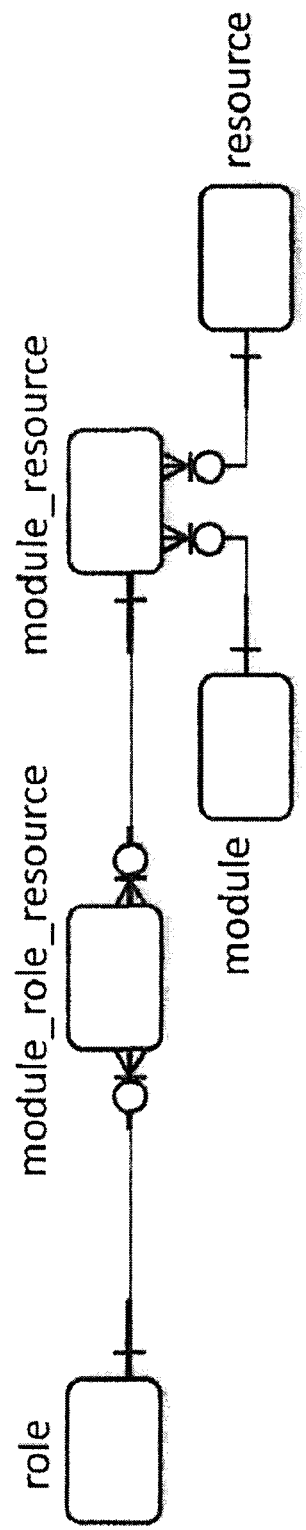
FIG. 19a illustrates exemplary relationship diagrams for cloud manager 140 and SCN Database and tables.
Figure 19B:
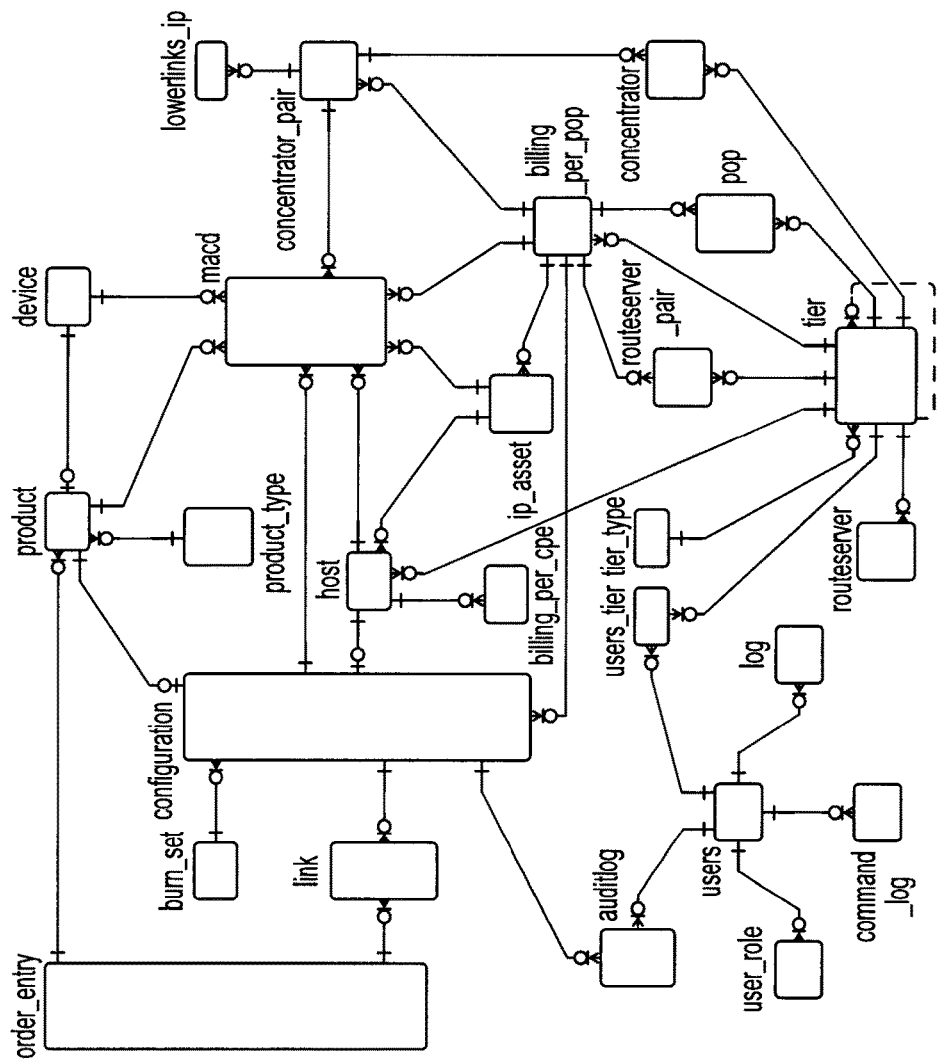
FIG. 19b illustrates additional relationship diagrams for cloud manager 140 and SCN Database and tables.

FIGS. 19a and 19b illustrate exemplary relationship diagrams for cloud manager 140 and SCN Database and tables.

Portal Access Control List (ACL)

Portal Access Control List for managing portal resources is also illustrated in FIGS. 19a and 19b.

New Dynamic IP Address Pool for RAS

For remote access, and portability between PoPs on all concentrator elements 110, each concentrator element may need a dynamic IP address Pool configured to support dynamic clients. For example, dynamic IP pool may be assigned to each concentrator element, and/or each concentrator element may be further configured for a dynamic pool.

This method can allow traveling users to connect with proximal remote access termination for optimal service.

Exemplary components of cloud manager 140:

1. ACL
2. DB/Schema
3. ORM
4. Mail Service
5. RT API/Email Interfacing
6. Workflow/Navigation
7. User-interface/Forms
8. MAC/Serial Lookup
9. Testing
10. IP Plan Integration
11. Netflow/Nagios
12. Agniapid
13. Multi-tier segregation
14. Virtual Network Overlay
15. Managed FW & VPN . . .

Distributed Cloud Firewall/Intrusion Prevention

ANA GRID Routing and Firewall can be controlled from the cloud and achieve software defined networking and global denial of service with intrusion detection protection.

Centralized Control for all BGP and Firewall Devices.

In one embodiment, centralized control of all BGP devices (e.g. from VIPS implementation) may be required.

In another embodiment, Dissemination of Flow Specification Rules may be achieved by using RFC 5575.

Global Denial of Service Detection

In one embodiment, a Denial of Service Attack can be detected at any device and a global defence may be triggered according. This attack can be filtered to prevent entry to any ANA Grid controlled Network.

Global Intrusion Detection

A simplified Intrusion detection software instance running on all BGP devices controlled by cloud manager 140 can inform the cloud manager 140, which can make a centralized intrusion detection decision with threat level analysis.

Upon intrusion decision, the system can propagate a deny rule for said traffic to all devices and the culprit traffic will be filtered out from all PoPs. This technology can also extend to the CPE devices.

Wi-Fi Enterprise Access Security for Operating System

Software Controlled Networking solutions can provide the most efficient means of combining multiple connections for WAN, Internet, & Voice convergence for the enterprise. The WiFi access security may be implemented for various operating systems, such as, for example, AgniOS.

In addition, CPE devices can provide WiFi for the Enterprise using Virtual Access Point technology with centralized authentication and security, managed central portal of cloud manager 140 in the cloud.

Virtual Access Point

Figure 20:
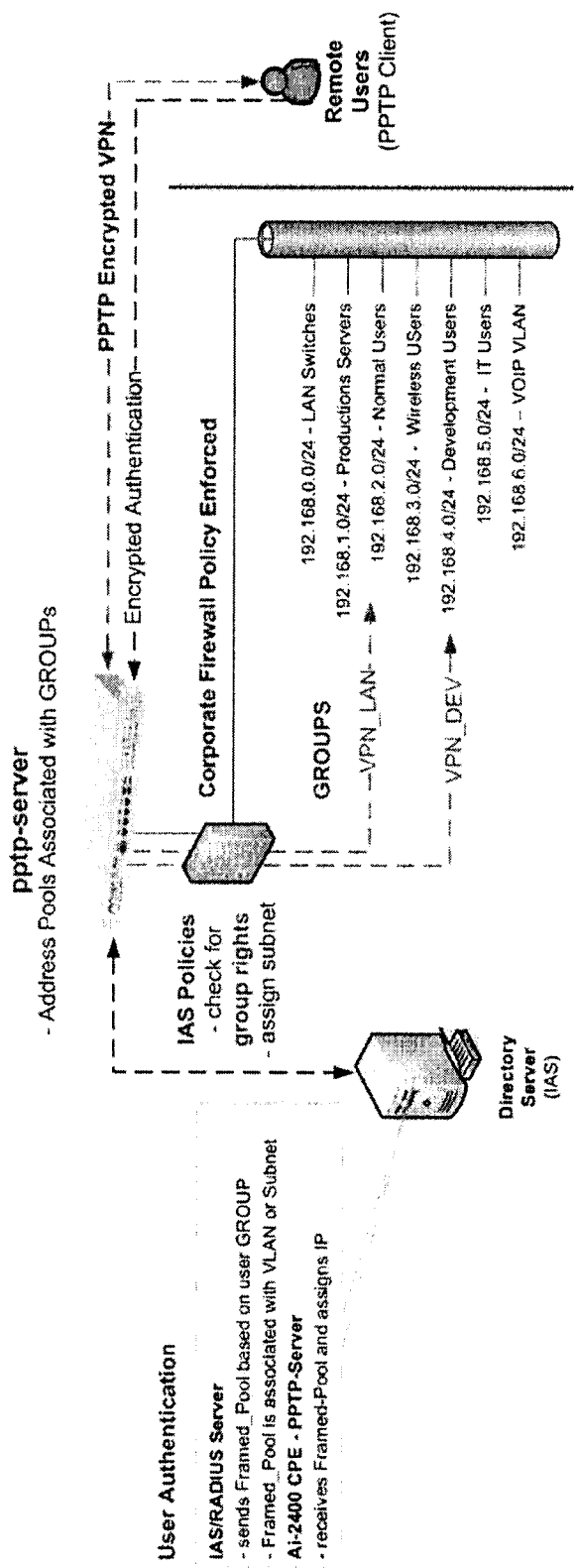
FIG. 20 illustrates a CPE node using a corporate Active Directory security, or Customer RADIUS database for assigning users in accordance with one embodiment.
Figure 21A:
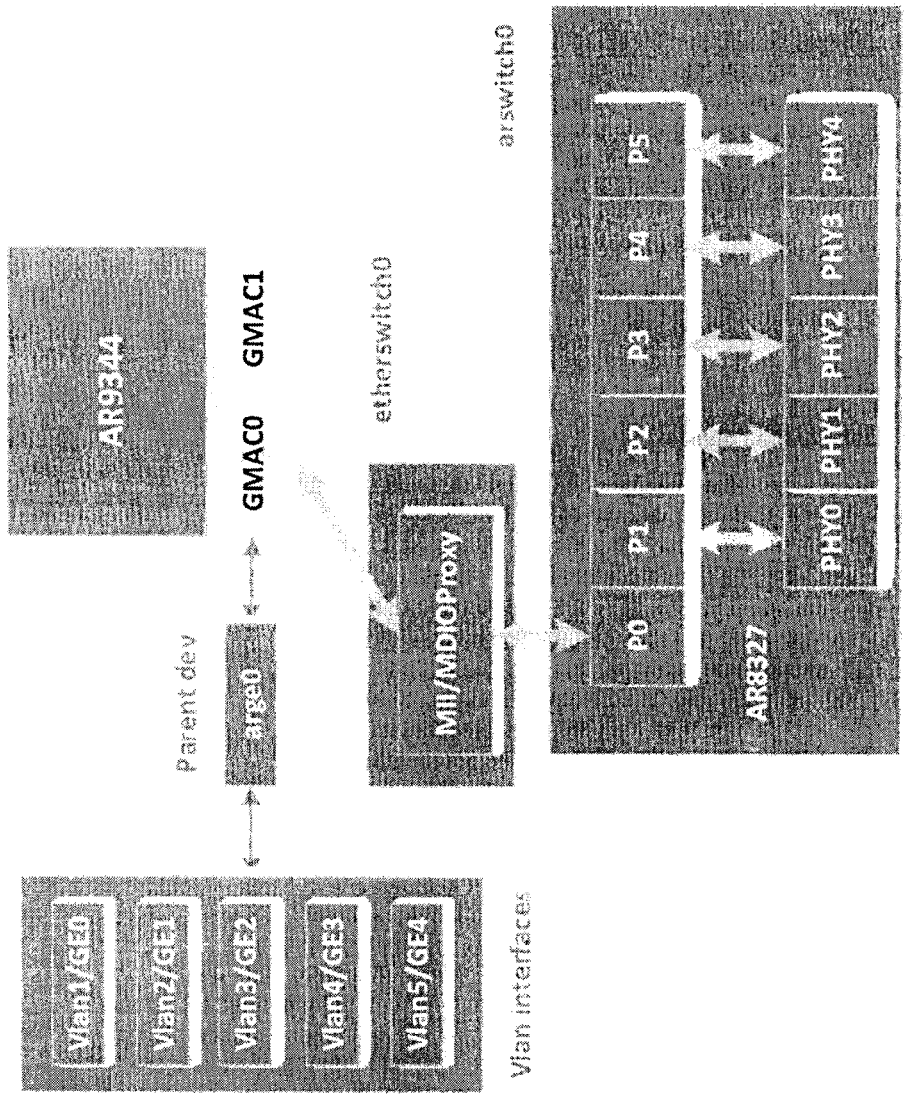
FIG. 21a illustrates an exemplary block diagram for implementation of VLAN as GE interfaces.
Figure 21B:
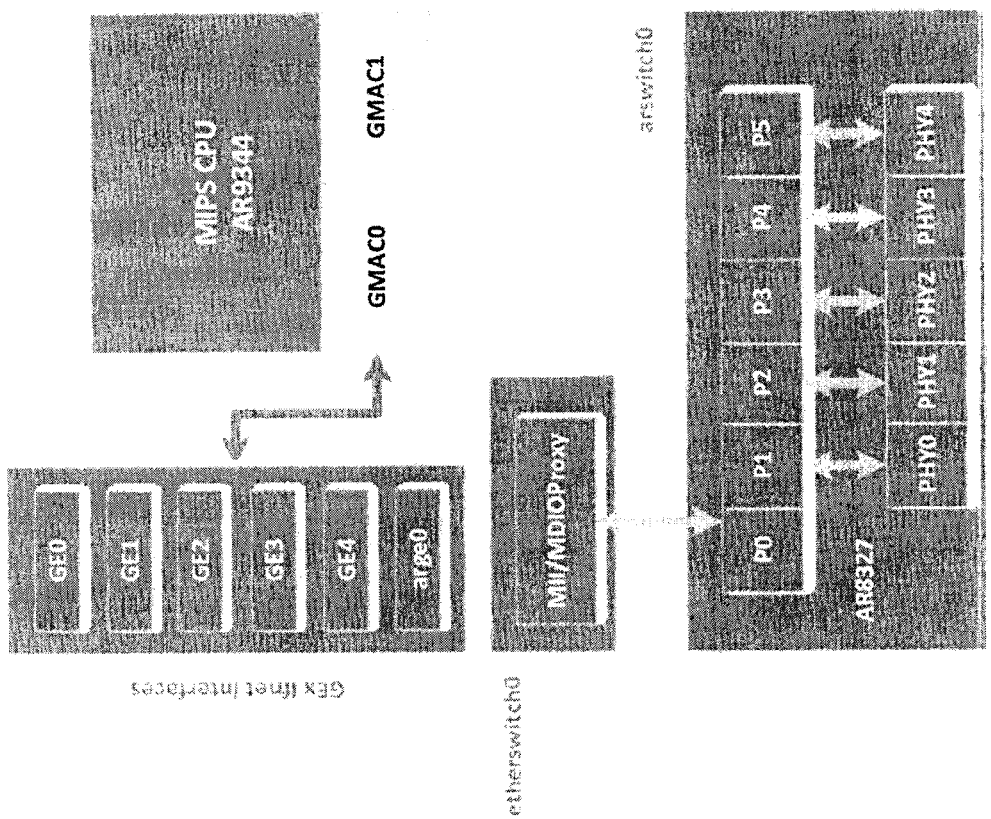
FIG. 21b illustrates an exemplary block diagram for driver customization.

A Virtual Access Point (VAP) is the implementation of a secondary Wi-Fi AP or Hotspot using multiple SSID's (Service Set Identification) and or WLAN interfaces over a common physical Wi-Fi radio. VAP's can be used to separate groups of users such as guests and employees for security and privacy purposes.
VAP w/WEP+VPN When used as an access point for Wi-Fi devices, VWAN can support Enterprise grade Wi-Fi services using a combination of cloud management features, CPE firewall, and CPE VPN remote access VPN capabilities that work with the customer's corporate authentication mechanisms such as Active Directory or RADIUS.
CPE PPTP-Server & Active Directory/RADIUS As illustrated in FIG. 20, in one exemplary embodiment, the CPE <pptp-server> node can use the corporate Active Directory security, or Customer RADIUS database for assigning users to special remote access groups which in turn assigns users to VLANs on the CPE device.

In another embodiment, creation of new dedicated concentrator elements (CC's) 110 for Large Enterprise customers may be used to provide private meshes between PoPs for transport of WAN traffic with Over-The-Top control from both Edge (CPE to Home-PoP) and Core (PoP-to-PoP between CC's).
Multiple Aggregated/Bonded Connection Implementations Multiple aggregated/bonded connections (which may be referred to as ANA™' ANA2™) implementations may be run in one embodiment, assigning one aggregated/bonded process for each Large Enterprise customer and associating this aggregated/bonded instance to a particular FIB.
Advantages and Use Case The embodiments described herein may improve network performance between disparate locations by leveraging network bonding/aggregation technology, but by implementing a system, method and network configuration that provides intervening network components disposed adjacent to access points so as to manage traffic between two or more sites such that bonded/aggregated connections are terminated and traffic is directed to a network backbone, and optionally passed to one or more further bonded/aggregated connections associated with a remote additional site.

The network solutions of the present invention are flexible, responsive, scalable and easy to implement. New sites, optionally having their own CPE-CE and/or CCPE can be easily added, and the network solution supports various types of multi-point network communications, and various network performance improvement strategies including various QoS techniques.

The network solution is easily updated with new programming or logic that is automatically distributed on a peer to peer basis based on the interoperation of network components that is inherent to their design, as previously described.

As explained earlier, embodiments of the present invention may offer advantages over the prior art technologies, including, for example:
1. Carrier diversity
2. Failover protection
3. Aggregated bandwidth
4. Bi-directional communication
5. Network quality of service (QoS)
6. No dropped calls
7. Application acceleration
8. Quality of Experience scoring In addition, combining MPLS network with the link aggregation/bonding technology described in the exemplary embodiments is an approach to satisfying end customer needs on an MPLS network, namely:

Use of multiple low cost broadband circuits (for greater uptime and resiliency)
Support of prioritization and CoS for priority traffic
Hybrid MPLS or backup network strategy without having to abandon MPLS features Furthermore, additional advantages provided by embodiments of the present invention may include:

It paves a way for each carrier or network provider to offer an innovative MPLS network over broadband solution that is differentiated from their competitor's offering.
Customers would be able to select the given carrier or provider for Hybrid and/or Backup MPLS solutions via a customized network configuration.
Cloud provisioning, or "Zero Touch Provisioning" can configure/reconfigure all the network elements dynamically.
An ability to aggregate/terminate multiple MPLS providers in a single location.
Interoperability between networks can be handled by the cloud provisioning element.
Network providers or partners can deliver an "any/any/any" experience to their customers—BYOMPLS (Bring Your Own MPLS) ability to the network providers or partners.
Customers would be able to select carriers offering MPLS with link aggregation/bonding over broadband to obtain QoS, Resiliency, and application acceleration not achievable with current offerings on the market.
And many others.

Network performance is significantly improved over prior art solutions as illustrated in the Example In Operation provided above.

The invention claimed is:

1. A network system for improving network communication performance between sites that are at a distance from one another that is such that would usually require long haul network communication, the system comprising:
   at least one network server component configured to connect to a client site network component through a network connection, the network server component including at least one concentrator element implemented at a network access point to at least one network, the network server component automatically terminating the network connection and passing data traffic to the network access point to at least one network, the client site network component implemented at least at a first client site;
   a virtual edge connection providing at least one of transparent lower-link encryption and lower-link encapsulation using a common access protocol for the network connection between the client site network component and the network server component; and
   a cloud network controller communicatively coupled to the at least one network server component, the cloud network controller configured to manage the data traffic so as to provide a managed network overlay that incorporates the virtual edge connection and at least one long haul network path carried over the at least one network.

2. The system of claim 1 wherein the network server component comprises:
   a first concentrator element implemented at the network access point to the at least one network;
   a second concentrator element implemented at another network access point to at least one other network;
   wherein the first concentrator element and the second concentrator element are configured to interoperate to provide a virtual core connection between the network access point and the other network access point, the virtual core connection providing a bonded/aggregated connection; and wherein the cloud network controller is configured to manage the data traffic so as to provide the managed network overlay that incorporates the virtual edge connection, the virtual core connection and the at least one long haul network path carried over the at least one network and the at least one other network.

3. The system of claim 2 wherein the virtual core connection provides at least one of the transparent lower-link encryption and the lower-link encapsulation using a common access protocol for the bonded/aggregated connection.

4. The system of claim 1 wherein the network server component comprises at least one other concentrator element, the at least one other concentrator element bonding or aggregating one or more diverse network connections so as to configure a bonded/aggregated connection that has increased throughput, the bonded/aggregated connection connecting the at least one concentrator element and the at least one other concentrator element.

5. The system of claim 4 wherein the cloud network controller is configured to manage the data traffic so as to provide the managed network overlay that incorporates the network connection and the bonded/aggregated connection.

6. The system of claim 1 wherein the client site network component is configured to separate lower-link data traffic and encapsulate data packets of the lower-link data traffic using the common access protocol for the network connection.

7. The system of claim 1 wherein the client site network component is configured with a route to the at least one network server component to separate the lower-link traffic to prepare the data traffic for the network connection or the managed network overlay.

8. The system of claim 7 wherein the route is a static route, a dynamic route or a route from a separate or independent virtual routing forwarding table.

9. The system of claim 1 wherein the network server component is configured to connect with an intelligent packet distribution engine that manages data packets transmission over the at least one long haul network path by obtaining data traffic parameters and, based on the data traffic parameters and performance criteria, selectively applies one or more techniques to alter the traffic over the at least one long haul network path to conform to the data traffic parameters.

10. The system of claim 1 wherein the network server component is configured to provide Multi-Directional Pathway Selection (MDPS) for pre-emptive failover using echo packets received from the client site network component.

11. The system of claim 1 wherein network server component is configured to provide an intelligent packet distribution engine (IPDE) for packet distribution with differing speed links using weighted packet distribution and for bi-directional quality of service (QoS).

12. The system of claim 1 wherein the first client site and the second client site are at a distance from one another such that data traffic transmission between the first client site and the second client site is subject to long haul effects.

13. The system of claim 1 wherein each of the least one network server component is accessible to a plurality of client site network components, each client site network component being associated with a client site location.

14. The system of claim 1 further comprising a network aggregation device that: (A) configures a plurality of dissimilar network connections or network connections provided by a plurality of diverse network carriers ("diverse network connections") as one or more aggregated groups, at least one aggregated group creating a bonded/aggregated connection that is a logical connection of the plurality of diverse connections, the network connection comprising the bonded/aggregated connection; and (B) routes and handles bi-directional transmissions over the bonded/aggregated connection; wherein two or more of the diverse network connections have dissimilar network characteristics including variable path bidirectional transfer rates and latencies; wherein the logical connection is utilizable for a transfer of communication traffic bidirectionally on any of the diverse network connections without any configuration for the dissimilar network connections or by the diverse network carriers; and wherein the network aggregation engine includes or is linked to a network aggregation policy database that includes one or more network aggregation policies for configuring the aggregated groups within accepted tolerances so as to configure and maintain the bonded/aggregated connection so that the logical connection has a total communication traffic throughput that is a sum of available communication traffic throughputs of the aggregated group of diverse network connections.

15. The system of claim 1, wherein the network connection comprises a bonded/aggregated connection, and the client site network component bonding or aggregating a plurality of diverse network connections to configure the bonded/aggregated connection to have increased throughput.

16. A client site network component implemented at least at a first client site in network communication with a second client site, wherein the first client site and the second client site are at a distance from one another that is such that would usually require long haul network communication, the client site network component configured to connect, through a network connection, to at least one network server component implemented at an access point to at least one wide area network, the at least one network server component automatically terminating the network connection and passing the data traffic to an access point to the at least one wide area network, the client site network component configuring a virtual edge providing at least one of transparent lower-link encryption and lower-link encapsulation using a common access protocol for the network connection.

17. The client site network component of claim 16 configured to separate lower-link data traffic and use the common access lower-link protocol for encapsulation of data packets of the lower-link data traffic for the network connection.

18. The client site network component of claim 16 configured a route to the at least one network server component to separate the lower-link traffic to prepare the data traffic for the network connection or the managed network overlay.

19. The client site network component of claim 18 wherein the route is a static route, a dynamic route or a route from a separate or independent virtual routing forwarding table.

20. The client site network component of claim 16 configured to transmit echo packets to the network server component to provide Multi-Directional Pathway Selection for pre-emptive failover using the echo packets.

21. The client site network component of claim 16 further configured to provide IPDE for packet distribution with differing speed links using weighted packet distribution and for bi-directional QoS.

22. The client site network component of claim 16, wherein the network connection comprises a bonded/aggregated connection, and the client site network component bonding or aggregating a plurality of diverse network connections to configure the bonded/aggregated connection to have increased throughput.

23. A network server component configured to interoperate with a client site network component at a first client site to configure a network connection, the network server component including at least one concentrator element implemented at a network access point to at least one network, the network server component automatically terminating the network connection and passing data traffic to the network access point to the at least one network for data transmission to a second client site, the first client site and the second client site at a distance from one another that is such that would usually require long haul network communication, the network server component configuring a virtual edge connection providing at least one of transparent lower-link encryption and lower-link encapsulation using a common access protocol for the network connection, the network server component in communication with a cloud network controller configured to manage the data traffic so as to provide a managed network overlay that incorporates the virtual edge connection and at least one long haul network path carried over the at least one network.

24. The network server component of claim 23 further comprising:
a first concentrator element implemented at the network access point to the at least one network;
a second concentrator element implemented at another network access point to at least one other network;
wherein the first concentrator element and the second concentrator element are configured to interoperate to provide a virtual core connection between the network access point and the other network access point, the virtual core connection providing a bonded/aggregated connection; and
wherein the cloud network controller is configured to manage the data traffic so as to provide the managed network overlay that incorporates the virtual edge connection, the virtual core connection and the at least one long haul network path carried over the at least one network and the at least one other network.

25. The network server component of claim 23 configured to use the common access lower-link protocol for encapsulation of data packets of the lower-link data traffic for the network connection.

26. The network server component of claim 23 configured to receive echo packets from the client site network component to provide Multi-Directional Pathway Selection (MDPS) for preemptive failover using the echo packets.

27. The network server component of claim 23 further configured to provide IPDE for packet distribution with differing speed links using weighted packet distribution and for bi-directional QoS.

28. The network server component of claim 23, wherein the network connection comprises a bonded/aggregated connection, and the client site network component bonding or aggregating a plurality of diverse network connections to configure the bonded/aggregated connection to have increased throughput.

\* \* \* \* \*